(12) United States Patent
Dong et al.

(10) Patent No.: US 8,498,046 B2
(45) Date of Patent: Jul. 30, 2013

(54) HIGHLY RARE-EARTH-DOPED OPTICAL FIBERS FOR FIBER LASERS AND AMPLIFIERS

(75) Inventors: Liang Dong, Ann Arbor, MI (US);
Martin E. Fermann, Dexter, MI (US);
Hugh McKay, Ann Arbor, MI (US);
Libin Fu, Ann Arbor, MI (US); Shigeru Suzuki, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 644 days.

(21) Appl. No.: 12/630,550

(22) Filed: Dec. 3, 2009

(65) Prior Publication Data

US 2011/0069723 A1    Mar. 24, 2011

Related U.S. Application Data

(60) Provisional application No. 61/120,022, filed on Dec. 4, 2008.

(51) Int. Cl.
| | |
|---|---|
| *H01S 3/067* | (2006.01) |
| *H04B 10/17* | (2006.01) |
| *C03C 4/12* | (2006.01) |
| *C03C 13/04* | (2006.01) |
| *C03C 3/095* | (2006.01) |
| *C03C 3/097* | (2006.01) |
| *H01S 3/16* | (2006.01) |
| *G02B 6/036* | (2006.01) |
| *G02B 6/12* | (2006.01) |

(52) U.S. Cl.
CPC ........... *H01S 3/06716* (2013.01); *H01S 3/1618* (2013.01); *H01S 3/1603* (2013.01); *H01S 3/163* (2013.01); *G02B 2006/12035* (2013.01); *G02B 6/036* (2013.01); *G02B 2006/1209* (2013.01)

USPC ........................................................ 359/341.5

(58) Field of Classification Search
USPC ........................................................ 359/341.5
See application file for complete search history.

(56) References Cited

U.S. PATENT DOCUMENTS

| 3,119,678 A | 1/1964 | Bazinet, Jr. |
| 3,890,127 A | 6/1975 | Siegmund |

(Continued)

FOREIGN PATENT DOCUMENTS

| CN | 1686884 | 10/2005 |
| EP | 1043281 | 10/2000 |

(Continued)

OTHER PUBLICATIONS

Birks et al., "Endlessly single-mode photonic crystal fiber", Optics Letters, Jul. 1, 1997, vol. 22, No. 13, pp. 961-963.

(Continued)

*Primary Examiner* — Mark Hellner
*Assistant Examiner* — Ari M Diacou
(74) *Attorney, Agent, or Firm* — Knobbe, Martens, Olson & Bear, LLP

(57) ABSTRACT

Various embodiments described herein comprise a laser and/or an amplifier system including a doped gain fiber having ytterbium ions in a phosphosilicate glass. Various embodiments described herein increase pump absorption to at least about 1000 dB/m-9000 dB/m. The use of these gain fibers provide for increased peak-powers and/or pulse energies. The various embodiments of the doped gain fiber having ytterbium ions in a phosphosilicate glass exhibit reduced photo-darkening levels compared to photo-darkening levels obtainable with equivalent doping levels of an ytterbium doped silica fiber.

38 Claims, 23 Drawing Sheets

U.S. PATENT DOCUMENTS

| | | | |
|---|---|---|---|
| 4,339,174 A | 7/1982 | Levin | |
| 4,412,853 A | 11/1983 | Partus | |
| 4,425,146 A | 1/1984 | Izawa et al. | |
| 4,500,168 A | 2/1985 | Kajioka et al. | |
| 4,560,246 A | 12/1985 | Cotter | |
| 4,784,977 A | 11/1988 | Aitken | |
| 4,788,382 A | 11/1988 | Ahearn et al. | |
| 4,815,079 A | 3/1989 | Snitzer et al. | |
| 5,032,001 A | 7/1991 | Shang | |
| 5,158,587 A | 10/1992 | Kyoto et al. | |
| 5,175,785 A | 12/1992 | Dabby | |
| 5,225,925 A | 7/1993 | Grubb et al. | |
| 5,295,209 A | 3/1994 | Huber | |
| 5,353,363 A | 10/1994 | Keck | |
| 5,450,427 A | 9/1995 | Fermann et al. | |
| 5,452,394 A | 9/1995 | Huang | |
| 5,473,625 A | 12/1995 | Hansen et al. | |
| 5,802,236 A | 9/1998 | DiGiovanni et al. | |
| 5,818,630 A | 10/1998 | Fermann et al. | |
| 5,847,863 A | 12/1998 | Galvanuaskas et al. | |
| 5,907,652 A | 5/1999 | DiGiovanni et al. | |
| 6,072,811 A | 6/2000 | Fermann et al. | |
| 6,243,522 B1 | 6/2001 | Allan et al. | |
| 6,249,630 B1 | 6/2001 | Stock et al. | |
| 6,275,512 B1 | 8/2001 | Fermann | |
| 6,334,019 B1 | 12/2001 | Birks et al. | |
| 6,392,788 B1 | 5/2002 | Yoon et al. | |
| 6,411,762 B1 | 6/2002 | Anthon et al. | |
| 6,445,494 B1 | 9/2002 | Nilsson et al. | |
| 6,614,975 B2 | 9/2003 | Richardson et al. | |
| 6,628,082 B2 | 9/2003 | Matsumoto et al. | |
| 6,693,924 B2 | 2/2004 | Myers et al. | |
| 6,711,918 B1 | 3/2004 | Kliner et al. | |
| 6,716,779 B2 | 4/2004 | Lin | |
| 6,772,611 B2 | 8/2004 | Kliner et al. | |
| 6,911,160 B2 | 6/2005 | Myers et al. | |
| 6,931,032 B2 | 8/2005 | Myers et al. | |
| 6,941,053 B2 | 9/2005 | Lauzon et al. | |
| 6,959,022 B2 | 10/2005 | Sandrock et al. | |
| 6,987,783 B2 | 1/2006 | Fajardo et al. | |
| 7,016,573 B2 | 3/2006 | Dong | |
| 7,042,915 B2 | 5/2006 | Myers et al. | |
| 7,050,686 B2 | 5/2006 | Farroni et al. | |
| 7,062,137 B2 | 6/2006 | Farroni et al. | |
| 7,068,900 B2 | 6/2006 | Croteau et al. | |
| 7,088,756 B2 | 8/2006 | Fermann et al. | |
| 7,116,887 B2 | 10/2006 | Farroni et al. | |
| 7,190,705 B2 | 3/2007 | Fermann et al. | |
| 7,209,619 B2 | 4/2007 | Dong et al. | |
| 7,233,607 B2 | 6/2007 | Richardson et al. | |
| 7,280,730 B2 | 10/2007 | Dong et al. | |
| 7,283,714 B1 | 10/2007 | Gapontsev et al. | |
| 7,305,160 B2 | 12/2007 | Park et al. | |
| 7,394,591 B2 | 7/2008 | Harter et al. | |
| 7,450,813 B2* | 11/2008 | Dong et al. | 385/142 |
| 7,477,672 B2 | 1/2009 | Sinha et al. | |
| 7,496,260 B2 | 2/2009 | Dong et al. | |
| 7,531,473 B2 | 5/2009 | Myers | |
| 7,532,391 B2 | 5/2009 | Tamaoki et al. | |
| 7,760,771 B2 | 7/2010 | Salokatve et al. | |
| 8,041,172 B2 | 10/2011 | Sillard et al. | |
| 8,213,758 B2 | 7/2012 | Dong et al. | |
| 2002/0037145 A1 | 3/2002 | Irie et al. | |
| 2002/0164137 A1 | 11/2002 | Johnson et al. | |
| 2002/0176676 A1 | 11/2002 | Johnson et al. | |
| 2004/0005127 A1 | 1/2004 | Kliner et al. | |
| 2004/0086245 A1 | 5/2004 | Farroni et al. | |
| 2004/0096172 A1 | 5/2004 | Bongrand et al. | |
| 2004/0145996 A1 | 7/2004 | Shinoda | |
| 2004/0170358 A1 | 9/2004 | Ishii et al. | |
| 2004/0240816 A1 | 12/2004 | Oh et al. | |
| 2005/0069269 A1 | 3/2005 | Libori | |
| 2005/0157998 A1 | 7/2005 | Dong et al. | |
| 2005/0175059 A1 | 8/2005 | Leclair et al. | |
| 2005/0191017 A1 | 9/2005 | Croteau et al. | |
| 2005/0226286 A1 | 10/2005 | Liu et al. | |
| 2006/0179888 A1 | 8/2006 | Digiovanni et al. | |
| 2006/0198589 A1 | 9/2006 | Sako et al. | |
| 2006/0263024 A1 | 11/2006 | Dong et al. | |
| 2007/0086713 A1 | 4/2007 | Ingmar et al. | |
| 2007/0142199 A1 | 6/2007 | Schneider et al. | |
| 2008/0069508 A1* | 3/2008 | Dong et al. | 385/127 |
| 2008/0240663 A1 | 10/2008 | Dong | |
| 2009/0123121 A1 | 5/2009 | Dong et al. | |
| 2009/0201953 A1 | 8/2009 | Peyghambarian et al. | |
| 2009/0231683 A1 | 9/2009 | Ichii et al. | |
| 2010/0098112 A1 | 4/2010 | Gapontsev et al. | |
| 2010/0124396 A1 | 5/2010 | Coon et al. | |
| 2011/0228382 A1* | 9/2011 | Mattsson et al. | 359/341.3 |
| 2012/0250143 A1 | 10/2012 | Dong et al. | |

FOREIGN PATENT DOCUMENTS

| | | |
|---|---|---|
| EP | 2096088 | 9/2009 |
| FR | 2333628 | 7/1977 |
| GB | 2103202 | 2/1983 |
| JP | 59-052201 | 3/1984 |
| JP | 63-303823 | 12/1988 |
| JP | 53-45632 | 12/1993 |
| JP | 05345632 | 12/1993 |
| JP | 60-37385 | 2/1994 |
| JP | 06037385 | 2/1994 |
| JP | 62-98542 | 10/1994 |
| JP | 06298542 | 10/1994 |
| JP | 2000-503476 | 3/2000 |
| JP | 2002 116181 | 4/2002 |
| JP | 2008 078629 | 4/2008 |
| JP | 2008-078629 | 4/2008 |
| WO | WO 97/26688 A2 | 7/1997 |
| WO | WO 9836300 | 8/1998 |
| WO | WO 99/30391 | 6/1999 |
| WO | WO 2005054139 | 6/2005 |
| WO | WO 2006112071 | 10/2006 |
| WO | WO 2007/049705 A1 | 5/2007 |
| WO | WO 2007/110081 A2 | 10/2007 |
| WO | 2007132182 A2 | 11/2007 |
| WO | WO 2007143542 | 12/2007 |
| WO | WO 2008061530 | 5/2008 |
| WO | WO 2009042347 | 4/2009 |
| WO | WO 2009101379 | 8/2009 |

OTHER PUBLICATIONS

Boullet et al.; "High power ytterbium-doped rod-type three-level photonic crystal fiber laser", Optics Express, Oct. 27, 2008, vol. 16, No. 22, pp. 17891-17902.

Cho et al. "Low-repetition-rate high-peak-power Kerr-lens mode-locked Ti:Al2O3 laser with a multiple-pass cavity", Optics Letters, Mar. 15, 1999, vol. 24, No. 6, pp. 417-419.

Suzuki et al.; "Highly Ytterbium-Doped Phosphosilicate Fibers for Fiber Lasers and Amplifiers with High Peak Powers", in Conference on Lasers and Electro-Optics/International Quantum Electronics Conference, OSA Technical Digest (CD) (Optical Society of America, 2009), May 31, 2009-Jun. 5, 2009, paper CFH3.

Hansryd et al., "Increase of the SBS Threshold in a Short Highly Nonlinear Fiber by Applying a Temperature Distribution", Journal of Lightwave Technology, Nov. 2001, vol. 19, No. 11, pp. 1691-1697.

Hofer et al., "Monolithic polarization-insensitive passively mode-locked fiber laser," in Optical Fiber Communication Conference, vol. 2 of 1996 OSA Technical Digest Series (Optical Society of America, 1996), Feb. 25, 1996-Mar. 1, 1996, paper TuB3.

Kobyakov et al., "Design concept for optical fibers with enhanced SBS threshold", Optics Express, Jul. 11, 2005, vol. 13, No. 14, pp. 5338-5346.

Koponen et al; "Measuring photodarkening from single-mode ytterbium doped silica fibers", Optics Express, Nov. 27, 2006, vol. 14, No. 24, pp. 11539-11544.

Lee et al.; "Measurement of high photodarkening resistance in heavily Yb3+ -doped phosphate fibres", Electronics Letters, Jan. 3, 2008, vol. 44, No. 1.

Limpert et al., "Extended single-mode photonic crystal fiber lasers", Optics Express, Apr. 3, 2006, vol. 14, No. 7, pp. 2715-2720.

Limpert et al., "Fiber based high power laser systems", Encyclopedia of Laser Physics and Technology, 2010.

Limpert et al., "High-power air-clad large-mode-area photonic crystal fiber laser", Optics Express, Apr. 7, 2003, vol. 11, No. 7, pp. 818-823.

Limpert et al., "SPM-induced spectral compression of picosecond pulses in a single-mode Yb-doped fiber amplifier", Optical Society of America TOPS, 2002, vol. 68, pp. 168-175.

Littler et al. "Photothermal effects in fiber Bragg gratings", Applied Optics, Jul. 1, 2006, vol. 45, No. 19, pp. 4679-4685.

Manek-Honninger et al., "Photodarkening and photobleaching of an ytterbium-doped silica double-clad LMA fiber", Optics Express, Feb. 19, 2007, vol. 15, No. 4, pp. 1606-1611.

Martinez et al., "(E)ESI determination from mode-field diameter and refractive index profile measurements on single-mode fibres", IEEE Proceedings, Jun. 1988, vol. 135, Pt. J., No. 3, pp. 202-210.

Mortensen, "Effective area of photonic crystal fibers", Optics Express, Apr. 8, 2002, vol. 10, No. 7, pp. 341-348.

Mortensen, et. al. "Modal cutoff and the V parameter in photonic crystal fibers," Optics Letters, Oct. 15, 2003, vol. 28, No. 20, pp. 1879-1881.

Oberthaler et al., "Special narrowing of ultrashort laser pulses by self-phase modulation in optical fibers", Applied Physics Letters 63 (8), Aug. 23, 1993, pp. 1017-1019.

Roser et al., "Power scaling of high brightness 980 nm Yb-doped fiber laser: detailed study and experiment," in Advanced Solid-State Photonics, OSA Technical Digest Series (CD) (Optical Society of America, 2009), Feb. 1- 4, 2009, paper TuA2.

Schreiber et al., "Stress-induced single-polarization single-transverse mode photonic crystal fiber with low nonlinearity," Optics Express, Sep. 19, 2005, vol. 13, No. 19, pp. 7621-7630.

Russell et al., "Photonic Crystal Fiber: Finding the Holey Grail", Optics Photonics News, Jul./Aug. 2007, pp. 26-31.

Suzuki et al., "Highly ytterbium-doped silica fibers with low photodarkening", Optics Express, Jun. 8, 2009, vol. 17, No. 12, pp. 9924-9932.

Yoshizawa et al., "Stimulated Brillouin Scattering Suppression by Means of Applying Strain Distribution to Fiber with Cabling", Journal of Lightwave Technology, Oct. 1993, vol. 11, No. 10, pp. 1518-1522.

Laperle et al., "Yb-Doped LMA Triple-Clad Fiber Laser," Proc. of SPIE, vol. 6343, 2006, pp. 63430X-1 to 63430X-9.

Croteau et al., "Bending insensitive highly Yb-doped LMA triple-clad fiber for nearly diffraction-limited laser output" Proc. of SPIE, vol. 6101, 2006, pp. 61010G-1 to 61010G-10.

Kuhlmey et al, "Modal cutoff in microstructured optical fibers", Optics Letters, Oct. 1, 2002, vol. 27, No. 19, pp. 1684-1686.

Ainsle et al., "Drawing-dependent transmission Loss in Germania-doped Silica Optical Fibres," J of Non-Crystalline Solids, 1982, vol. 47 #2, pp. 243-245.

Office Action from corresponding Japanese Application No. 2011-539710, dated Dec. 6, 2012, in 12 pages.

* cited by examiner

HIGHLY RARE-EARTH-DOPED OPTICAL FIBERS FOR FIBER LASERS AND AMPLIFIERS

CROSS-REFERENCE TO RELATED APPLICATIONS

This application claims the benefit under 35 U.S.C. §119(e) of U.S. Provisional Patent Application No. 61/120,022 filed Dec. 4, 2008, entitled "Highly Rare-Earth-Doped Optical Fibers for Fiber Lasers and Amplifiers," which is incorporated herein by reference in its entirety.

This application is also related to U.S. patent application Ser. No. 11/693,633, entitled "Rare earth doped and large effective area optical fibers for fiber lasers and amplifiers", filed Mar. 29, 2007, now U.S. Pat. No. 7,450,813. This application is also related to International Application No. PCT/US2008/074668, entitled "Glass Large-Core Optical Fibers, filed Aug. 28, 2008, published as International Publication No. WO 2009/042347 and to U.S. patent application Ser. No. 11/691,986, entitled "Ultra high numerical aperture optics fibers", filed Mar. 27, 2007, now U.S. Pat. No. 7,496,260. The disclosures of each of the above patent applications, publications, and patents are hereby incorporated by reference herein in their entirety.

BACKGROUND

1. Field

This application in general relates to optical fiber laser and amplifier systems. In particular this application relates to optical fibers for laser and amplifier systems comprising highly rare-earth-doped optical fibers.

2. Description of the Related Art

Ytterbium fiber lasers with tens of watts to hundreds of watts output power have been available commercially for many years. More recently, several kW ytterbium fiber lasers operating at single transverse mode have also become available. The simple two level energy system of ytterbium with its collection of 3 lower energy levels and 4 upper levels allows efficient optical energy conversion from pump to signal in a laser or amplifier configuration.

Fiber lasers having high peak and CW powers, high repetition rates and increased stability and reliability can be advantageous in various applications. However, such lasers are difficult to develop with existing technology.

SUMMARY

Various embodiments described herein comprise a laser or amplifier system including a doped gain fiber having ytterbium ions in a phosphosilicate glass. The gain fiber is configured such that pump absorption per unit length substantially exceeds that of a silica fiber in a pump wavelength range of approximately 0.9 μm to approximately 1 μm. Various embodiments described herein increase pump absorption to at least about 1000 dB/m, and higher. In some embodiments, the pump absorption may be about 3000 dB/m-9000 dB/m. In various embodiments, the use of these gain fibers provide for increased peak-powers and/or pulse energies. In various embodiments of a doped gain fiber having ytterbium ions in a phosphosilicate glass, photo-darkening levels are also reduced compared to photo-darkening levels obtainable with equivalent doping levels of an ytterbium doped silica fiber. In some embodiments of the doped gain fiber described herein, a relatively low effective index difference between the core and cladding is obtainable, generally within about ±0.006 or less of the refractive index of the material comprising the cladding (e.g. silica). In some embodiments, the effective index difference between the core and cladding is within about ±0.003.

Various embodiments described herein comprise an optical fiber comprising: a rare earth doped glass comprising silica, a rare-earth dopant, phosphorus, and aluminum, wherein concentration of the rare-earth dopant is at least about 0.5 mol %. Various embodiments of the optical fiber are configured to have a peak absorption greater than about 3000 dB/m at a pump wavelength and a gain greater than about 0.5 dB/cm at an emission wavelength. In various embodiments the phosphorus in the rare-earth doped glass has a concentration such that the saturated value of photo-darkening loss in the optical fiber is less than about 10 dB/m at the emission wavelength. In various embodiments, the pump wavelength may be in a range from approximately 0.9 μm to approximately 1.0 μm. In some embodiments, the emission wavelength may be in a range from approximately 0.95 μm to approximately 1.2 μm. In some embodiments, the pump wavelength may be in a range from approximately 0.91 μm to approximately 0.99 μm. In some embodiments, the emission wavelength may be in a range from approximately 1.0 μm to approximately 1.1 μm.

Various embodiments disclosed herein describe a system comprising a fiber amplifier comprising an amplifier material; and a fiber pump laser comprising a laser material configured to produce radiation in a wavelength range having a peak pump wavelength, said fiber pump laser configured to core pump the fiber amplifier. In various embodiments, an emission cross section of the pump laser material at the pump wavelength is about 10% greater than an emission cross section of the amplifier material at the pump wavelength.

Various embodiments disclosed herein describe an optical amplifier, comprising a pump source; and a gain fiber. Various embodiments of the gain fiber comprise a cladding comprising silica and a core comprising a rare-earth dopant, phosphorus, and aluminum. In various embodiments, the concentration of the rare-earth dopant is at least about 0.5 mol %. In various embodiments, the gain fiber has a peak absorption greater than about 3000 dB/m at a pump wavelength and a gain greater than about 0.5 dB/cm at an emission wavelength. In various embodiments, the phosphorus in the gain fiber has a concentration such that the saturated value of photo-darkening loss of the gain fiber is less than about 10 dB/m at the emission wavelength.

Various embodiments disclosed herein describe an optical fiber comprising a rare earth doped core having a core radius ρ; a first cladding disposed about said core; and a second cladding disposed about said first cladding. In various embodiments, the first cladding has an outer radius ρ1, the core and the first cladding have a difference in index of refraction Δn, and the first cladding and the second cladding have a difference in index of refraction Δn1. In some embodiments, less than 10 modes are supported in the core. In some embodiments, the first cladding radius, ρ1, is greater than about 1.1ρ and less than about 2ρ. In some embodiments, the refractive index difference between the first cladding and the second cladding, Δn1, is greater than about 1.5 Δn and less than about 50 Δn. In some embodiments, the optical fiber comprises silica, a rare-earth dopant, phosphorus, and aluminum, wherein the rare-earth dopant concentration is at least about 0.5 mol %. In various embodiments, the optical fiber has a peak absorption greater than about 3000 dB/m-9000 dB/m at a pump wavelength. In some embodiments, the phosphorus in the rare-earth doped core has a concentration such that the saturated value of the photo-darkening loss of the optical fiber is less than about 10 dB/m at an emission wavelength.

Various embodiments disclosed herein describe a fiber oscillator comprising a gain fiber; a pump source for pumping the gain fiber; a reflector optically connected to a first output end of the gain fiber, an undoped fiber optically connected to a second output end of the gain fiber and configured to receive energy emitted from the second output end of the gain fiber, a saturable absorber configured as a highly reflective cavity end mirror, and an intra-cavity polarizer optically connected to the gain fiber and the undoped fiber. In various embodiments the gain fiber includes an optical fiber that comprises a rare earth doped glass comprising silica, a rare-earth dopant, phosphorus, and aluminum, wherein concentration of the rare-earth dopant is at least about 0.5 mol %. Various embodiments of the optical fiber are configured to have a peak absorption greater than about 3000 dB/m at a pump wavelength and a gain greater than about 0.5 dB/cm at an emission wavelength. In various embodiments the phosphorus in the rare-earth doped glass has a concentration such that the saturated value of photo-darkening loss in the optical fiber is less than about 10 dB/m at the emission wavelength. In various embodiments, the reflector is configured to control intra-cavity dispersion. In various embodiments, the reflector has a reflectivity of at least about 40%. In some embodiments, the saturable absorber has a reflectivity of at least about 40% and is operable to mode-lock the fiber oscillator. In some embodiments, the saturable absorber is configured to receive and reflect energy emitted from the second output end of the gain fiber. In various embodiments, the intra-cavity polarizer is configured as a first output coupler and emits a first set of output pulses. In various embodiments, the gain fiber has a first length and the undoped fiber has a second length. In some embodiments, the second length is greater than the first length.

Various embodiment disclosed herein describe a laser-based system, comprising a source of optical pulses; a fiber amplifier, and a non-linear fiber configured to spectrally broaden pulses emitted from the fiber amplifier. In various embodiments, the non-linear fiber comprises a stress-guided fiber configured to guide a mode within the fiber using a refractive index change due to the stress-optic effect In various embodiments, the fiber amplifier can comprise an optical fiber that comprises a rare earth doped glass comprising silica, a rare-earth dopant, phosphorus, and aluminum, wherein concentration of the rare-earth dopant is at least about 0.5 mol %. Various embodiments of the optical fiber are configured to have a peak absorption greater than about 3000 dB/m at a pump wavelength and a gain greater than about 0.5 dB/cm at an emission wavelength. In various embodiments the phosphorus in the rare-earth doped glass has a concentration such that the saturated value of photo-darkening loss in the optical fiber is less than about 10 dB/m at the emission wavelength.

Various embodiments disclosed herein describe a high repetition rate fiber laser oscillator comprising a pump; a gain fiber; and a dispersion compensator comprising one or more fibers having dispersion. In various embodiments, the gain fiber comprises an optical fiber that comprises a rare earth doped glass comprising silica, a rare-earth dopant, phosphorus, and aluminum, wherein concentration of the rare-earth dopant is at least about 0.5 mol %. Various embodiments of the optical fiber are configured to have a peak absorption greater than about 3000 dB/m at a pump wavelength and a gain greater than about 0.5 dB/cm at an emission wavelength. In various embodiments the phosphorus in the rare-earth doped glass has a concentration such that the saturated value of photo-darkening loss in the optical fiber is less than about 10 dB/m. In various embodiments, the gain fiber and the one or more fibers having dispersion have a total length sufficiently short to provide a repetition rate in the range of about 100 MHz to 10 GHz. In some embodiments, the dispersion compensator provides for generation of sub-picosecond output pulses. Various embodiments disclosed herein describe a frequency comb source comprising the high repetition rate fiber laser oscillator and a non-linear fiber configured to spectrally broaden pulses emitted from the gain fiber.

Various embodiments disclosed herein describe a high repetition rate fiber laser oscillator comprising at least one multimode pump diode; a large core fiber receiving energy from said pump diode and emitting a pump output having a single or a few modes; and an optical system receiving said pump output. In some embodiments, at least one of the large core fiber or optical system comprises an optical fiber that comprises a rare earth doped glass comprising silica, a rare-earth dopant, phosphorus, and aluminum, wherein concentration of the rare-earth dopant is at least about 0.5 mol %. Various embodiments of the optical fiber are configured to have a peak absorption greater than about 3000 dB/m at a pump wavelength and a gain greater than about 0.5 dB/cm at an emission wavelength. In various embodiments the phosphorus in the rare-earth doped glass has a concentration such that the saturated value of photo-darkening loss in the optical fiber is less than about 10 dB/m.

BRIEF DESCRIPTION OF THE DRAWINGS

FIG. 23F illustrates a measured mode profile of the pump fiber.

FIGS. 24-27 illustrate performance of an example of a fabricated all-glass leakage channel fiber configured in such a way that a mode is guided using a stress-optic effect.

FIG. 24 is a three-dimensional plot illustrating a measured two-dimensional refractive index profile of the example fiber of FIG. 26, and illustrates an increase in index of refraction near the low index features.

FIG. 25A illustrates a cross section of the fiber, FIG. 25B illustrates a measured two-dimensional refractive index profile, and FIG. 25C illustrates several mode profiles measured at various wavelengths in the range of 780 nm to 1100 nm.

FIG. 26 illustrates mode field measurements obtained at several wavelengths using a fabricated fiber drawn from the same preform as the LCF of FIG. 25A.

FIG. 27 is a plot illustrating a section of the two-dimensional refractive index profile of FIG. 25B.

DETAILED DESCRIPTION OF EMBODIMENTS

Figure 1:
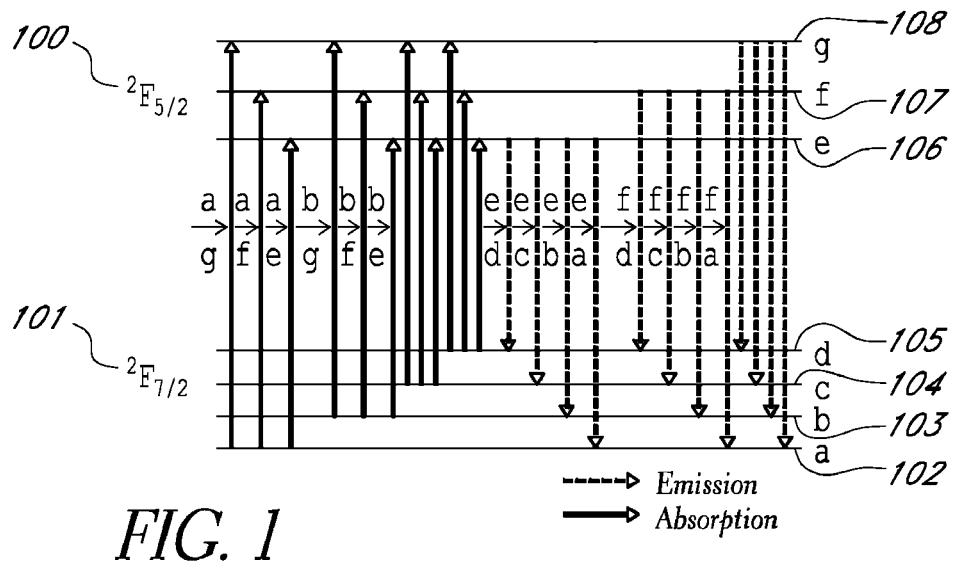
FIG. 1 illustrates an Ytterbium energy level system.

The generation of high power CW to near-bandwidth limited nano-second length pulses in optical fibers is limited by several effects, for example, stimulated Brillouin scattering, photo-darkening, etc. Various methods to suppress Brillouin scattering have been suggested in literature. These methods generally increase the bandwidth of the injected optical signal by either frequency-dithering of semiconductor lasers, the implementation of frequency-modulators, or the use of a line-narrowed amplified spontaneous emission source. Alternatively, fiber parameter variations can be utilized to increase the Brillouin scattering threshold. Stimulated Brillouin scattering suppression by means of applying strain distribution to fiber with cabling is another possible method. In some systems, the SBS threshold in a short highly nonlinear fiber can be increased by applying a temperature distribution. In some embodiments, the effective Brillouin scattering cross section of optical fibers can be reduced by reducing the overlap between the optical field and the acoustic modes of a fiber. However, for large mode fibers with a core diameter >≈30 µm, the overlap between the optical field and the acoustic modes is governed by the limited propagation lengths of the acoustic modes (≈30 µm); in this case the onset of Brillouin scattering is determined by the optical field intensity, which scales with the optical mode area and the nonlinear interaction length, which scales with the fiber length.

Improvements in optical fiber design, composition and manufacturing which increase the non-linear threshold of the optical fiber by one or more orders of magnitude can be advantageous in suppressing stimulated Brillouin scattering. Preferably, these improvements can increase the non-linear threshold without increasing the bandwidth of a signal, temperature or strain control of the optical fibers, and can be applicable for fiber lasers comprising optical fibers with large-core areas.

Another possible limitation for power scaling of fiber lasers and amplifiers results from photo-darkening. Photo-darkening is a phenomenon where background loss in a fiber is permanently increased by a creation of color centers as a consequence of large amounts of optical power present in the fiber. Although the effect can be saturated after a period of exposure (see, e.g., FIGS. 10-12), it can contribute to a loss of output power and reduction of efficiency in fiber laser and amplifiers. Photo-darkening can be more severe at high power levels, and can contribute to a significant power loss in a high power fiber laser system if not dealt with appropriately.

Various embodiments described herein comprise a low photo-darkening glass comprising a high concentration of ytterbium used in single mode fibers, multi-mode large mode fibers, photonic crystal fibers (PCF), leakage channel fibers (LCF) and other fiber designs including double clad fiber design. Use of such a fiber can provide for a shorter device length and consequently higher nonlinear threshold. In various embodiments, using a double clad design with a doped core surrounded by a highly multimode pump guide, ytterbium-doped fibers allows efficient optical energy conversion from multimode high power pump diodes to a high power single mode beam at wavelength about of 1 µm for a variety of applications.

Various embodiments comprise silica optical fibers, having a high level of Yb doping, and a quantity of boron and/or phosphorus dopants. In some embodiments, the silica optical fiber having a high level of Yb doping, and a quantity of boron and/or phosphorus dopant can have large cores. Such fibers can simultaneously provide high absorption of pump light, low photo-darkening, and a relatively low effective index difference between the core and cladding, and high gain.

Experimental results showed that a surprisingly high Yb doping level can be achieved. A resulting increase in absorption at a pump wavelength provides for amplification to higher energy and/or peak power over a reduced length of fiber. A threshold for non-linear effects is thereby significantly increased. Moreover, low photo-darkening was also observed, and significantly reduced a conventional tradeoff known to occur with high inversion levels.

In some embodiments, a desirable host glass can be mostly silica, doped with a sufficiently large number of ytterbium ions to provide for high doping levels. The glass composition may comprise other dopants, for example boron and/or phosphorus. A silica glass host having phosphorus, is frequently referred to herein as a phosphosilicate glass.

Various embodiments comprise large-core, low numerical aperture fibers that produce nearly diffraction limited outputs. A highly rare-earth doped core provides for increased gain per unit length (dB/m), and high gain with fiber lengths of a few cm, and reduced susceptibility to non-linear effects.

Various embodiments comprise phosphorus-containing silica glass host for ytterbium-doped fibers, fiber lasers, and amplifiers. The silica glass host may comprise phosphorus, and in some embodiments the glass host may comprise both boron and phosphorus.

A phosphosilicate gain fiber having such a relatively short length (compared to an ytterbium-doped fiber) can also reduce nonlinear effects in pulsed lasers and amplifiers, where high peak power induces nonlinear effects that are integrated over the device length. The reduced non-linearity can provide for higher peak power, and can be beneficial for high energy pulse amplification, for example at ultrashort pulsewidths, where nonlinear effects are one of the factors limiting higher pulse energy, which can be desirable for use in micro-machining applications.

The inventors have also discovered that in various embodiments photo-darkening effect is substantially lower in fabricated phosphosilicate fibers with equivalent amount of ytterbium doping level compared to silica fibers. This can lead to reliable and efficient high power fiber lasers and amplifiers.

In various embodiments, Ytterbium-doped silica fibers, with advantages of a phosphate host, may be fabricated using well developed fiber fabrication technology based on chemical vapor deposition. Such a fabricated fiber can provide very low background loss and reduced photo-darkening. Moreover, a phosphosilicate fiber can also have various desirable physical features of a telecom grade fiber. As such, a process for making the fiber is similar or identical to that used to fabricate a conventional silica fiber and, in at least some embodiments, leverages advantages of the availability of a wide range of technologies and equipment developed for silica fiber fabrication and use.

Phosphosilicate gain fibers may be used in high repetition rate fiber lasers and amplifier systems (e.g.: 100 MHz to 100 GHz rates), femtosecond to nanosecond pulse amplifiers, as a power amplifier seeded by a high-peak power source, as a seed source for a bulk amplifier, as a seed source for a bulk amplifier producing high-peak output power or high energy, as a pump source, as a CW source exhibiting low photo-darkening in high average power applications, as a pulse source in high-peak power/short wavelength applications, in continuum generation, as a gain element of a fiber based coherent beam combiner, as a frequency comb source, as a single frequency fiber laser, as an gain element in a material processing or laser radar application, as a telecommunications amplifier, and in many other applications.

Various embodiments described herein describe glasses having a large fiber core and/or high doping. Various embodiments disclose rare earth doped glass compositions which may be used in large-core fibers and rods. Various embodiments, which comprise a highly rare earth doped host glass, provide for the use of a short length of fiber, and a corresponding reduction of non-linear effects.

In various embodiments, silica glass can be employed as a host for ytterbium in fiber lasers and amplifiers. In some embodiments, because ytterbium is incorporated in the silica glass as Yb3+, we use ytterbium frequently to refer to Yb3+. In ytterbium-doped silica fibers, a quantity of aluminum is often added to reduce ytterbium clustering at high doping levels. Ytterbium clustering is not desirable because interaction between ytterbium ions could lead to multi-photon up-conversion, and consequently energy loss in a laser or an amplifier. Aluminum-doping also raises the refractive index. In some embodiments, the fiber may be doped with a small quantity of germanium to increase refractive index, if desired. In some embodiments, Fluorine is often added to decrease refractive index.

Photo-darkening is generally believed to be linked to ytterbium clustering at high ytterbium doping levels, where multiple ions interact to produce photons with very high energy levels that can cause photo-darkening. Various embodiments described herein can reduce photo-darkening, for example, by reducing ytterbium clustering. In various embodiments, ytterbium clustering can be reduced by addition of materials such as aluminum, phosphorus, boron, etc.

This application incorporates by reference U.S. patent application Ser. No. 11/693,633, entitled "Rare earth doped and large effective area optical fibers for fiber lasers and amplifiers", corresponding published U.S. Publication No. 2008/0069508 (hereinafter referred to as '9508), and corresponding U.S. Pat. No. 7,450,813, each incorporated by reference herein in its entirety. The foregoing application, publication, and patent disclose, among other things, embodiments of fibers which can reduce photo-darkening effect.

In some embodiments, it may be advantageous to use a fiber having large-mode-area, rare-earth-doped core with low effective index difference between core and cladding. Therefore, to lower the effective index difference between core and cladding, it may be advantageous to achieve a relatively low refractive index in the doped core.

In some embodiments, relatively high aluminum-doping can be used to reduce photo-darkening without using any boron or phosphorus. However, adding aluminum and phosphorus to reduce ytterbium clustering, can raise the refractive index. In some embodiments, it is observed that small amounts of germanium-doping can also raise the refractive index. To lower the refractive index, fluorine can be added in some embodiments. Due to the limited amount of fluorine which can be incorporated into silica glass by current state of art silica fiber fabrication techniques, rare earth doped core can have refractive index higher than that of the silica. This can be especially true for highly rare earth doped core, since the desired doping level for aluminum or phosphorus is, in some cases, much higher to achieve a reasonably low level of clustering. Accordingly, producing highly rare earth doped core glass that have a refractive index close to that of the silica, which can be used for the power scaling of fiber lasers in certain large core fiber designs, can be difficult.

Various embodiments described herein, include highly rare earth doped glass compositions having a refractive index relatively close to that of silica. For example, in various embodiments, the refractive index may be within about ±0.01 of silica, within about ±0.006 of silica, within about ±0.003 of silica, or within about ±0.001 of silica. In other embodiments, the refractive index relative to silica may have different values. Such glasses can be fabricated into rods that can be used as preforms to produce other rods as well as optical fiber. Moreover, such glasses can be fabricated with mature technologies used in the manufacture of optical fibers in telecommunications industry.

Embodiments of a fabrication process for ytterbium-doped silica fibers containing phosphorus, boron, aluminum, and/or fluorine is described in '9508. In some embodiments of the fabrication process, Boron can be left out during sintering process by not flowing $BCl_3$ and/or aluminum can be left out by leaving it out of the solution.

Various embodiments described herein include rare earth doped glass compositions which may be used in optical fibers and rods having large core sizes. The index of refraction of the glass may be substantially uniform and may be close to that of silica in some embodiments. Possible advantages to such features include a reduction of formation of additional waveguides within the core, which becomes increasingly a problem with larger core sizes.

Various embodiments described herein comprise a doped glass comprising silica having a refractive index, at least about 10 mol % phosphorus in said silica, at least about 10 mol % boron in said silica, and rare earth ions in said silica. The rare earth ions have a concentration in the silica of at least about 1000 mol ppm. The optical fiber comprising silica having phosphorus, boron, and rare earth ions therein has a refractive index within about ±0.003 or less of the refractive index of the silica.

Various embodiments comprise a method of fabricating rare earth ion doped glass. The method comprises stacking multiple rods comprising rare earth ion doped glass and drawing the stacked rods to form a first rod. In some embodiments, the first rod may be cut into shorter sections that may be stacked and drawn to form a second rod. This second rod may have an effective refractive index uniformity with less than about $5\times10^{-4}$ maximum peak-to-peak variation measured with refractive index profiler with a spatial resolution of 0.1 µm.

Some embodiments comprise a rod comprising a core doped with rare earth ions and a cladding. The core has an effective refractive index uniformity with less than about $5\times10^{-4}$ maximum peak-to-peak variation measured with refractive index profiler with a spatial resolution of between 0.1 to 0.5 µm.

Various embodiments comprise a rod comprising a core doped with rare earth ions and a cladding, wherein the core comprises a doped region at least 200 microns square ($\mu m^2$) with an average refractive index within about ±0.003 or less of the refractive index of the silica.

Various embodiments described herein comprise a step index optical fiber comprising a core having a core radius $\rho$, a first cladding disposed about the core, and a second cladding disposed about the first cladding. The first cladding has an outer radius $\rho_1$. The core and the first cladding have a difference in index of refraction $\Delta n$ and the first cladding and the second cladding have a difference in index of refraction $\Delta n_1$. For this step index optical fiber, (i) less than 10 modes are supported in the core, (ii) the first cladding radius, $\rho_1$, is greater than about 1.1$\rho$ and less than about 2$\rho$, and (iii) the refractive index difference between first cladding and said second cladding, $\Delta n_1$, is greater than about 1.5 $\Delta n$ and less than about 50 $\Delta n$.

Some embodiments described herein comprise an optical fiber system for providing optical amplification. The optical fiber system comprises an optical fiber doped with one or more types of rare earth ions. The optical fiber has a tapered input and a length extending therefrom. The optical fiber system further comprises an optical pump optically coupled to the optical fiber and an optical source optically coupled to the tapered input of the optical fiber. The tapered input end supports a reduced number of optical modes than the length extending from the tapered input.

Some embodiments described herein comprise a method of fabricating glass. The method comprises introducing boron by vapor deposition and introducing phosphorus by vapor deposition, wherein the boron and phosphorus are introduced at different times. Introducing the boron and phosphorus at different times prevents that reaction of boron and phosphorus in vapor phase.

Some embodiments described herein comprise highly rare-earth doped glass compositions that reduce photo-darkening and provide for stable and efficient high power lasers and amplifiers, and methods of fabrication. For example, at least paragraphs [0063]-[0074] and the corresponding figures of '9508, which is incorporated herein by reference in its entirety for the subject matter specifically referred to herein and for all other subject matter it discloses, describe examples of such compositions, fibers, and fabrication techniques.

In some embodiments more ytterbium ions can be incorporated in a phosphate host compared to a silica host without clustering. Ytterbium doped phosphosilicate fibers can potentially allow more ytterbium ions to be incorporated with a lower level of clustering. Ytterbium ions in phosphosilicate glass can provide higher pump absorption and emission cross section over wavelength range of between 1 to 1.1 µm than these in a silica host. Higher ytterbium content and higher emission cross section can provide for shorter device length and more efficient lasers and amplifiers. This can enable more compact devices as well easy implementation of single frequency ytterbium lasers which utilize a short cavity.

In some embodiments, phosphate glass, a glass with $P_2O_5$ content over 50%, can be a better host for rare earth doping than silica based glass. An example of a phosphate glass would contain 60-65 mol % $P_2O_5$, 5-30 mol % BaO, 5-10 mol % $Al_2O_3$, and 0-2% $La_2O_3$. Up to 10 mol % of rare earth oxides, e.g. $Yb_2O_3$ or $Er_2O_3$, can be added in the glass. Much higher doping level is obtainable, at less clustering level. In addition, phosphate glass also has good physical and optical characteristics for use as an optical material for optical fibers.

One method of manufacturing this type of glass comprises heating and mixing in a crucible. Much higher background loss can result in glass made with this process due to the difficulty of reducing impurities. In one embodiment, to make a phosphate glass optical fiber, core glass is made with desired amount of rare earth ions. Cladding glass, can be modified to have a slightly lower refractive index than that of core glass, is made separately. Core glass is made into a rod shape and cladding glass into a matching tube. A preform is assembled by inserting the core glass rod into the cladding glass tube. The fiber is then drawn from the preform. For a double clad design, an additional glass with lower refractive index is further added on the outside.

This fabrication process can be more cumbersome than vapor deposition processes that are developed for silica based glass. The vapor deposition processes can also enable silica glass with much lower impurity level than any other glasses, consequently much lower loss, to be made. In a vapor deposition process, core and cladding glass are made in a single process.

These factors make it very attractive to develop a vapor deposition based technology to make rare earth doped core glasses with some of the advantages provided by phosphate glass. An example of such a vapor deposition process is shown in FIGS. 2A-6 and the corresponding text of '9508, which is incorporated by reference herein in its entirety for the subject matter specifically referred to herein and for all other subject matter it discloses. In some embodiments, it can also be desirable to be able to splice easily with silica fibers to leverage the massive amount of technologies developed for silica based optical fibers. Boron can further be added to lower the refractive index of these glasses so that it can be made very close to that of silica glass. This can be advantageous for large core fibers where it may be beneficial for the ytterbium-doped glass to have a refractive index very close to or matched to that of the silica glass.

By way of example, the inventors found that significant amount of ytterbium ions can be retained at phosphorus sites in a phosphorus doped silica glass with phosphorus contents as low as about 0.5 mol %. Some desirable features of a phosphate glass e.g. absorption and emission cross section, upper state life time, etc. can be obtained with phosphorus content larger than 50 mol %. In some embodiments, to allow majority of ytterbium to be retained at phosphorus sites, the glass should have sufficient phosphorus content. In some embodiments, to achieve a higher desirable ytterbium doping level, an increase in phosphorus content is provided to achieve phosphate glass features from the ytterbium ions. In some embodiments, photo-darkening can be reduced with such a composition. In some embodiments, use of such high rare-earth doped fibers can provide for scaling of energy, power, and/or repetition rates. For example, obtaining high-peak power with reduction in fiber length can advantageously produce a compact configuration for use at high repetition rates. An increased threshold for non-linear effects, particularly Raman scattering, may simultaneously be provided in various embodiments.

Various example fiber laser and amplifier embodiments described herein comprise at least one ytterbium doped phosphosilicate gain fiber. In a laser or amplifier system, the phosphosilicate gain fiber may be used alone or in combination with other doped fibers. For example, a phosphosilicate based gain fiber may be used as a power amplifier that amplifies pulses generated by one or more pre-amplifiers or power amplifiers.

For example, recently large-core fiber technology has been advanced, for example with implementation of a leakage channel fiber (LCF) providing a record effective mode area as described in PCT international application no. PCT/US2008/074668, entitled "Glass Large-Core Optical Fibers, filed Aug. 28, 2008, published as PCT Publication No. WO 2009/042347, which is incorporated by reference herein in its entirety for the subject matter specifically referred to herein and for all other subject matter it discloses. Such large-core fiber, when used as an amplifier or within a laser cavity, provide for high peak power single mode outputs. Various embodiments described herein may utilize a large core fiber, for example a leakage channel fiber (LCF) having a core dimension of at least about 35 μm, 50 μm, 70 μm, 100 μm, or somewhat larger, with a highly rare-earth doped core configured in such a way that reduces amplifier length, increases non-linear threshold, and/or reduces photo-darkening.

Some embodiments provide a practical source of high peak power near bandwidth-limited pulses in the ps regime. The source is based on a fiber oscillator fiber amplifier concept. It utilizes a twisted optimum cavity configuration to generate high energy near bandwidth-limited or slightly negatively chirped pulses from a fiber oscillator. Optimum fiber pre-amplifier and power amplifiers are then provided to generate high energy near bandwidth-limited pulses, which can be efficiently frequency converted to other wavelengths.

Various embodiments provide nonlinear frequency broadening of ps pulses in truly single-mode optical fibers or near single-mode optical fibers and subsequent pulse compression as well as the use of such sources in micro-machining.

Some embodiments provide a high energy mode-locked fiber oscillator. Here a large core leakage channel fiber is incorporated into a dispersion-compensated laser cavity to maximize the energy of the oscillating pulses.

Some embodiments provide a high energy mode-locked fiber oscillator. Some embodiments provide a high repetition rate mode-locked oscillator and its use in frequency comb metrology.

Various embodiments provide a high peak power single-frequency fiber amplifier system. Some embodiments provide for a construction of a 980 nm Yb fiber based laser and its application to core-pumping of an Yb fiber amplifier.

Phosphosilicate Fiber Transitions and Optical Properties

FIGS. 1-7A illustrate pertinent energy levels and transitions for a laser or amplifier medium utilizing ytterbium, alone or in combination with other dopants, for example aluminum, phosphorus and/or fluorine. Results obtained with fabricated fibers are described, including various measurement of lifetime, pump absorption, lifetime, and photo-darkening. Of particular interest are effects of various concentrations of aluminum, phosphorus, fluorine, and boron on performance.

FIG. 1 illustrates the energy level diagram of ytterbium. The upper collection of energy levels $^2F_{5/2}$, indicated by reference numeral 100, has three sub-levels g, f and e represented by reference numerals 108, 107 and 106 respectively and lower collection of levels $^2/F_{7/2}$ indicated by reference numeral 101, has four sub-levels a, b, c and d represented by reference numerals 102, 103, 104 and 105. The absorption is illustrated with arrows with solid lines, while emission is illustrated with arrows with dotted lines.

Figure 2:
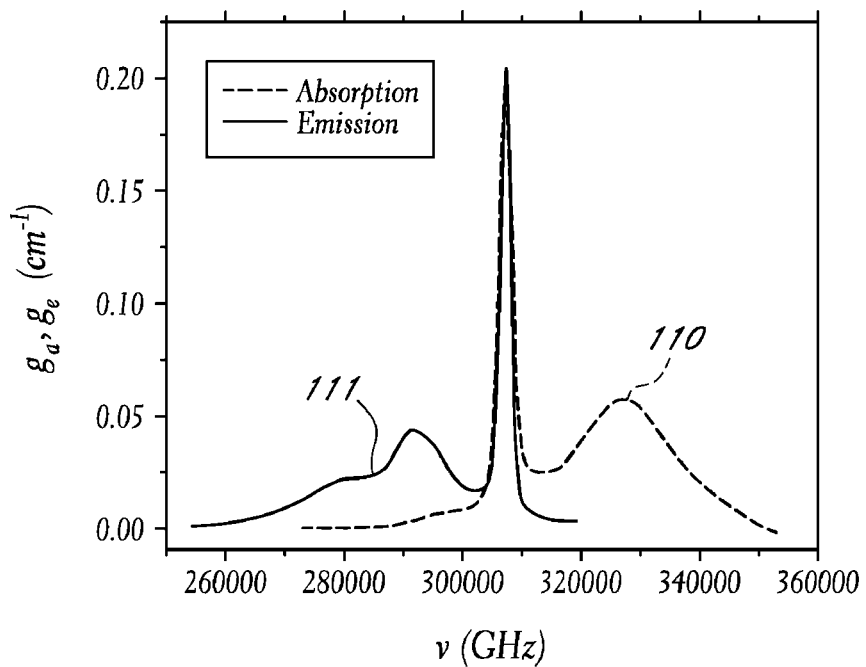
FIG. 2 illustrates Ytterbium absorption and emission in an alumino-silicate fiber.

FIG. 2 illustrates ytterbium absorption, curve 110, and emission, curve 111, in an aluminum-doped silica optical fiber.

Figure 3A:
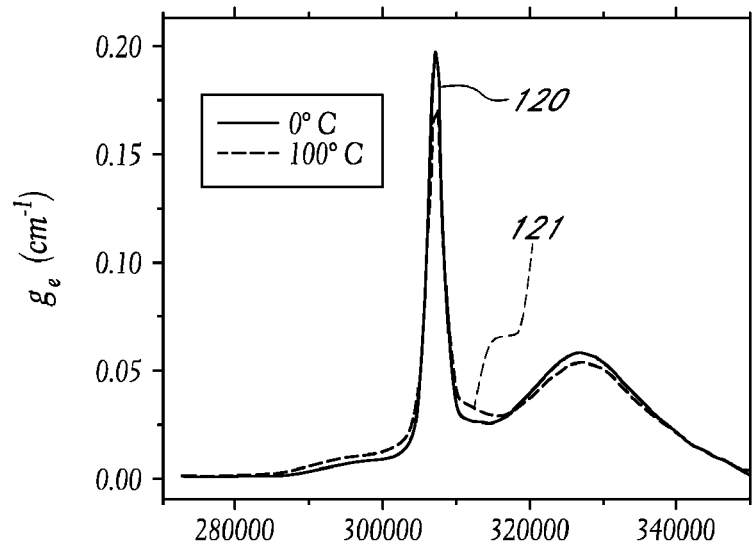
FIGS. 3A and 3B illustrate Ytterbium absorption and emission in an aluminosilicate fiber at two different temperatures.
Figure 3B:
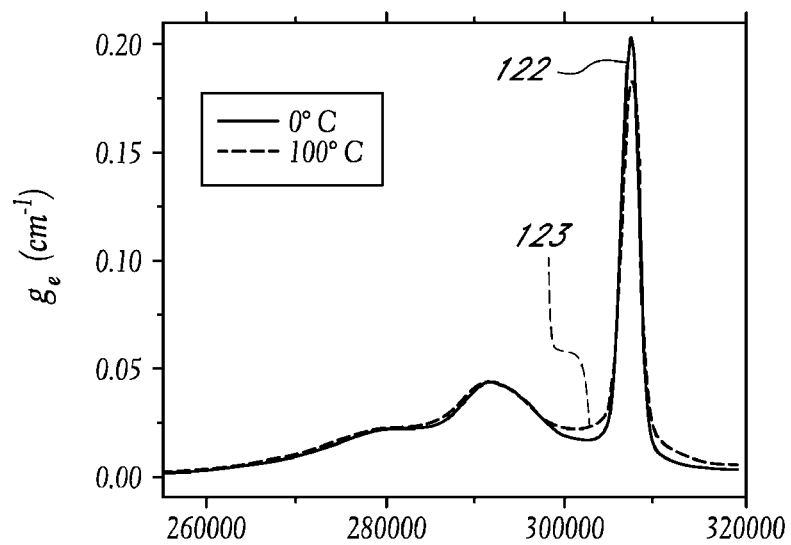

FIG. 3A illustrates absorption at 0 degree Celsius, curve 120, and 100 degree Celsius, curve 121, in an aluminum-doped silica optical fiber. FIG. 3B illustrates emission at 0 degree Celsius, curve 122, and 100 degree Celsius, curve 123, in an aluminum-doped silica optical fiber.

Figure 4:
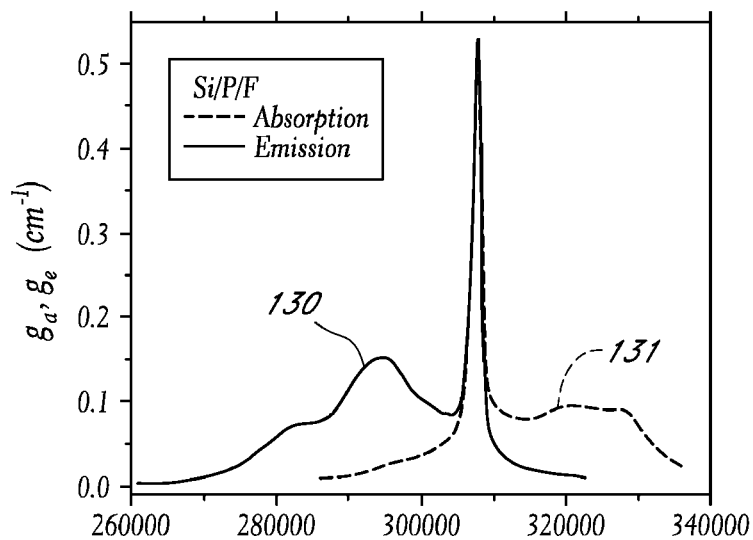
FIG. 4 illustrates Ytterbium absorption and emission in a phosphorus and fluorine doped silica fiber.

FIG. 4 illustrates ytterbium absorption, curve 131, and emission, curve 130, in a phosphorus and fluorine doped silica optical fiber.

Figure 5A:
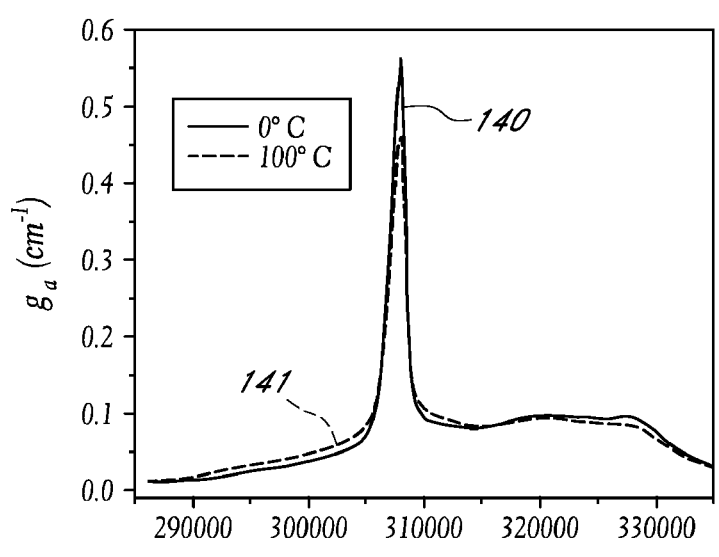
FIGS. 5A and 5B are plots illustrating Ytterbium absorption and emission in a phosphorus and fluorine doped silica fiber at two different temperatures.

FIG. 5A illustrates absorption at 0 degree Celsius, curve 140, and 100 degree Celsius, curve 141 in a phosphorus and fluorine doped silica optical fiber.

Figure 5B:
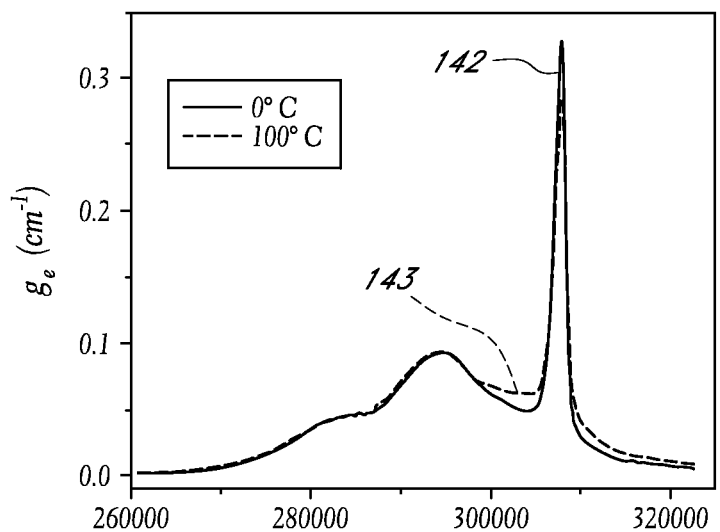

FIG. 5B illustrates emission at 0 degree Celsius, curve 142, and 100 degree Celsius, curve 143, in a phosphorus and fluorine doped silica optical fiber.

Figure 6:
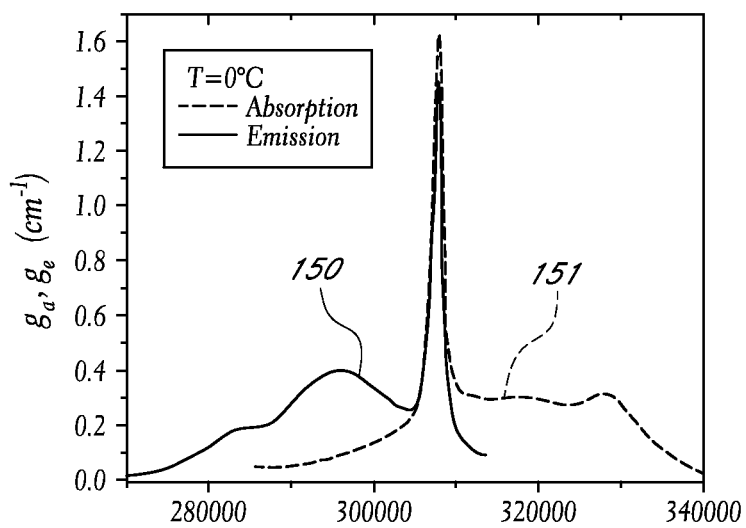
FIG. 6 illustrates ytterbium absorption and emission in a phosphorus doped silica fiber.

FIG. 6 illustrates ytterbium absorption, curve 151, and emission, curve 150, in a phosphorus-doped silica optical fiber.

Figure 7A:
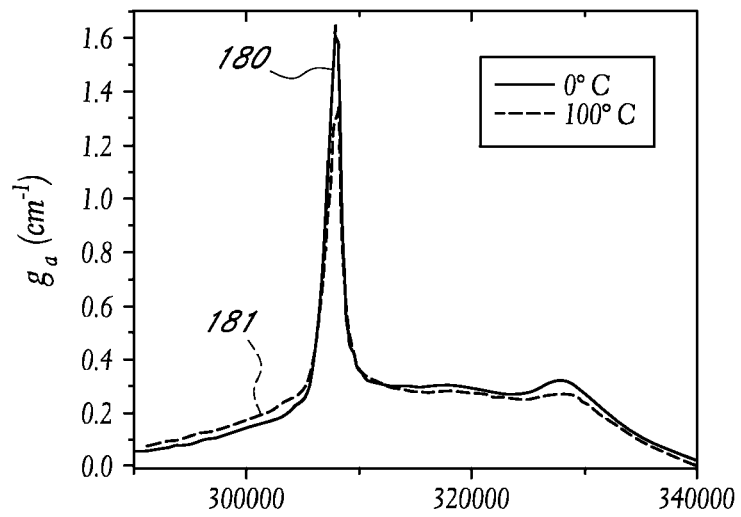
FIGS. 7A and 7B are plots illustrating ytterbium absorption and emission in a phosphorus doped silica fiber at two different temperatures.
Figure 7B:
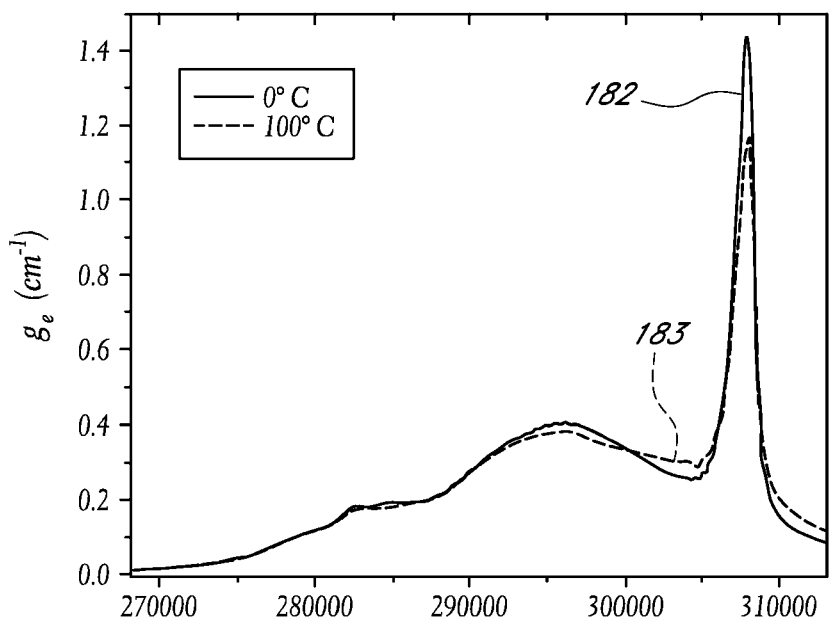

FIG. 7A illustrates absorption at 0 degree Celsius, curve 180, and 100 degree Celsius, curve 181 in a phosphorus-doped silica optical fiber. FIG. 7B illustrates emission at 0 degree Celsius, curve 182, and 100 degree Celsius, 183, in a phosphorus-doped silica optical fiber.

Figure 8:
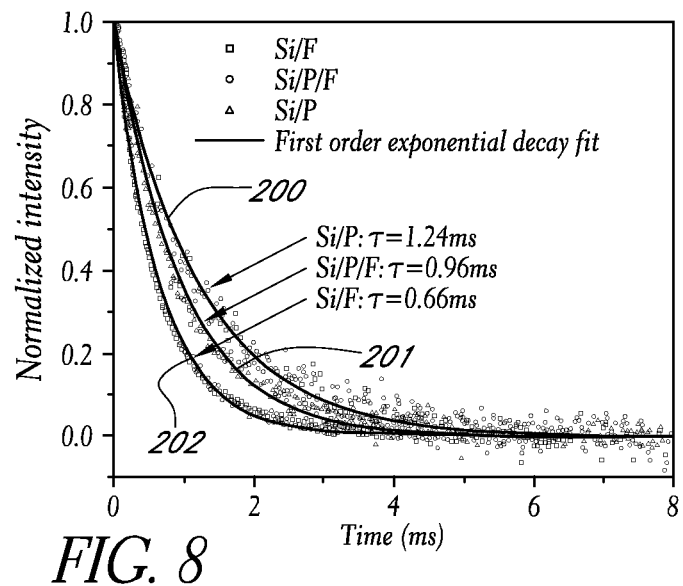
FIG. 8 is a plot illustrating lifetime measurements of fluorine-doped silica fiber, phosphorus and fluorine doped silica fiber and phosphorus-doped silica fiber.

FIG. 8 illustrates lifetime measurements of three fabricated fibers. Curve 200 is for a phosphorus-doped silica fiber, 201 is for a phosphorus and fluorine doped silica fiber and 202 is for fluorine doped silica fiber. The upper state lifetimes for the three fibers are 1.24 ms, 0.96 ms, 0.66 ms respectively, indicating a significant increase of lifetime with phosphorus doping.

Figure 9:
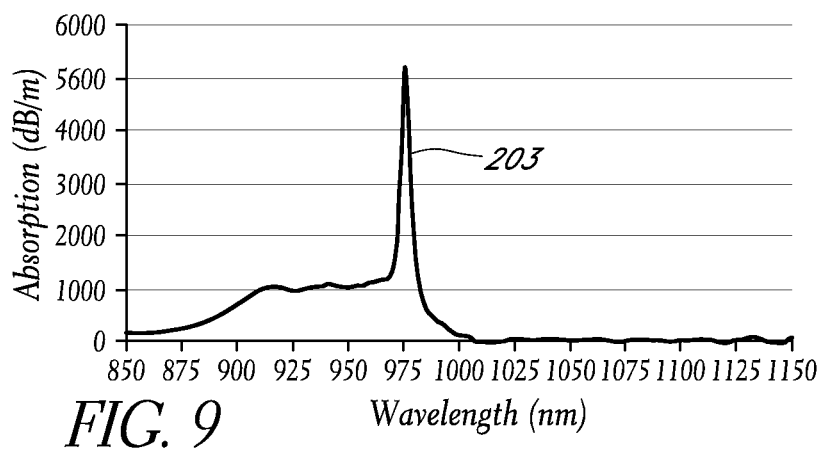
FIG. 9 is a plot illustrating absorption spectra of a highly doped ytterbium fiber containing alumina, phosphorus, boron and fluorine.

FIG. 9 illustrates high peak ytterbium absorption, curve 203, which can be obtained with a phosphosilicate gain fiber. In this case, the ytterbium doped silica fiber also contains phosphorus, fluorine, aluminum, and boron. In some embodiments, the absorption at the peak of 976 nm can be over 5000 dB/m in a phosphate glass. Higher absorption levels, for example approaching about 9000 dB/m, may be achievable in some embodiments. In this example the numerical aperture, NA, of the fiber is ~0.13.

TABLE 1

| Energy levels | k (cm$^{-1}$) | v (GHz) | hv (J) |
|---|---|---|---|
| g | 11689 | 350670 | 2.32357 × 10$^{-19}$ |
| f | 10909 | 327270 | 2.16852 × 10$^{-19}$ |
| e | 10239 | 307170 | 2.03533 × 10$^{-19}$ |
| d | 1365 | 40950 | 2.71338 × 10$^{-19}$ |
| c | 970 | 29100 | 1.92819 × 10$^{-20}$ |
| b | 492 | 14760 | 9.78009 × 10$^{-21}$ |
| a | 0 | 0 | 0 |

TABLE 2

| $g_{xy}$ (cm$^{-1}$) | v (GHz) | $g_{xy}^0$ (cm$^{-1}$) | Δv (GHz) |
|---|---|---|---|
| $g_{ea}$ | 307252 | 0.192159485 | 920.5 |
| $g_{eb}$ | 292402 | 0.043871515 | 7500 |
| $g_{ec}$ | 277252 | 0.012706458 | 6649.5 |
| $g_{fb}$ | 307107 | 0.191297102 | 4501 |
| $g_{fc}$ | 288122 | 0.048947606 | 3173.5 |
| $g_{ae}$ | 307214 | 0.200149915 | 1435 |
| $g_{af}$ | 326977 | 0.0622078 | 9912.5 |
| $g_{be}$ | 293291 | 0.032512969 | 4014 |
| $g_{bf}$ | 309164 | 0.162469284 | 7155 |

TABLE 3

| Energy levels | k (cm$^{-1}$) | v (GHz) | hv (J) |
|---|---|---|---|
| g | 10959 | 328770 | 2.17845E−19 |
| f | 10667 | 320010 | 2.12041E−19 |
| e | 10252 | 307560 | 2.03792E−19 |
| d | 1406 | 42180 | 2.79488E−20 |
| c | 821 | 24630 | 1.632E−20 |
| b | 425 | 12750 | 8.44825E−21 |
| a | 0 | 0 | 0 |

Tables 1-3 provide measurements of energy levels associated with various examples of doping configurations. The measured ytterbium energy levels for an aluminum-doped silica fiber is shown in Table 1, in three different units. Column 1 corresponds with the energy sub-levels as illustrated in FIG. 1. Column 2 is wavenumber (k) in cm$^{-1}$, Column 3 is peak frequency (v) in GHz, and Column 4 represent transition energy (hv) in J.

Table 2 illustrates each transition in Column 1, center peak of each transition in Column 2, strength of each transition in Column 3, and line width of each transition in Column 4. The results correspond to a phosphorus and fluorine doped silica fiber.

Measured ytterbium energy levels for a phosphorus-doped silica fiber are shown in Table 3, in three different units. Column 1 corresponds with the sub-levels as defined in FIG. 1. Column 2 is wavenumber in cm$^{-1}$, Column 3 is peak frequency in GHz, and Column 4 represents transition energy in J. A high concentration of ytterbium ions were provided, and low photo-darkening achieved. The results show that a phosphosilicate host also provides a longer upper state life time, a benefit for lower laser and gain thresholds, a higher emission cross section for potentially higher gain, a shorter gain peak wavelength, potential for a lower quantum defect, and a flatter absorption between 910 nm and 970 nm, offering potential for additional pump wavelengths.

As illustrated in FIG. 9, peak ytterbium absorption can exceed about 5000 dB/m in some cases. In some embodiments, absorption of a doped silica fiber is less than about 1000 dB/m, and can be at least an order less (in dB/m) than the peak ytterbium absorption as shown in FIG. 9. The high-level of Yb doping obtained with very low photo-darkening was a surprising benefit and an unexpected result.

In at least one embodiment a phosphosilicate gain fiber can preferably provide at least about 1000 dB/m pump absorption at a pump wavelength, and in some embodiments, may absorb at least about 1500 dB/m, and may exceed about 4000-5000 dB/m. Absorption may be in the range of about 3000 dB/m-5000 dB/m, and up to about 9000 dB/m. A fiber laser or amplifier utilizing a phosphosilicate gain fiber can provide for a substantial improvement in one or more of peak power, CW power, and repetition rate. Low photo-darkening levels are simultaneously achievable.

Therefore, a fiber laser or amplifier system comprising at least one phosphosilicate gain fiber may simultaneously provide a high figure of merit of scalability, while meeting or exceeding the reliability and lifetime specification of a conventional Yb (e.g. Yb doped in non-phosphosilicate glass) fiber lasers and/or amplifiers.

Fabricated Fiber Examples

Pump Absorption and Photo-Darkening Measurements

In various embodiments, fibers were fabricated with different concentrations of boron and aluminum in order to identify their effects on photo-darkening. The fibers properties are summarized in Table 4 below. Column 1 of Table 4 provides the identification of the different fibers. Column 2 provides the single mode cutoff wavelength for the different fibers. Column 3 provides the V-number for the different fibers. The boron flow rate and the aluminum concentration is provided in columns 4 and 5 respectively. Column 5 provides the cladding diameter of the different fibers. Column 6 provides the perform feed rate $V_f$ and the draw rate $V_d$ for the different fibers. Column 7 provides the temperature at which the fibers are drawn.

TABLE 4

| Fiber Draw ID | SM cutoff WL (μm) | V @ 0.688 μm | Boron rate (sccm) | Aluminum concentration (g/100 ml) | Cladding Diameter (mm) | Vf/Vd (mm/min)/(m/min) | Temp |
|---|---|---|---|---|---|---|---|
| 301 | 0.53 | 1.85 | 40 | 12 | 125 | 1.4/50.5 | 2100 |
| 302 | 0.57 | 1.99 | 40 | 18 | 125 | 1.4/53 | 2100 |
| 303 | 0.73 | 2.55 | 0 | 24 | 125 | 1.4/47 | 2100 |
| 304 | 0.71 ± 0.06 | 2.48 | 0 | 12 | 125 | 1.4/47 | 2100 |
| 305 | 0.48 | 1.68 | 0 | 18 | 125 | 1.4/ | 2100 |

Notes for Table 4: 3.6 g Yb/100 ml doping solution, consolidation temperature is 1200 C.

In some embodiments, all fibers were made with the same ytterbium concentration in the solution, 3.6 g YbCl$_3$.6H$_2$O in 100 ml of distilled water, and the same consolidation temperature of 1200 degree Celsius. Boron flow of 40 sccm (standard cubic centimeter per minute)) was turned on for fibers 301 and 302, and turned off for fibers 303, 304, and 305. Aluminum concentrations in the solution were 12 g AlCl$_3$ in 100 ml water for fiber 301, 18 g for fiber 302, 24 g for fiber 303, 12 g for fiber 304, and 18 g for fiber 305. Measured ytterbium absorption at 976 nm was 1600 dB/m for all fibers. A small length of the ytterbium doped fiber of ~3 cm was continuously pumped at ~976 nm with over 100 mW of power.

In this example, the choice of pump power provided a maximum inversion of ~50% at this pump wavelength (approximately 976 nm). In various embodiments, pump power may be chosen to provide a desired inversion level, because in various embodiments, photo-darkening can depend on inversion. In some embodiments, an LED centered at about 674 nm and FWHM of 8 nm was used as probe to continuously monitor the fiber transmission and to determine photo-darkening loss. Various band pass filters were used in the beam path of the probe and pump to provide isolation in respective power detections.

Figure 10:
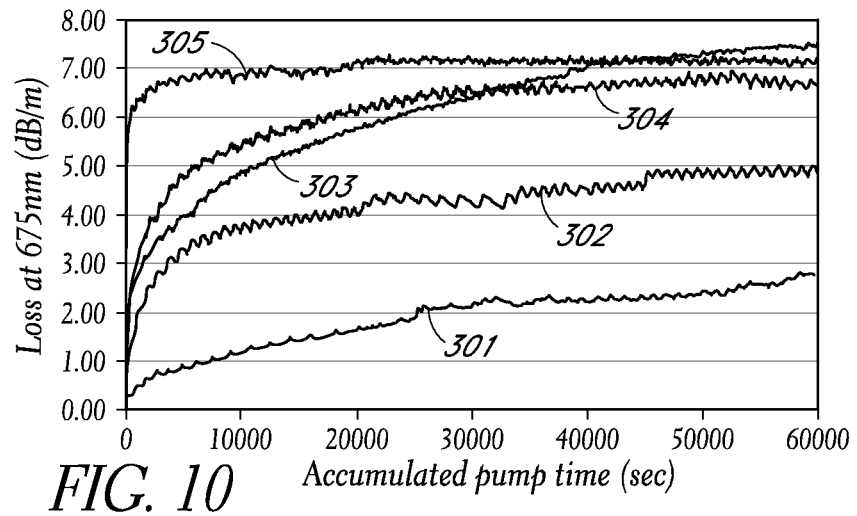
FIG. 10 is a plot illustrating an example of photo-darkening measurements in ytterbium doped fibers with various compositions.

FIG. 10 illustrates the photo-darkening loss measured at the probe wavelength for all the fibers 301 to 305 listed in Table 4. Curve 301 corresponds to fiber 301 with low aluminum concentration and some boron gives the lowest photo-darkening. An increase of aluminum level in fiber 302, gives slightly higher level of photo-darkening as shown by curve 302. Fibers 303, 304 and 305 without boron have similar but higher photo-darkening as illustrated by curves 303, 304 and 305. All drawing parameters, including preform feed rate, V$_f$ and draw rate V$_d$ are also given in Table 4.

FIG. 10 shows that the photo-darkening loss initially increases with accumulated pump time and then tends to level out at a saturated value for larger values of accumulated pump time. For example, the saturated value of photo-darkening loss for the curve 305 is about 7 dB/m. The saturated value of the photo-darkening loss can be estimated, from curves such as, e.g., those illustrated in FIG. 10 (see, also, FIGS. 11-12), as an asymptotic value of the photo-darkening loss as a function of accumulated pump time. In some cases shown in FIG. 10 (e.g., the curve 301), the photo-darkening loss of the fiber apparently had not reached the saturated value by the end of the measurement (e.g., by 60,000 sec of accumulated pump time). For such cases, the saturated value can be estimated from experimental data (such as, e.g., the curves shown in FIGS. 10-12) using numerical and/or analytical techniques to determine an asymptotic or plateau value for the data. In some cases, a saturated value of the photo-darkening loss is measured (or estimated) at a probe wavelength (e.g., 675 nm) or over a probe wavelength range, and a saturated value of the photo-darkening loss at another wavelength (or wavelength range) is determined based at least in part on the measured photo-darkening data (e.g., using extrapolation techniques). In some cases, the saturated value of the photo-darkening loss at an emission wavelength of the fiber (e.g., about 1.05 µm) is estimated using the probe wavelength data.

Figure 11:
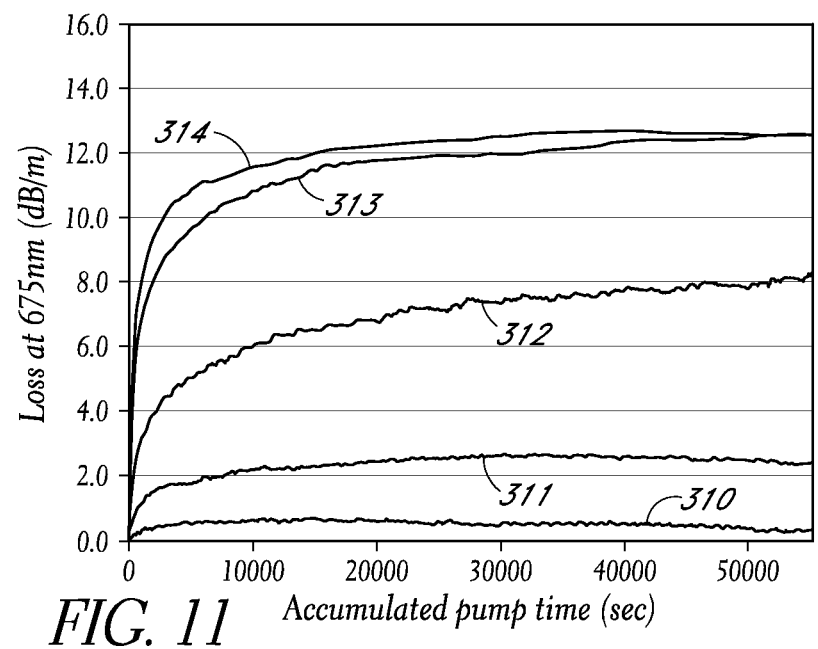
FIG. 11 is a plot illustrating an example of photo-darkening measurements in ytterbium doped fibers with various drawing conditions from the preform.

In order to determine the effect of various drawing conditions on photo-darkening, a preform was drawn into fibers at various drawing conditions. The various drawings conditions and the properties of the different fibers are summarized in Table 5 below and test results are shown in FIG. 11. Curves 310 through 314 illustrated in FIG. 11 correspond to fibers 310 through 314 listed in Table 5.

TABLE 5

| Fiber Draw ID | SM cutoff WL (µm) | V @ 0.688 µm | Boron rate (sccm) | Aluminum concentration (g/100 ml) | Cladding Diameter (mm) | Vd (m/min) | Temp |
|---|---|---|---|---|---|---|---|
| 310 | 0.71 ± 0.06 | 2.48 | 0 | 12 | 125 | 8 | 2100 |
| 311 | 0.71 ± 0.06 | 2.48 | 0 | 18 | 125 | 70 | 2200 |
| 312 | 0.71 ± 0.06 | 2.48 | 0 | 24 | 125 | 47 | 2100 |
| 313 | 0.71 ± 0.06 | 2.48 | 0 | 12 | 125 | 34 | 1950 |
| 314 | 0.71 ± 0.06 | 2.48 | 0 | 18 | 125 | 135 | 2100 |

Notes for Table 5: 3.6 g Yb/100 ml doping solution, consolidation temperature is 1200 C.

It can be seen from Table 5 and FIG. 11 that in some embodiments, a lower drawing rate and a higher drawing temperature favors a low level of photo-darkening. A significant reduction, over an order of magnitude in some cases, of photo-darkening can be achieved by controlling drawing conditions.

Figure 12:
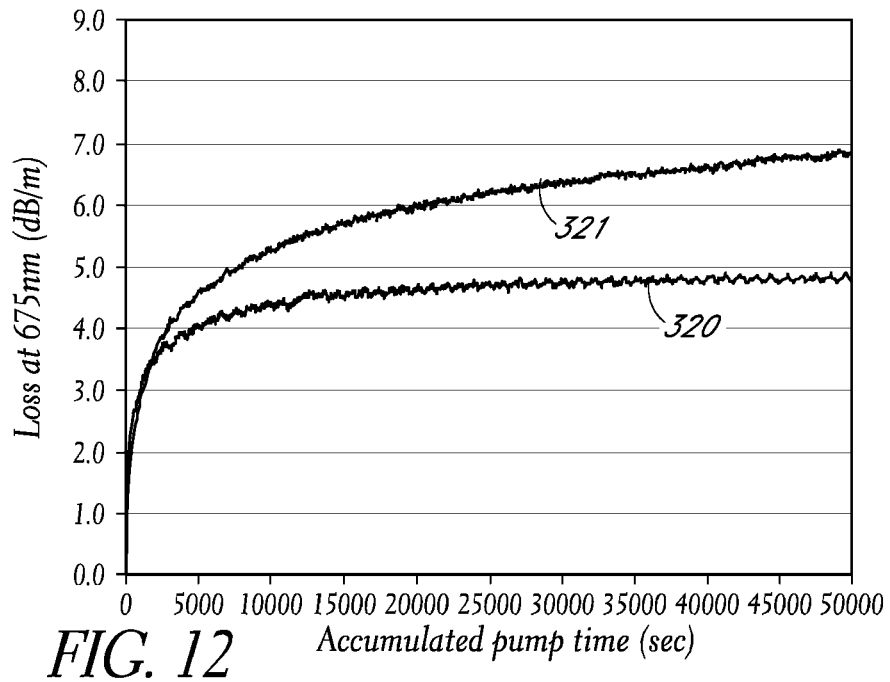
FIG. 12 is a plot illustrating example photo-darkening measurements in an ytterbium doped fiber at various temperatures.
Figure 13:
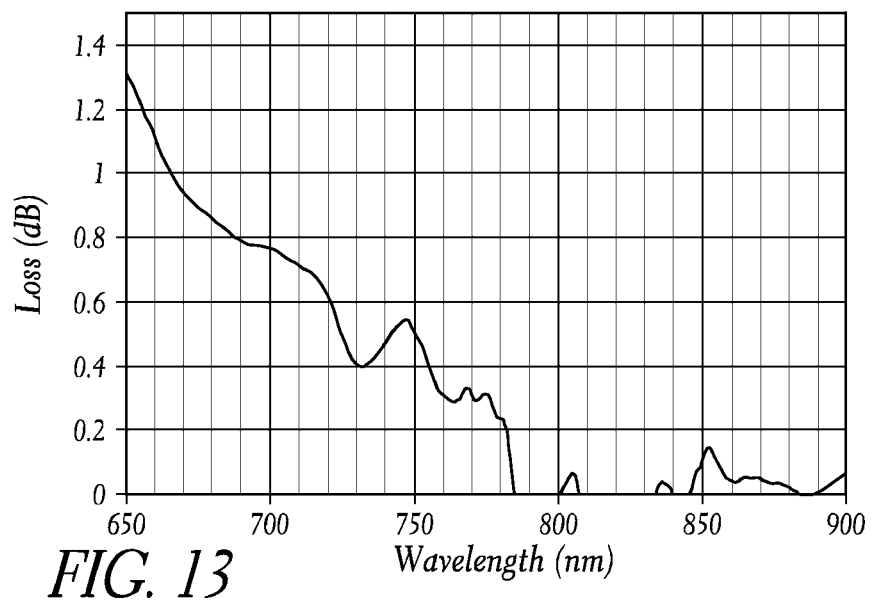
FIG. 13 is a plot illustrating an example spectrum associated with photo-darkening induced absorption.

Photo-darkening at various fiber temperatures were also studied using fiber 313 described in Table 5. The results are shown in FIG. 12. Curves 320 and 321 are for temperatures of 113 and 22 degrees Celsius, respectively. There is a weak dependence on temperature with slightly lower photo-darkening at higher temperature. This may be beneficial for high average power fiber lasers, where core temperature is expected to be higher than the ambient temperature. The spectrum of photo-darkening loss was also measured and is shown in FIG. 13. The spectrum was measured for the fiber 313 at the temperature of 22 Celsius. The loss at ~1 µm is substantially smaller than that at the probe wavelength in this example.

As an example, in various embodiments a loss caused by photo-darkening may be less than about 10 dB/m at an emission wavelength (e.g. 1.05 µm), and with peak absorption of at least about 1000 dB/m at a pump wavelength (e.g., 0.976 µm). In some examples, the low photo-darkening is obtained during operation at high pump power, and at a high inversion level. Some embodiments comprise an optical fiber having a highly rare earth doped glass comprising silica, phosphorus, and aluminum. In various embodiments, the pump wavelength may be in a range from approximately 0.9 µm to approximately 1.0 µm. In some embodiments, the pump wavelength may be in a range from approximately 0.91 µm to approximately 0.99 µm. In some embodiments, the pump wavelength may be in a range from about 0.97 µm to about 1.03 µm. In some embodiments, the emission wavelength may be in a range from approximately 0.95 µm to approximately 1.2 µm. In some embodiments, the emission wavelength may be in a range from approximately 1.0 µm to approximately 1.1 µm. In other embodiments, the saturated value of the photo-darkening loss at the emission wavelength may be less than about 1 dB/m, less than about 5 dB/m, less than about 15 dB/m, less than about 20 dB/m, or less than about 30 dB/m. Other values for the saturated photo-darkening loss are possible in other embodiments of the fiber.

In various embodiments providing reduced photo-darkening, an optical fiber may comprise an aluminum concentration of about 0.5-15 mol %, and less than about 30 mol % boron. In some embodiments boron may be excluded, or a very small concentration of boron utilized, for example 0.01 mol % to 1 mol %. In some embodiments, the optical fiber can comprise 1-10 mol % aluminum, 5-25 mol % boron, and preferably 5-10 mol % aluminum and 5-15 mol % boron. Drawing conditions range from approximately 1900 to 2200 degree Celsius and drawing rate being less than approximately 50 m/min. In various embodiments, the preferred range for the drawing temperature can be approximately 2000-2150 degree Celsius and a drawing rate of less than approximately 10 m/mins.

Disclosed herein are various embodiments of a phosphosilicate fiber which may comprise 10-30 mol % of phosphorus, less than about 25 mol % of boron, 0.5-15 mol aluminum, and may further comprise about 0.01-15 mol % of ytterbium.

In some embodiments disclosed herein, a highly rare-earth doped fiber may comprise a phosphosilicate glass, and the phosphosilicate glass may comprise at least about 10 mol % $P_2O_5$.

Various embodiments disclosed herein may comprise, an optical fiber, comprising: silica; a rare-earth dopant concentration of at least about 0.5 mol %; and phosphorus, said fiber may be configured in such a way that a photo-darkening loss is no greater than about 10 dB/m at an emission wavelength during operation of said fiber at a high pump power and a high inversion level.

The examples above illustrate highly rare-earth doped ytterbium fibers. In some embodiments other rare-earth dopants may be utilized, and provide for other emission wavelengths. A few examples include: a fiber having about 0.01-15 mol % ytterbium, about 0.001-2 mol % erbium, about 0.01-15 mol % ytterbium and about 0.001-1 mol % erbium, about 0.01-15 mol % thulium.

Example Laser and Amplifer Embodiments

Phosphosilicate gain fibers may be utilized in laser amplifiers, fibers lasers, or combinations thereof. The gain fibers may also be used in systems incorporating any combination of gain-switched, Q-switched, or mode-locked laser configurations. For example, a portion of a high peak power laser system may include an embodiment having a highly rare-earth doped phosphosilicate gain fiber as a portion of a seed source for a bulk amplifier, wherein the seed source energy is at least 10 µJ, or at least 100 µJ. In various embodiments the gain fibers may be utilized in fiber amplifier systems producing output pulses having pulse widths in the range of about 100 fs-100 ps, 100 fs to a few nanoseconds, 10 ps to a few nanoseconds, 10 ps to 100 ns, or various other ranges. The gain fibers may be utilized in systems having frequency converters, for examples frequency doublers, triplers, quadruplers, quintuplers, in multicolor fiber laser configurations, configured alone or in combination with any type of frequency shifter, including Raman shifters.

In some of the example embodiments that follow a highly doped fiber having a reduced length relative to a conventional ytterbium fiber (e.g. Yb doped in non-phosphosilicate glass) is generally preferred. For example, various embodiments may utilize at least one phosphosilicate fiber. Increased peak power and/or pulse energy are obtainable with such fibers. However, in various applications of fiber laser and amplifiers, such an increase may not be always desired, and reduced doping, or conventional ytterbium fibers (e.g. Yb doped in phosphosilicate glass) may be suitable for achieving adequate performance with at least some of the following implementations.

Certain embodiments that follow may utilize a large-core phophosilicate fiber as a gain medium, for example an LCF having a composition as set forth above, and a fiber length in the range of about a few cm to several meters, for example about 5 cm to 10 m. A fiber length may be selected to provide any suitable combination of peak power, average power, pulse energy, and repetition rate. For example, a very short length of fiber may be used to form a multi-GHz fiber oscillator providing higher pulse energy than obtainable with the use of a silica gain fiber.

Figure 14:
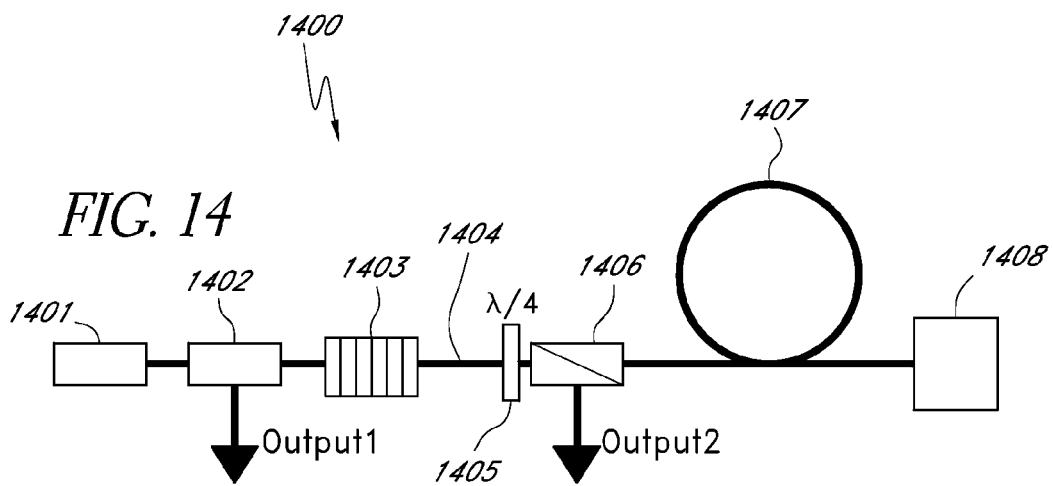
FIG. 14 schematically illustrates an embodiment of a twisted cavity passively mode-locked fiber laser.

FIG. 14 represents an embodiment showing a Fabry-Perot fiber laser cavity 1400. The fiber laser is pumped with a laser pump 1401 (e.g. single-mode diode laser pump) which is coupled to the cavity via wavelength division multiplexing coupler 1402. A chirped grating 1403 (e.g. a chirped fiber Bragg grating) serves as the first end mirror of the Fabry-Perot cavity. In some embodiments, the fiber grating 1403 can provide dispersion control. In some embodiments, the fiber grating 1403 produces negative dispersion. In some embodiments, the grating dispersion is preferably chosen to be large compared to the dispersion of the other cavity components in order to provide the oscillation of soliton pulses inside the cavity, as also discussed in U.S. Pat. No. 5,450,427 to Fermann et al, which is incorporated herein by reference in its entirety for the subject matter specifically referred to herein and for all other subject matter it discloses. A doped fiber 1404 (e.g. a phosphosilicate Yb doped fiber) is provided as the gain medium, with a sufficiently high Yb doping level to provide high pump absorption, for example peak absorption of at least about 600 dB/m, 1800 dB/m, or higher at a pump laser diode peak wavelength (e.g.: 976 nm). In various embodiments, the fiber grating 1403 and the doped fiber 1404 are non-polarization maintaining. The cavity can be completed with a quarter wave plate 1405, an intra-cavity polarization beam splitter (PBS) 1406 and a length of polarization maintaining (PM) undoped fiber 1407. In various embodiments, the undoped fiber can be standard PM fiber, a low-nonlinearity PM fiber including but not limited to large-core fibers or fibers with holes or spaces comprising air, etc. Other types of fiber can also be used. The second cavity mirror includes a semiconductor saturable absorber mirror (SA) 1408, as for example discussed in U.S. Pat. No. 7,088,756 to Fermann et al., which is incorporated herein by reference in its entirety for the subject matter specifically referred to herein and for all other subject matter it discloses.

In some embodiments, an optional polarizer (not shown) can be inserted in front of the SA 1408, aligned with one of the axes of the polarization maintaining fiber 1407. Although FIG. 14 illustrates that the SA mirror 1408 is directly butt-coupled to the undoped fiber 1407, collimation and focusing lenses can also be included between the undoped fiber 1407 and the SA 1408 to adjust the spot size on the SA 1408. As shown in FIG. 14, there are two possible outputs for this embodiment of the laser, e.g., Output 1 and Output 2. In some embodiments, Output 2 is preferable. The output from Output 2 can be adjusted by adjusting the quarter-wave plate. Output 1 is determined by the reflectivity of the chirped fiber grating 1403. In some embodiments, Output 1 can be minimized by implementing high reflectivity fiber gratings. Numerous other configurations are possible, including integrated designs having no bulk optical polarizing or non-polarizing components, for example as described in U.S. Pat. No. 6,072,811 to Fermann, et al., which is incorporated herein by reference in its entirety for the subject matter specifically referred to herein and for all other subject matter it discloses. In various embodiments, Output 1 can be obtained in fiber form by coupling the Output 1 into an optical fiber. In various embodiments, such configurations can be embodied using standard all-fiber wavelength division multiplexing couplers.

The cavity design illustrated in FIG. 14 can be referred to as a twisted cavity. The light passing the PBS 1406 from the left is linearly polarized and the quarter wave-plate 1405 is then used to transfer the polarization state to an elliptical polarization state after reflection from the chirped grating 1403, which allows for output coupling at the PBS 1406, producing Output 2. Environmental stability of the whole arrangement can be provided, since the combined length of the doped non-PM fiber 1404 and non-PM fiber grating 1403 can be as short as a few cm with appropriate highly doped Yb fibers. The twisted cavity as described herein has at least three beneficial features. For example, a first advantage is that by adjusting the quarter-wave plate 1405 to produce a large level of output coupling (e.g., >50%) one can construct relatively long cavities that allow for the oscillation of high energy pulses. This follows, since high energy pulses are only present in the short length of doped fiber, whereas in the long undoped fiber, the pulse energy is low. Another advantage of the twisted cavity design is that PM to PM splices are completely eliminated in the system, which may minimize coherent interactions between the two polarization axes of the undoped fiber 1407, e.g., when the group velocity walk-off length between the two polarization axes becomes comparable to the pulse width, coherent polarization interactions can produce fluctuations in laser output power, as for example also discussed in U.S. Pat. No. 7,088,756 to Fermann et al., which is incorporated herein by reference in its entirety for the subject matter specifically referred to herein and for all other subject matter it discloses. A third advantage of the twisted cavity design is that by selecting a short length of doped fiber inside the cavity, any nonlinear interaction between the pulses and the doped fiber can be minimized. As a result, near bandwidth-limited pulses or slightly negatively chirped pulses can be extracted from the polarization beam splitter at Output 2. In contrast the pulses that are transmitted through the fiber grating and extracted as Output 1 can be positively chirped and are about a factor of two away from the bandwidth limited, as further explained below.

In one embodiment of the twisted cavity, the chirped fiber grating 1403 can have a dispersion of $-20$ $ps^2$, a center wavelength of 1037 nm and a bandwidth of 0.20 nm; the doped fiber peak absorption can be approximately 3600 dB/m, and the gain fiber can be about 10 cm in length. The undoped fiber length 1407 can be approximately 10 m. All fibers can be single-mode and can have core diameters of 6-7 μm. In various embodiments, other lengths and types of fibers can also be used. At the repetition rate of 10 MHz, the oscillator can generate 10 ps bandwidth-limited pulses having a pulse energy of up to 3 nJ. In some embodiments, larger pulse energies can be obtained by incorporating low nonlinearity fibers, for example fibers with larger core diameters. For example, in some embodiments, pulses having a pulse energy of approximately 30 nJ could be obtained for approximately 10 ps near-bandwidth-limited pulses at a repetition rate of approximately 3 MHz when the undoped fiber 1407 is replaced with an approximately 30 m length of undoped PM leakage channel fiber in place of 1407 with a mode area of approximately 1500 μm². Various embodiments of the twisted cavity design can provide picosecond pulse generation at repetition rates between approximately 1 MHz-20 MHz with corresponding undoped fiber having lengths between approximately 100 m-approximately 5 m. In various embodiments, pulses at lower repetition rates can be generated by using longer lengths of undoped fiber 1407.

Figure 14A:
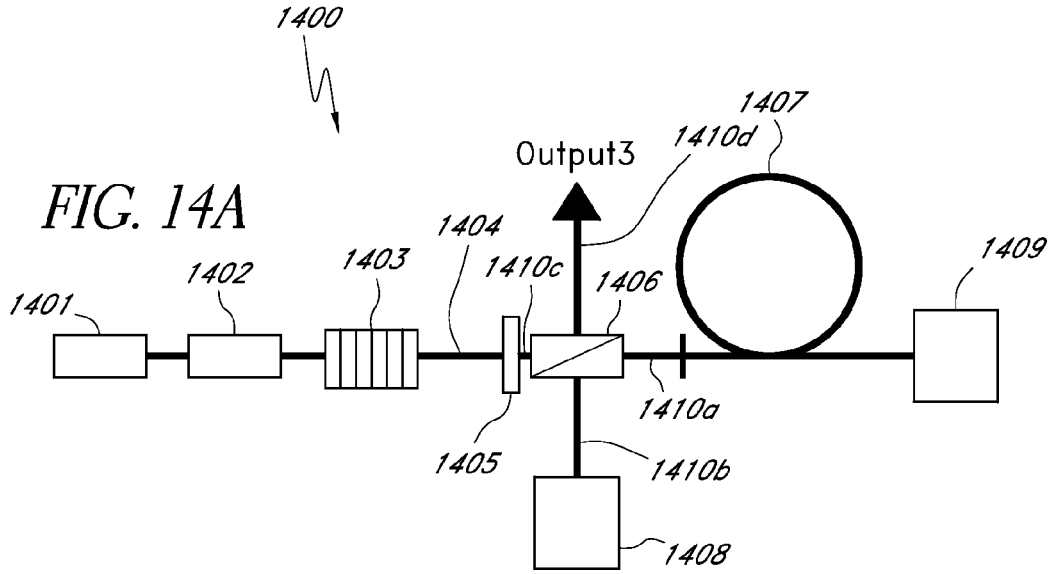
FIG. 14A schematically illustrates an embodiment of a double-twisted cavity passively mode-locked fiber laser.

FIG. 14A illustrates another embodiment of a Fabry-Perot fiber laser cavity 1400. The embodiment illustrated in FIG. 14A can also be referred to as a double-twisted cavity design. The laser cavity illustrated in FIG. 14A comprises a polarization rotator (e.g. a Faraday rotator mirror) 1409 which is coupled to one end of undoped fiber 1407. The polarization rotator 1409 rotates the polarization state by 90 degrees in retro-reflection. As a result, the oscillating light being reflected from the polarization rotator is directed toward the saturable absorber 1408 which is coupled to the PBS 1406. After reflection from the saturable absorber 1408, light propagates through the undoped fiber 1407 toward the polarization rotator 1409 and after a second reflection from the polarization rotator 1409 propagates through the undoped fiber 1407 toward the doped fiber 1404. Thus, light propagates through the undoped fiber 1407 four times every round-trip through the cavity. Such a cavity design can be advantageous in the construction of low repetition rate mode locked oscillators, for example, oscillators operating at repetition rates between 100 kHz to 10 MHz and preferably in the range from 500 kHz to 5 MHz. Since, light propagates through the undoped fiber 1407 four times every round trip through the cavity, a shorter length of the undoped fiber 1407 can be used. For example, for a cavity operating at a repetition rate of 1 MHz, the length of the undoped fiber 1407 can be approximately 50 m. In various embodiments, the undoped fiber 1407 can be constructed from low-nonlinearity fiber including but not limited to large core fiber, photonic crystal or leakage channel fiber, fibers with holes or spaces comprising air, etc. to obtain possibly higher pulse energies. The above described low nonlinearity fibers could be more expensive. Since the double-cavity twisted design utilizes a shorter length of the undoped fiber 1407, it may be advantageous to use the double-cavity twisted design in those embodiments where the undoped fiber 1407 comprises the above described low nonlinearity fibers. In various embodiments, the polarization rotator 1409 can reduce or substantially prevent polarization drifts and thus allow the use of non-polarization maintaining fiber inside the cavity. Accordingly, the fibers 1410a-1410d coupled to the four ports of the PBS 1406 can comprise single-mode fiber thereby allowing for ease in manufacturing. In various embodiments, the single-mode fiber 1410a and the undoped fiber 1407 can joined by using splicing or tapering techniques such that fiber laser cavity is compact and/or is easy to manufacture.

Figure 15:
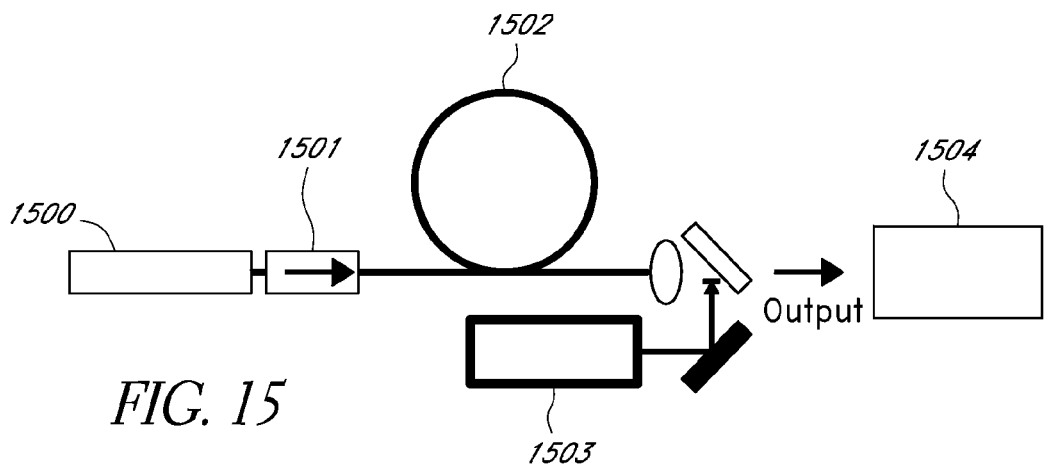
FIG. 15 schematically illustrates an embodiment of a high energy picosecond (ps) fiber laser system.
Figure 16:
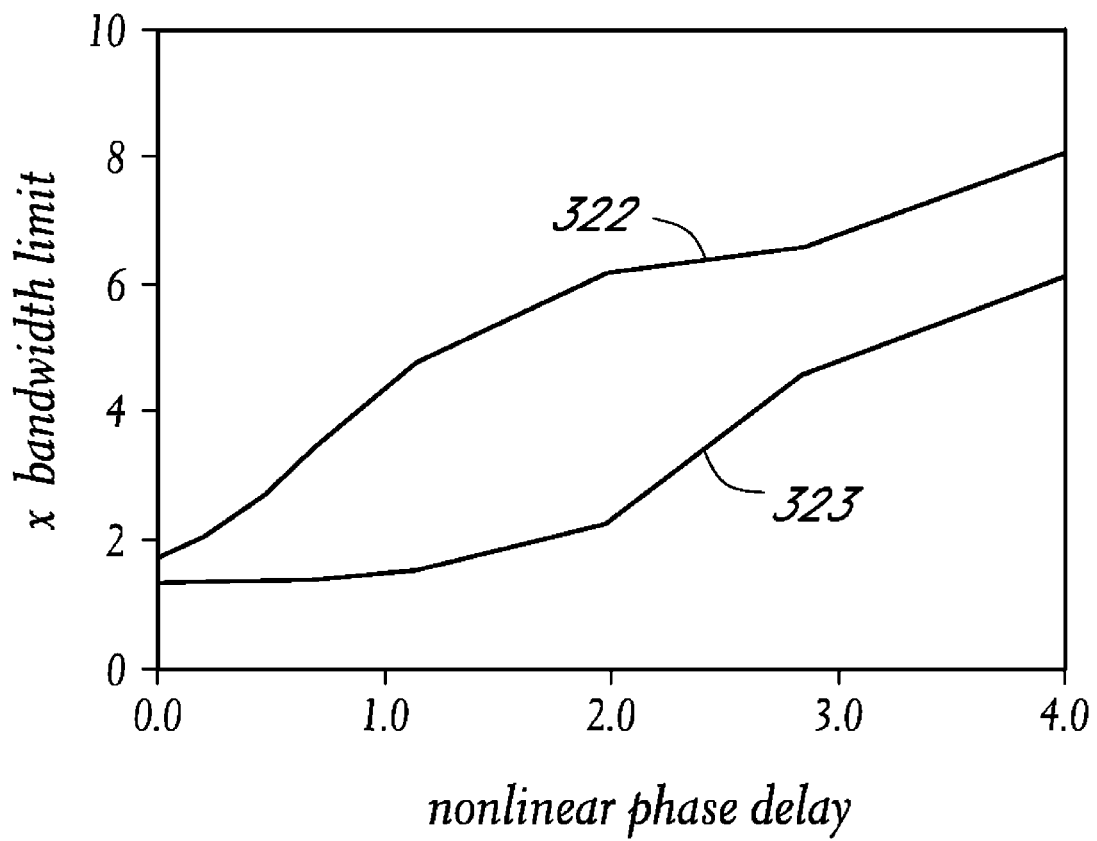
FIG. 16 is a plot illustrating bandwidth broadening in an embodiment of a ps fiber amplifier system.

The oscillator as described herein can be incorporated as the front end of a high power ps amplifier as shown in FIG. 15. For example, oscillator 1500 can be similar to the oscillator described with respect to FIG. 14. In the embodiment illustrated in FIG. 15, the oscillator is isolated from a gain fiber 1502 the Yb-doped gain fiber by an isolator 1501. In some embodiments the gain fiber 1502 may comprise an ytterbium doped phosphosilicate fiber. In some embodiments, the gain fiber 1502 may comprise a large core fiber such as a leakage channel fiber. In one implementation of the embodiment, the gain fiber 1502 had a length of approximately 5 m and provided approximately 1200 dB/m peak absorption. In various embodiments, a multi-element frequency conversion stage 1504 can be provided after amplification in the Yb fiber 1502 for frequency tripling, quadrupling and quintupling. In some embodiments, the frequency conversion stage 1504 can receive a pump signal from the pump source 1503. The amount of frequency broadening for a single pulse in the fiber amplifier as a function of nonlinear phase delay in the amplifier fiber is shown in FIG. 16. Here the top curve 322 represents the amount of broadening incurred when taking the oscillator output at Output 1 and the bottom curve 323 represents the amount of broadening incurred when taking the oscillator output at Output 2. In some embodiments, a nonlinear phase delay inside the fiber of smaller than $\pi$ can be incurred. Taking the output at Output 2 can produce 3-4 times narrower pulse spectra compared to taking the output at Output 1. Since frequency tripling is most efficient with near bandwidth-limited pulses, it is moreover advantageous to reduce the nonlinear phase delay inside the fiber amplifier to less than $\pi$. In some embodiments of a soliton fiber laser, where the dominant dispersion is contributed by the fiber grating it is optimum to minimize the intra-cavity propagation length between the points where the signal pulse is reflected from the grating and where the signal pulse is extracted from the output coupler. In some embodiments, this length is referred to as extraction length. In some embodiments, the pulse quality can be poor when the extraction length corresponds to the intra-cavity round-trip length. In some embodiments, the extraction length is less than half the intra-cavity round-trip length and preferably less than one quarter of the intra-cavity round-trip length.

Figure 17:
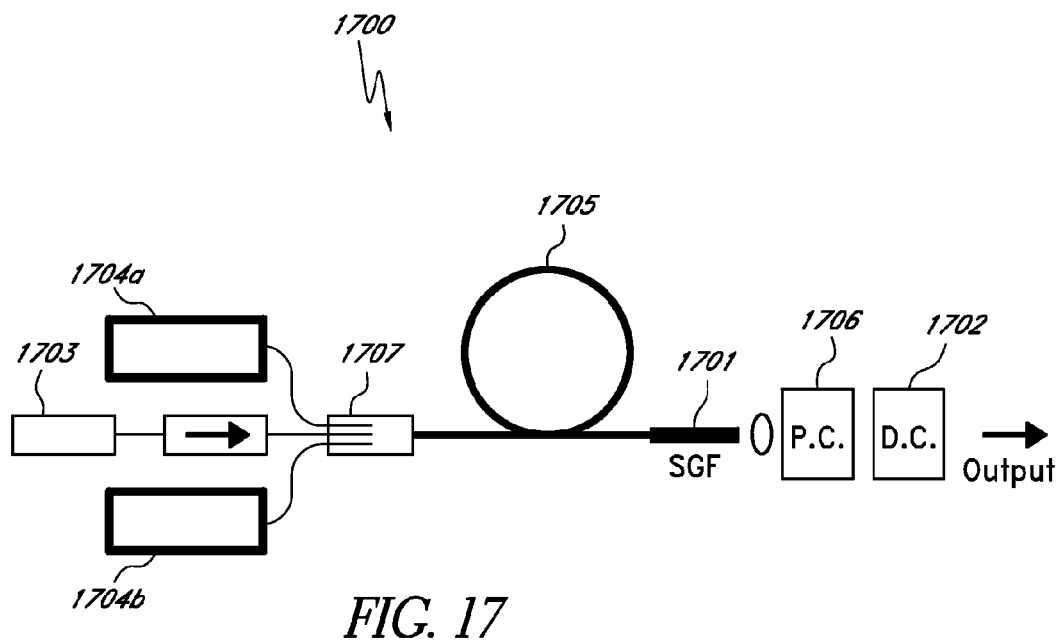
FIG. 17 schematically illustrates an embodiment of a high energy short pulse fiber laser system using a ps fiber laser seed source coupled to one or more stress guided fibers, the example arrangement providing a configuration for nonlinear frequency broadening and pulse compression.

FIG. 17 represents an example embodiment 1700 showing a fiber ps amplification system, where nonlinear spectral broadening in a stress guided fiber (SGF) 1701 and subsequent dispersion compensation (D.C.) 1702 is used for pulse compression. The embodiment illustrated in FIG. 17 also comprises a seed source 1703 and one or more pump sources 1704a and 1704b. The output from the seed source 1703 and the one or more pump sources 1704a and 1704b are coupled into a gain fiber 1705. In some embodiments, the gain fiber 1705 may comprise an ytterbium doped phosphosilicate fiber. In some embodiments, a polarization controller (P.C.) 1706 may be provided to the system.

Figure 17A:
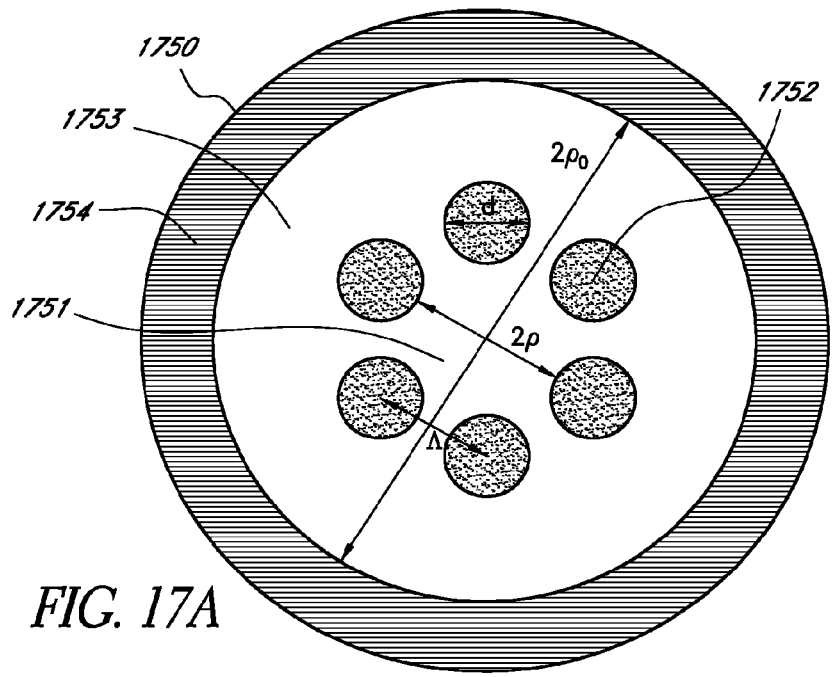
FIG. 17A schematically illustrates an embodiment of a leakage channel fiber (LCF), which may be configured in such a way to guide a mode using stress-optic effect.

Stress guided fibers and various examples are described in PCT international application no. PCT/US2008/074668, entitled "Glass Large-Core Optical Fibers, filed Aug. 28, 2008, in at least paragraphs [0205]-[0221] and corresponding FIGS. 28-30, which are incorporated herein by reference in its entirety for the subject matter specifically referred to herein and for all other subject matter it discloses. Stress guidance generally arises from localized variations in index of refraction as a result of different thermal properties. An end view of a leakage channel fiber is illustrated in FIG. 17A. For example, in a leakage channel fiber variations in the index of the features 1752 and the first cladding material 1753 may occur. In some embodiments index modulation is tailored as a function of the size and/or spacing of various cladding features, and thermal expansion coefficients of the materials. With index modulation a mode may be guided within a portion of the core region 1751, and an output beam may be emitted having a mode size which has a dimension substantially smaller than the a core dimension $2\rho$. Further discussion of stress guided fibers and examples are included below.

The amplification system of FIG. 17 is constructed as discussed with respect to FIG. 15. In the embodiment 1700 illustrated in FIG. 17, a star-coupler 1707 can be used to deliver the pump and signal light into the fiber amplifier. The use of star-couplers, and other couplers was described, for example in U.S. Pat. No. 7,016,573 to Dong et al., which is incorporated by reference herein in its entirety for the subject matter specifically referred to herein and for all other subject matter it discloses. The use of star-couplers with leakage channel fibers may be advantageous in some implementations, since a near diffraction-limited output may be obtained without matching the mode size in the signal arm of the star-couplers to the mode size in the leakage channel fiber. The use of a star-coupler may allow for an all-fiber pump arrangement. In some embodiments other types of couplers may be used.

In some embodiments, a truly single-mode fiber or a near single mode fiber (e.g.: few mode fiber) is further provided to broaden the spectrum of the ps pulses generated in the amplifier system. In this example the single-mode fiber is undoped. The length of the single mode fiber is selected to allow for significant spectral broadening via self-phase modulation. Self-phase modulation values of between $1\times\pi$ to $50\times\pi$ can be selected. In order to accommodate large pulse energies a single-mode fiber with a large core area is preferred. After frequency broadening in one or more stress-guided fibers a grating pair can be used for pulse compression. Alternatively, a prism pair, grism pair or chirped mirrors can be provided for dispersion compensation, where appropriate combinations of dispersion compensation elements also allow for higher order dispersion compensation. In contrast to other large core fiber structures, stress guided fibers can be designed to provide true single-mode operation with mode areas up to 5000 $\mu m^2$ and more, which means that mode-propagation is alignment insensitive and very robust. In some embodiments nonlinear spectral broadening may be sensitive to alignment and thus may be difficult to implement without truly single-mode large core fibers. With such stress guided fibers, 10-20 ps pulses can be readily compressed to sub ps pulses.

In addition to ps fiber front ends, ps sources based on solid-state lasers can also be nonlinear pulse compressed in stress guided fibers. For example thin-disk solid-state oscillators can be pulse compressed from approximately 1 ps to approximately 10 fs using nonlinear spectral broadening in stress guided fibers with appropriate dispersion compensation elements. The use of stress guided fibers for nonlinear pulse compression can simplify the construction of high average power fs lasers and can be ideal for applications in micromachining such as semiconductor and wafer processing.

In the above example an undoped stress-guided fiber was advantageously used in a non-linear regime for spectral broadening. In some embodiments at least a portion of a stress guided fiber may include an active, highly doped phosphosilicate glass as a gain medium, and may selectively provide a shortened fiber length and increase a non-linear threshold. For example, linear pulse propagation of a short, high peak power pulse (e.g.: ps pulse) having nearly diffraction limited mode, but with a $1/e^2$ diameter much less than about 80% of the core diameter, may be carried out in the active portion.

Figure 18:
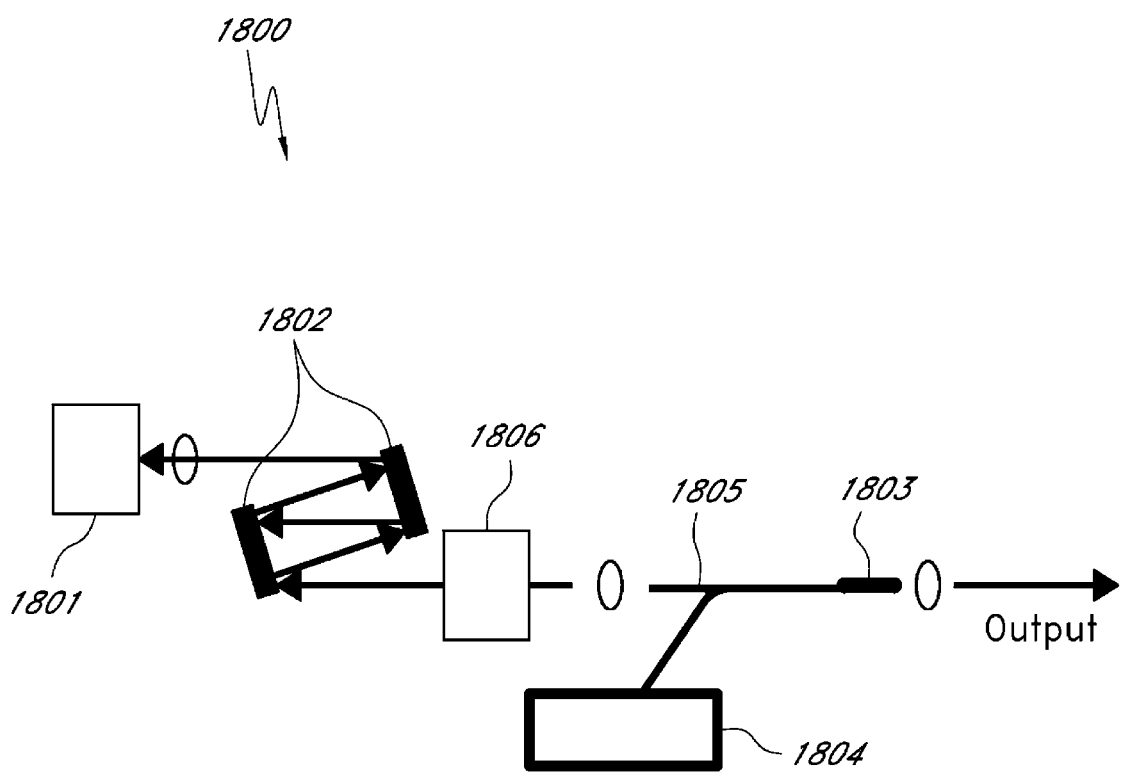
FIG. 18 represents another example embodiment showing a high energy fiber laser cavity.

FIG. 18 represents another example embodiment showing a high energy fiber laser cavity 1800. The embodiment 1800 comprises a saturable absorber 1801 which forms one end of the cavity and a chirped mirror pair 1802 which forms the other end of the cavity. In some embodiments, the chirped mirror pair 1802 can be used for dispersion compensation. The embodiment illustrated in FIG. 18 further comprises a gain fiber 1803 which is pumped by a pump source 1804. In some embodiments, the gain fiber 1803 may comprise an ytterbium doped phosphosilicate fiber. In some embodiments, the pump source maybe coupled to the gain fiber 1803 by a length of single mode fiber 1805. Some embodiments may additionally include a polarization controller 1806. One advantage of the set-up shown in FIG. 18 compared to the set-up shown in FIG. 14 is that the group delay and amplitude ripple of chirped mirrors is smaller than for chirped fiber gratings, therefore smoother pulse spectra can be obtained with the set-up from FIG. 18 compared to the set-up from FIG. 14. In some embodiments, the group delay ripple in the mirrors can be minimized by using two matched chirped mirrors for dispersion compensation. Moreover, a highly Yb—doped fiber can be provided, which can increase the possible pulse energy. With Yb doping levels providing high peak absorption, for example 1000 dB/m, 2500 dB/m, 5000 dB/m, or up to about 9000 dB/m, a very short Yb fiber can be used in the laser cavity. Thus the intra-cavity Yb fiber length may be approximately 3 cm, or shorter. In some implementations the highly doped fiber may comprise a phosphosilicate fiber, which may be utilized as a gain fiber. In some embodiments, the laser output is extracted via a straight cleave on the right hand side of the Yb fiber, providing for 96% output coupling. Both regular single-mode Yb fiber as well as large mode Yb fiber such as leakage channel fiber can be used in the cavity. When using a single-mode Yb fiber, the pump can be delivered from a diode laser emitting at 976 nm which is coupled to the cavity via a coupler. Alternatively, a single-mode fiber laser emitting at 976 nm (as described below) can also be used as a pump source. Additionally, in some embodiments, an optical band pass filter F as well as a polarization controller (P.C.) consisting of a polarizer and a quarter- and half-wave plate can also be provided. In some embodiments, the dispersion of the cavity can be adjusted via the number of bounces in the chirped mirror pair 1802.

In some embodiments, when using leakage channel fiber, cladding pumping through the right hand side of the Yb fiber can also be used.

Because a leakage channel fiber is multi-mode it is advantageous to splice a true single-mode fiber to the leakage channel fiber for mode-filtering. Such mode-filtering for multi-mode fibers was for example described in U.S. Pat. No. 6,275,512 to Fermann et al., which is incorporated by reference herein in its entirety for the subject matter specifically referred to herein and for all other subject matter it discloses. Additionally, an embodiment of a high efficiency system was described in PCT international application no. PCT/US2008/074668, entitled "Glass Large-Core Optical Fibers, published as PCT Publication No. WO 2009/042347, in which a commercially available single mode fiber, coupled to a 40 μm core LCF with fused coupling, resulted in less than about 3 dB loss in fundamental mode energy. Since leakage channel fibers can have large mode areas (of the order of 1500 μm$^2$ and larger), appropriate single-mode fibers with large mode areas, such as, e.g., stress guided fibers, can be selected for mode-filtering. In an example embodiment a 0.3 m length of stress guided fibers with a mode area of 5000 μm$^2$ is spliced to a double-clad Yb leakage channel fiber of 0.70 m length. The overall round-trip fiber dispersion at 1030 nm is then calculated as 40,000 fs$^2$. With a chirped mirror pair having mirrors with a dispersion of −2,500 fs$^2$ each, 10 mirror passes are used to produce a dispersion of −50,000 fs$^2$, which is sufficient for dispersion compensation. The laser can then generate Gaussian-shaped pulses with a pulse energy up to 50 nJ, corresponding to an average power of 4 W at 80 MHz. Even higher pulse energies can be achieved by allowing for positive dispersion inside the cavity by reducing the number of bounces on the chirped mirrors. Higher pulse energies can also be achieved by reducing the repetition rate of the oscillator using for example a Herriott multi-pass cell, which can be included between the chirped mirror and the focusing lens for the saturable absorbers. See for example 'Low repetition rate high peak power Kerr-lens mode-locked Ti:Al$_2$O$_3$ laser with a multiple-pass cavity', Opt. Lett. vol. 24, pp. 417-419 (1999) to Cho et al. Instead of a Herriott cell any other type of multi-pass can also be used. With the addition of a Herriott cell the intra-cavity fiber length can be reduced while keeping the repetition rate of the laser the same. In turn this reduces the nonlinear interaction length inside the cavity, which maximizes the possible pulse energy.

Figure 19:
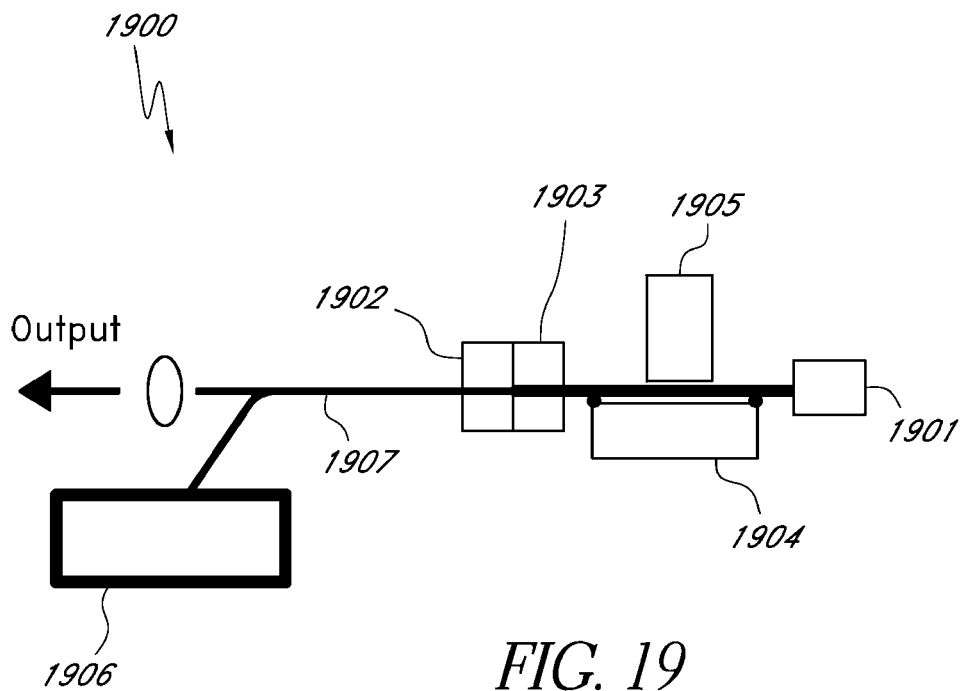
FIG. 19 represents an example embodiment showing a very high repetition rate oscillator.

FIG. 19 represents an example embodiment 1900 showing a very high repetition rate oscillator. In some embodiments, the oscillator is configured to operate at repetition rates between 500 MHz and 100 GHz and preferably around repetition rates of 10 GHz. A Fabry-Perot cavity is used, with one end of the cavity terminated by a saturable absorber mirror (SA) 1901 and the other end with a rotary splice 1902. The saturable absorber mirror 1901 can be based on semiconductors, carbon nano-tubes or graphene. A Gires Tournois mirror or any other dispersive mirror 1903 can be directly coated on the intra-cavity fiber end inside the rotary splice 1902 for dispersion compensation. Alternatively, a dispersive saturable mirror can also be provided. In some embodiments, a fiber stretcher 1904 may be provided to the oscillator 1900. The fiber stretcher 1904 may be used to stabilize the repetition rate of the oscillator. In some embodiments, an optional polarization controller 1905 may be included in the oscillator 1900. The laser oscillator 1900 may further comprise a pump source 1906 which is connected to the cavity by a single-mode fiber 1907

In some embodiments, one end of the fiber that is coupled to the saturable absorber mirror 1901 can be anti-reflection coated to reduce any reflectivity modulation from Fabry-Perot effects between the saturable absorber mirror and the fiber end. Alternatively, Fabry-Perot effects can also be reduced by implementing a wedged fiber end or a combination of a wedged fiber end and anti-reflection coating. In various embodiments, the saturable absorber mirror 1901 can be mounted on a piezo-electric element for allowing a rapid modulation of the distance between the saturable absorber mirror 1901 and the end of the fiber such that the repetition rate can be controlled. In various embodiments, the saturable absorber mirror 1901 can be moved between about 0.5 μm and about 5 μm toward or away from the end of the fiber. For example, in certain embodiments, (e.g. in a temperature controlled environment) mirror movements of approximately 1-2 μm may be sufficient to control the repetition rate. In various embodiments, the distance between the saturable absorber mirror 1901 and the end of the fiber can be varied without adversely affecting the modelocking. In various embodiments, other techniques to control the repetition rate can be used instead of or in combination with the techniques described herein. For example, techniques for electronic control of oscillator repetition rate that were described in U.S. Publication No. 2007/0086713A1, titled "Laser Based Frequency Standards and their Applications" to Hartl et al., and U.S. Pat. No. 7,190,705, titled "Pulsed Laser Sources," to Fermann et al., each of which is incorporated by reference herein in its entirety for the subject matter specifically referred to herein and for all other subject matter each discloses, can also be used in various embodiments described herein.

Figure 20:
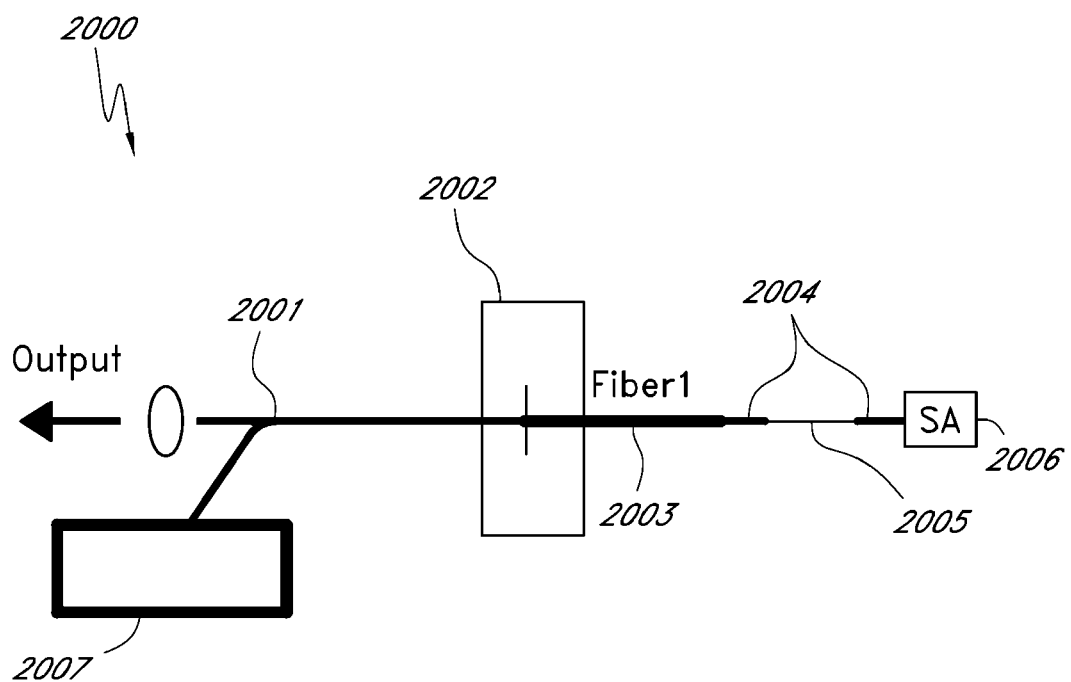
FIG. 20 represents another example embodiment showing a very high repetition rate oscillator.

FIG. 20 represents another example embodiment 2000 showing a very high repetition rate oscillator. Here a microstructure fiber 2005 is used for dispersion compensation. Such micro-structure fibers were discussed in U.S. patent application Ser. No. 11/691,986, entitled "Ultra high numerical aperture optics fibers", filed Mar. 27, 2007, (986 application), published as U.S. Patent Publication No. 2008/0240663, now U.S. Pat. No. 7,496,260, each of which is incorporated herein by reference in its entirety for the subject matter specifically referred to herein and for all other subject matter each discloses. The micro-structure fibers 2005 can have an anomalous dispersion as large as 1000 fs$^2$/cm; thus short lengths of such fibers can be used to compensate for the dispersion of normal dispersion fibers. Here the pump light from a pump source 2007 is delivered to the cavity via a single-mode fiber 2001 and a rotary splice 2002, which is connected to fiber 2003, which preferably constitutes the gain fiber and is highly doped with a rare-earth dopant. A low dispersion dichroic mirror can be directly coated either on the single-mode fiber side or the doped fiber side within the rotary splice 2002 to transmit the pump light and to provide a high reflectivity for the signal light. The reflectivity of the dichroic mirror for the pump light can be selected for example to be in a range of 50-99%. Fiber 2003 can have normal dispersion, which is compensated by the negative dispersion of a microstructure fiber 2005, which is of a design as described in the '986 application. In order to minimize splice loss between fiber 2005 and fiber 2003 and also to seal the ends of the micro-structure fiber 2005, a fiber 2004 can be used which is spliced in between fiber 2003 and fiber 2005 and also at the other end of fiber 2005. Fiber 2004 can then be butt-coupled to a saturable absorber mirror 2006. Preferably the length of fiber 2004 is very short in order to enable operation at high repetition rates. Fiber 2004 can also have normal dispersion. Other arrangements of fibers 2003, 2004 and 2005 are also possible and more than three different fibers can be provided. In some embodiments, fiber 2003 can have a length of 5 mm, fiber 2005 can have a length of 3 mm and fiber 2004 can have lengths of 1 mm each. The fundamental round-trip time of the cavity is thus around 100 ps, corresponding to a repetition rate of 10 GHz. In some embodiments, the dispersion from fibers 2003 and 2004 can be approximately 400 $fs^2$, whereas fiber 2005 can contribute a dispersion of approximately $-600$ $fs^2$. The overall negative dispersion of the cavity can allow for the stable oscillation of 100-300 fs pulses. In various embodiments, the intra-cavity loss is mainly governed by the splice loss, which can be as low as 0.5 dB per splice. Due to the large gain per unity length even an intra-cavity loss of 2 dB can be compensated by a 5 mm length of heavily rare-earth doped phospho-silicate fiber. As further explained below, a 5 mm length of heavily Yb-doped phospho-silicate fiber can have a gain of at least about 0.5 dB/cm and up to about 5-10 dB/cm at 1027 nm.

Instead of an intra-cavity arrangement with normal dispersion rare-earth-doped and undoped-micro-structure fiber, rare-earth-doped micro-structure fibers can be provided. However, even such doped micro-structure fibers preferably are sealed at the end in order to provide long-term reliable operation. In some embodiments, for rapid-repetition rate control a short length of fiber can be glued to an electro- or magneto-strictive element. In some embodiments a fiber stretcher as also described with respect to FIG. 19 can be provided to stabilize the repetition rate.

As another alternative for dispersion compensation, a chirped fiber grating can be provided. Chirped fiber gratings can be manufactured with a dispersion of around 5,000-15,000 $fs^2$ with a reflectivity of around 1%, which allows for the construction of fiber lasers operating at repetition rates of several GHz. The fiber is pumped with a single-mode pump diode at a wavelength of 976 nm via a fiber coupler and a single-mode fiber, which is butt-coupled to the intra-cavity fiber. The oscillator output can be extracted after the fiber coupler. In various embodiments, the intra-cavity fiber is glued to a fiber stretcher at two points to allow for repetition rate control. The fiber stretcher can be based on an electro-strictive or magneto-strictive material. In order to enable the fiber laser to operate in a single-polarization state it is advantageous if the fiber polarization is reproduced after one round trip. Otherwise polarization instabilities can occur, which can result in the polarization state changing from one round-trip to the next round-trip. For cavity lengths of several centimeters therefore a polarization controller can be further provided. In some embodiments, the polarization controller can consist of one, two or three piezo-electric transducers which can apply pressure to the side of the fiber from different angles.

In one implementation of a GHz repetition rate Yb fiber laser, a Yb fiber with peak absorption of approximately 3600 dB/m was used. The Yb fiber had a dispersion of about 400 $fs^2$/cm. The Yb fiber length was 6 cm and a chirped fiber grating with a dispersion of $-13,000$ $fs^2$ with a reflectivity of 4% was used for dispersion compensation. Hence the total cavity dispersion was around $-8000$ $fs^2$. An intra-cavity polarcor film polarizer (not shown in FIG. 19) was further inserted in front of the SA mirror to select one single polarization state. Also a two lens optical imaging system was provided to image the output of the Yb fiber onto the SA mirror (also not shown). The polarization was further controllable by twisting the fiber output fiber outside the cavity. Because of the rigidity of the fiber assembly, the fiber twists can be transmitted to the intra-cavity fiber and can so align the intra-cavity polarization state, reducing the need for the intra-cavity polarizer, as also demonstrated. The laser generated around 250 fs pulses at a repetition rate of 1 GHz with an output power of 100 mW.

For a laser operating at a repetition rate of 10 GHz, an intra-cavity fiber length of approximately 1 cm can be used. As an example, highly doped fibers, for example a Yb-doped phosphorus-silicate fibers as described herein, can have a single-pass gain in the 1025-1030 nm wavelength region of at least about 0.5-10 dB/cm and a gain up to 1-20 dB/cm in a double-pass. Thus even with a cavity length of only 1 mm, a round trip gain of 1-2 dB can be achieved, which allows for passively modelocked operation at a 100 GHz repetition rate with a round trip cavity loss less than about 0.3 dB. For Er—Yb doped phosphosilicate fibers the round-trip gain can at 1530 nm can be as high as 10 dB/cm, which also allows for passively modelocked operation at 50-100 GHz repetition rates with achievable intra-cavity losses. Depending on the intra-cavity dispersion and saturable absorber characteristics, pulse widths of the order of 100 fs up to several ps can be obtained from such oscillators.

Figure 21:
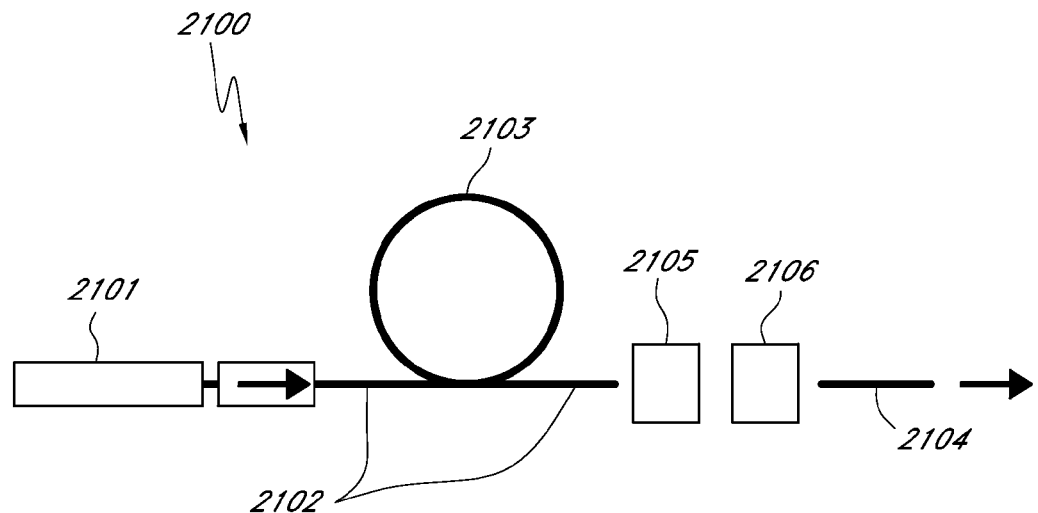
FIG. 21 represents an example embodiment showing a high repetition rate fiber frequency comb laser.

FIG. 21 represents an example embodiment 2100 showing a high repetition rate fiber frequency comb laser. The system uses an oscillator 2101 which can be similar to the oscillator described with respect to FIG. 19. The pulses are spectrally broadened in a highly nonlinear fiber 2102 disposed either before the amplifier 2103 or after the amplifier 2103 or inside the amplifier 2103. The amplifier 2103 may comprise a length of a gain fiber. In some embodiments, the gain fiber may comprise an ytterbium doped phosphosilicate fiber. After amplification in the amplifier the pulses are compressed before injection into a highly nonlinear supercontinuum fiber 2104, where a near octave supercontinuum spectrum is generated. The repetition rate of the oscillator pulses is controlled by controlling the fiber length or the oscillator fiber temperature and the carrier envelope offset frequency is controlled by controlling the pump current of the oscillator pump diode and the saturable absorber temperature. Techniques for electronic control of oscillator repetition rate and carrier envelope offset frequency were further discussed in published U.S. patent application pub. no. 2007/0086713A1 entitled "Laser based frequency standards and their applications," to Hartl et al., and U.S. Pat. No. 7,190,705 entitled "Pulsed laser sources," to Fermann et al., each of which is incorporated by reference herein in its entirety for the subject matter specifically referred to herein and for all other subject matter each discloses. Such multi-GHz repetition rate fiber frequency comb sources are ideal for many applications in frequency metrology, spectroscopy, specifically Fourier transform spectrometry, and wavelength division multiplexing, as the output of the fiber frequency combs lasers can be selected to be on the ITU grid of optical fiber communications. Some embodiments may comprise a polarization controller 2105 and/or a dispersion controller 2106.

In various embodiments, the short cavity length enabled by a heavily doped ytterbium silica fiber, for example a phosphosilicate fiber, can enable single frequency lasers. Such lasers can be made with a short length of active fiber, which can be a few centimeters, between two reflectors with at least one reflector reflecting over only a narrow spectral width. In one embodiment, for example such a laser can be embodied by splicing an active fiber between two fiber Bragg gratings. The two gratings can have overlapping spectral characteristics and one grating can have a lesser reflection while the other can have a high reflectivity. The grating having a lesser reflection can serve the purpose of an output coupler. This configuration is referred to as distributed Bragg laser (DBR). The pump can be coupled in through any one of the gratings. An alternative design is a distributed feed-back (DFB) design. In this case, a fiber Bragg grating is directly written in the active fiber with a $\pi$ phase shift also made in the grating. In some embodiments, this phase shift can be near the center, but not necessarily so.

Figure 22:
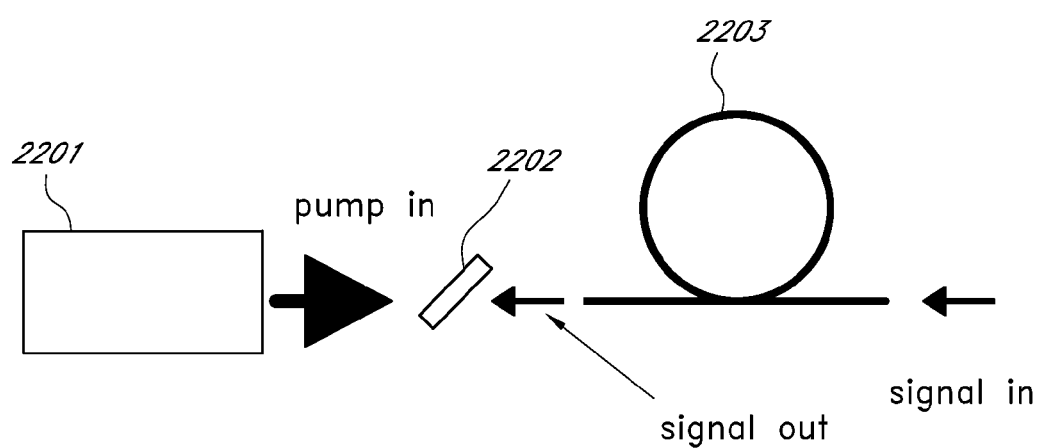
FIG. 22 illustrates an embodiment of a counter-pumped Yb amplifier pumped by a 976 nm fiber laser, and configured in such a way as to isolate ASE from the ytterbium fiber amplifier.

Short amplifier length from using a heavily doped fiber can offer a strong benefit for the generation of high peak power pulses, due to an increase of the nonlinear threshold. In some embodiments, doubled clad fibers can be used in an amplifier to allow the use of high power multimode pump lasers. Cladding pumping, however, can increase pump absorption lengths due to smaller pump and doped glass overlap. This can lead to an increase of fiber amplifier length. Core pumping in combination with using a heavily doped fiber and a high power single mode pump at ~976 nm, can enable shorter amplifier lengths and consequently much higher peak power generation from the amplifier. High power single-mode fiber lasers operating at 976 nm were for example described in Röser el at, "94 W 980 nm high brightness Yb-doped fiber laser", Optics Express, vol. 16, pp. 17310-17318, 2008. Such pump sources can be isolated from a core-pumped amplifier via high power optical isolators. Alternatively, dichroic beam splitters can be used to provide optical isolation. For example, in some embodiments, dichroic mirrors reflecting ASE at ~1030 nm (HR1030) and transmitting at ~980 nm (HT980) can be placed at angles that are not perpendicular to the 980 nm beam between the 980 nm pump fiber laser and the ytterbium fiber amplifier to isolate ASE from the ytterbium fiber amplifier. Such an implementation is shown in FIG. 22. Here a counter-pumped Yb amplifier pumped by a pump laser 2201 (e.g. a 976 nm Yb fiber cw oscillator) is shown. The signal (e.g. a 1030 nm signal) is injected into the amplifier 2203 at one end and extracted via a dichroic beam splitter 2202 at the other end. In some embodiments, the dichroic beam splitter 2202 can be highly reflecting (HR) at the signal wavelength (e.g. 1030 nm) and highly transmissive (HT) at the pump wavelength (e.g. 976 nm). The pump can also be supplied to the amplifier via the same beam splitter 2202. More than one dichroic beam splitter 2202 can be inserted between fiber pump laser 2201 and fiber amplifier 2203, in order to provide that no signal light is leaking into the pump laser, which can be saturated by the signal light.

In some embodiments, the amplifier 2203 can be sufficiently long in order to absorb most of the pump light in order to prevent the whole system from lasing at the pump wavelength. In some embodiments, an isolator between a fiber pump laser and a fiber amplifier can be eliminated when providing a high level of isolation between pump and signal via the use of dichroic beamsplitters. In some embodiments, for example the pump laser can operate in a wavelength range less than approximately 1030 nm, e.g., from approximately 970 nm to approximately 1030 nm in some embodiments. In some embodiments, the amplifier can amplify signals in a wavelength range greater than approximately 1030 nm, e.g., from approximately 1030 nm to approximately 1150 nm in some embodiments. In some embodiments where the pump laser and the range of wavelengths over which the amplifier operates do not overlap, the beam splitter 2202 can be modified to separate the pump and signal wavelengths.

In various embodiments, it may be advantageous to use a single-mode fiber pump laser to pump a single-mode fiber amplifier, as previously disclosed in U.S. Pat. No. 5,847,863 to Galvanauskas et al., which is incorporated by reference herein in its entirety for the subject matter specifically referred to herein and for all other subject matter it discloses. In various embodiments, it may be advantageous to use a single mode phosphosilicate Yb fiber pump laser for pumping an Yb aluminosilicate fiber amplifier, because of the higher gain cross section of phosphosilicate Yb fibers for wavelengths less than approximately 1030 nm compared to aluminosilicate fibers. In various embodiments, core pumping of large core fibers may be advantageous to improve the mode quality of any amplified beam via gain guiding as disclosed in some embodiments described in U.S. Pat. No. 5,818,630 to Fermann, which is incorporated by reference herein in its entirety for the subject matter specifically referred to herein and for all other subject matter it discloses.

In some embodiments a large-core fiber, for example a highly rare-earth doped fiber, may be configured to provide a high-power pulsed or CW pump source. The source may provide pump energy to a phosphosilicate gain stage, or other fiber gain stage. In various embodiments the high absorption efficiency of the phosphosilicate fiber may be exploited for one or more of pumping and signal amplification. Such a core pumped configuration, as exemplified below, may be used with phosphosilicate based configurations, or with silica gain fibers.

Cladding pumping of double clad rare earth doped fibers by multimode pump diode can be used in various embodiments of high power fiber lasers. Cladding pumping allows the use of high power multimode pump diodes. However, as noted above, a reduction of pump absorption results from the reduced overlap between the pump light and rare earth doped core. Therefore, much longer fibers are used to obtain high peak power.

Direct core pumping, on the other hand, may be carried out with fibers that can be approximately one to two orders of magnitude shorter. The shortened fiber length increases non-linear threshold by one to two orders of magnitudes. Direct core pumping, however, is preferably carried out with a pump source operating in a few modes, or most preferably in a single transverse mode, to maximize efficiency. Currently, commercially available single mode pump diodes are limited to approximately 1 W, and thereby limits the output power available from direct core pumping.

If higher pump power at single transverse mode is provided for direct core pumping, high peak power optical pulses can be generated by direct amplification, and may reduce or eliminate a need for chirp pulse amplification (CPA), and associated components for temporal pulse stretching and/or compressing pulses. Alternatively, in various embodiments utilizing CPA, the peak power provided by a system comprising a fiber amplifier may be further increased, particularly with the use of a bulk compressor to compress stretched pulses amplified with the fiber amplifier. In various embodiments, for example those in which a phosphosilicate fiber is utilized, peak power at the output of the fiber may be increased with a relatively short length of optical fiber.

Figure 23A:
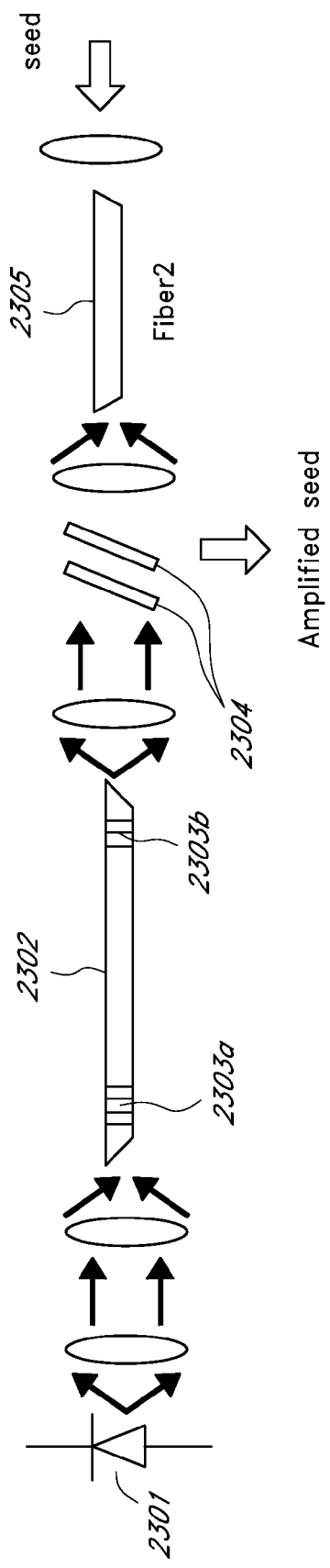
FIG. 23A schematically illustrates an embodiment of a fiber amplifier system, wherein a large-core amplifier is configured to pump an amplifier gain stage.

FIG. 23A schematically illustrates an arrangement for obtaining an amplified single transverse mode pump beam at a pump wavelength of about 976 nm. With the arrangement, the pump may be operated either CW or pulsed, and pump power in the range of a few watts to a few kWs is obtainable. In this example an amplified pump source is injected into a highly rare-earth doped fiber, and counter propagates relative to a signal produced by seed. The arrangement for pumping can be utilized with various fiber lasers and amplifiers, including a high power fiber oscillator, or a co-propagating seed source, or any combination thereof.

In this example a multimode pump diode (MM pump) 2301 at a wavelength of approximately 976 nm is used to pump a double clad fiber (DC fiber) 2302. In some embodiments, the pump 2301 can be configured to emit a pump output at approximately 915 nm. Two fiber Bragg gratings (FBG) 2303a and 2303b are written directly in the rare earth doped DC fiber 2302. The grating 2303a provides a high reflectivity (HR) at ~976 nm, while the grating 2303b is configured as an output coupler (OC). Angled cleaves are used for both ends of the fiber to reduce reflections.

Two elements of the pump laser operating at the three level gain peak of ~976 nm are high inversion to provide sufficient gain, and reduced or minimized reflection at longer wavelength (>1010 nm) to suppress lasing of the more efficient four level system. The internal fiber Bragg gratings reduce or minimize reflection for the four-level system, yet provide a preferred compact configuration relative to configurations using external dielectric mirrors (e.g.: as described by Boullet et al (Optics Express, vol. 16, 17891-17902, 2008) and Miser et al (Optics Express, vol. 16, 17310-17318, 2008)). In some embodiments external dielectric mirrors 2304 may be utilized. The dielectric mirrors 2304 may be configured to transmit wavelengths in the range of 976 nm-980 nm and reflect wavelengths in the range from 1020 nm-1100 nm. The output of the pump laser with single transverse mode at levels from few watts to few kWs can be used to core pump a short amplifier fiber 2305, which may be about a cm to a few tens of centimeters in length. High peak power optical pump pulses with average power of few watts to few kWs can be generated.

To achieve the preferred high inversion levels in DC Fiber 2302, a small pump guide is included to obtain high pump intensity. In at least one embodiment the small pump guide comprises an all glass double clad fiber, or an air clad double clad fiber, for example as described in PCT international application no. PCT/US2008/074668, entitled "Glass Large-Core Optical Fibers, filed Aug. 28, 2008 to Dong et al, published as PCT Publication No. WO 2009/042347, which is incorporated by reference herein in its entirety for the subject matter specifically referred to herein and for all other subject matter it discloses.

Figure 23B:
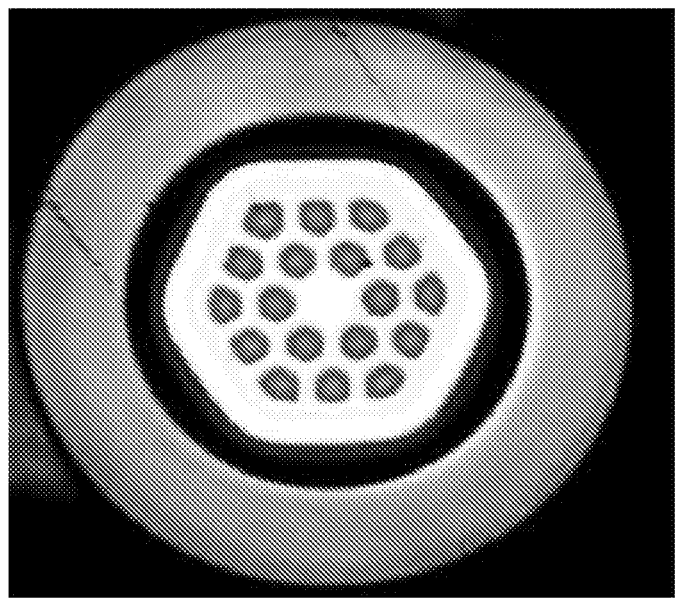
FIGS. 23B-23F illustrate various examples of large-core fibers suitable for embodiments of the large-core pump fiber of FIG. 23A.
Figure 23C:
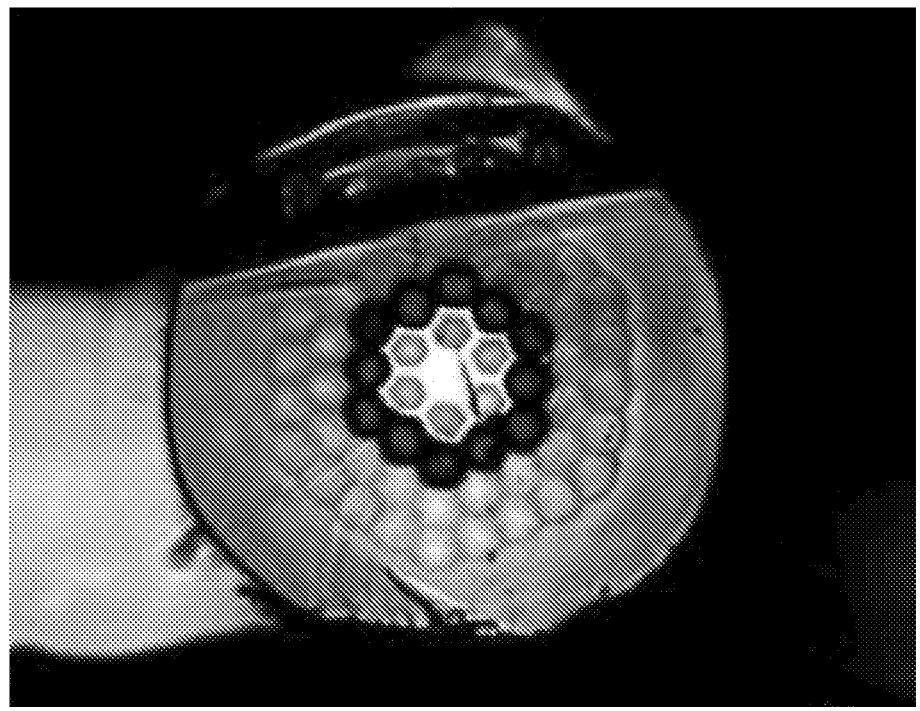
Figure 23D:
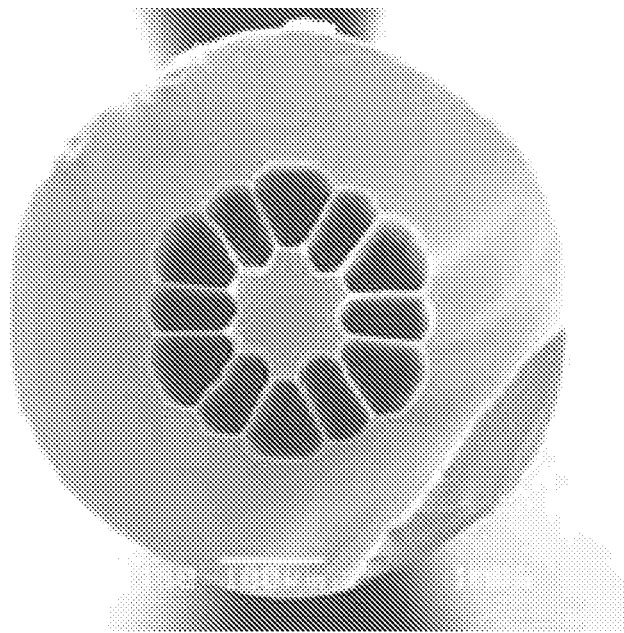
Figure 23E:
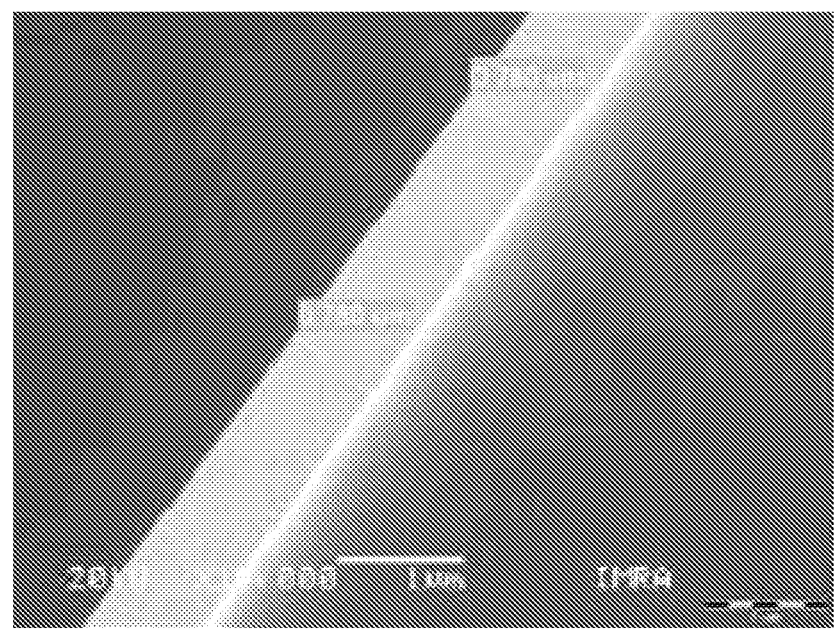
Figure 23F:
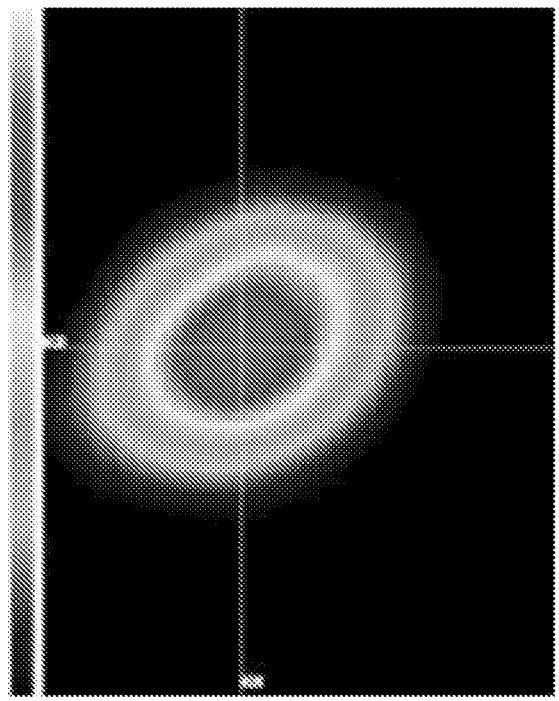
Figure 23F:
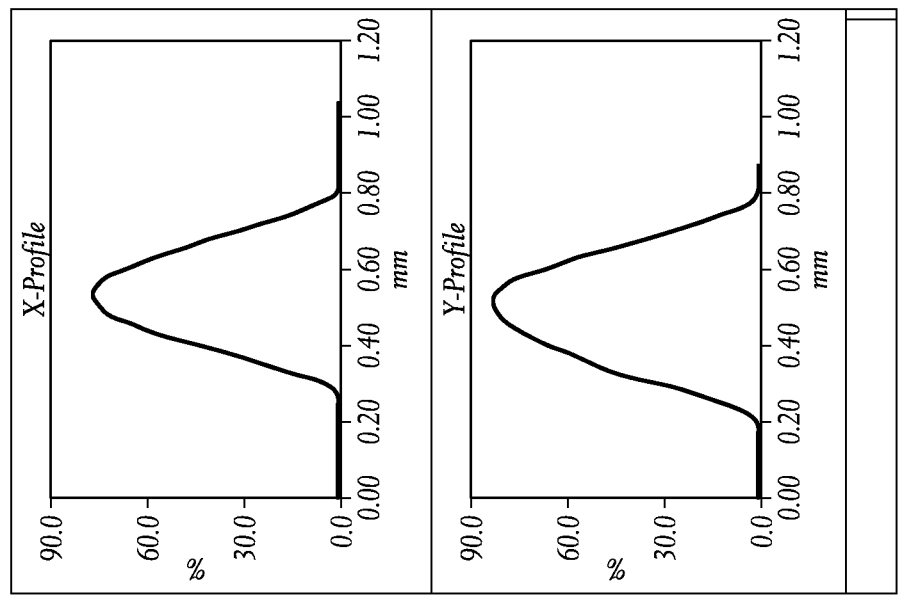

A fabricated all glass double clad leakage channel fiber is illustrated in FIG. 23B and a fabricated air clad leakage channel fiber is illustrated in FIG. 23C. Both fibers can have pump guide in the range of 100-400 μm outer dimension. FIG. 23D illustrates the scanning electron microscopy (SEM) cross section of a fiber similar to the air clad leakage channel fiber illustrated in FIG. 23C. FIG. 23E illustrates another SEM view of a large core fiber which shows the web size for a large core holey fiber. FIG. 23F illustrates the profile of a mode propagating in an embodiment of the air clad leakage channel fiber.

Referring to FIG. 23A, Fiber 2305 may comprise a rare earth doped fiber or a large core fiber. In at least one embodiment the gain fiber comprises a large-core phosphosilicate fiber providing high pump absorption of at least about 1500 dB/m, and a length of no more than a few tenths of a meter. The core pumped fiber may be operable to produce output pulses in the picosecond range with a pulse energy of at least a few hundred microjoules, without using pulse stretching. Many other variations are possible, including versions scaled upward in power and repetition rate relative to conventional Yb (e.g. Yb doped in non-phosphosilicate glass) doped fiber lasers and/or amplifiers.

The ytterbium-doped core of the phosphosilicate fibers can be made photosensitive by known techniques developed for germanium-free glass, such as high pressure hydrogen loading at room temperature or an elevated temperature prior to grating writing.

Examples of Stress Guided Fibers

As described in PCT international application no. PCT/US2008/074668, entitled "Glass Large-Core Optical Fibers, filed Aug. 28, 2008, published as PCT Publication No. WO 2009/042347, which is incorporated herein by reference in its entirety for the subject matter specifically referred to herein and for all other subject matter it discloses, in some embodiments, LCF and other fibers were described. Measurements of LCF refractive index variations were made, and the results indicated index modulation may result from various properties of the LCF fiber including, for example, the size and/or spacing of cladding features, the thermal expansion coefficients of the cladding and/or cladding features, etc.

Figure 24:
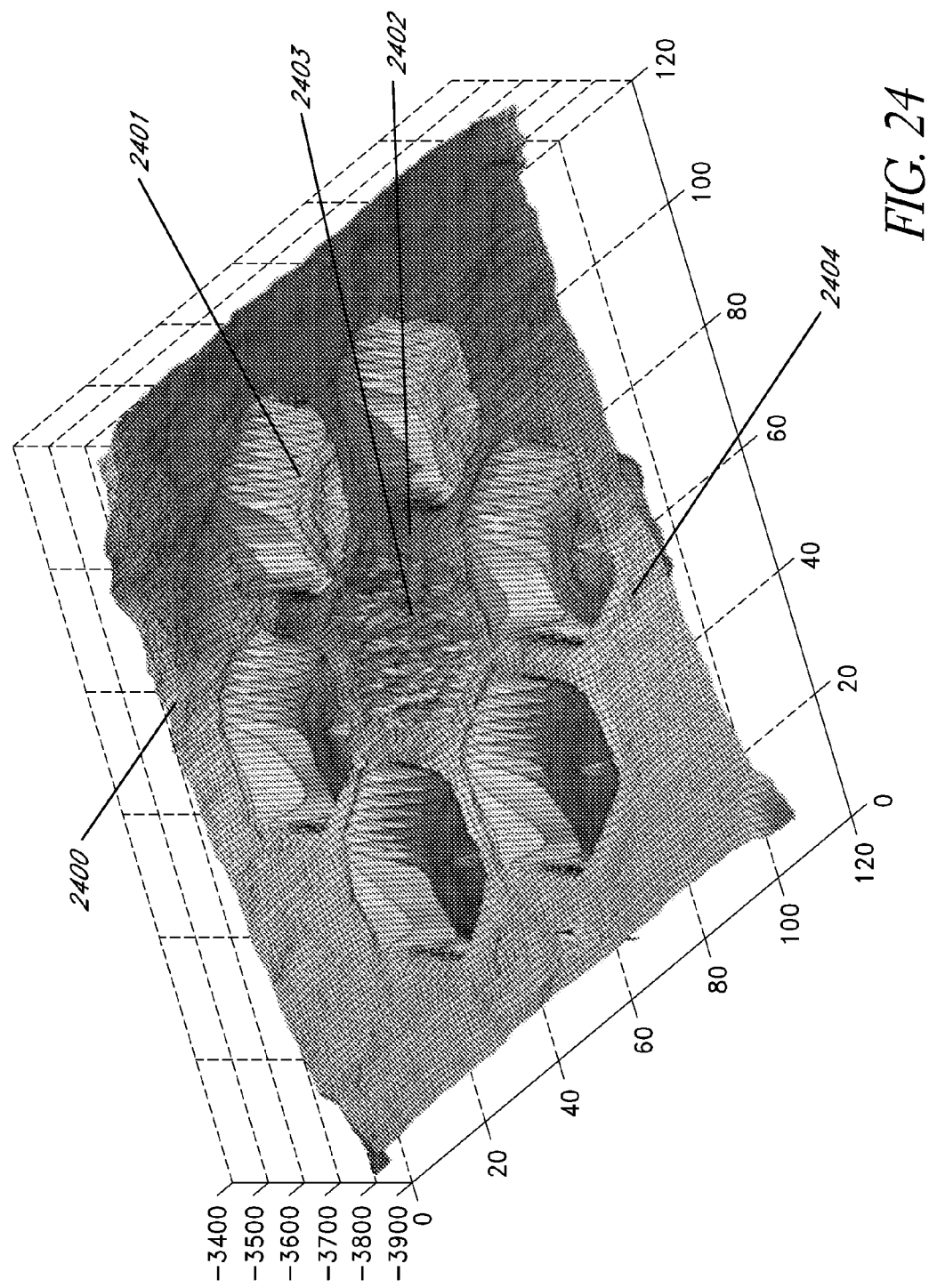

FIG. 24 illustrates a measured two-dimensional plot of refractive index 2400 of an LCF, showing core 2402 with doped center part 2403 and low index features 2401. The area 2404 around the low index features 2401 has an increased index of refraction. The index increase may be caused by the different material properties of silica and fluorine-doped silica, particularly from the different thermal expansion coefficients, δT. As fiber is drawn at high temperature, the fluorine-doped silica with higher coefficient of thermal expansion is trying to contract more than the surround silica glass. This contraction is, however, limited by the surrounding silica. The fluorine-doped silica is under tension in the fiber and the surrounding silica under compression at room temperature. This stress apparently gives rise to a stress-index index variation due to stress-optics effect.

Localized variations in index can occur in some fiber embodiments as a result of different thermal properties of the features and the first cladding material. However, LCF guidance mechanisms were observed in some example experiments with LCF fibers. In some cases, the relatively large feature size, arrangement, and number of features provides for LCF guidance as a dominant mechanism.

In some embodiments, feature sizes and arrangements can affect the index profile of the core region (or other fiber regions), for example increasing the relative change in refractive index. Increasing the feature size and spacing (e.g.: scaling the overall dimension) can generally result in a larger relative index change (e.g.: larger maximum index modulation). The net index variations caused by the stress-optical effect may include compensating contributions from nearby features, and the net result, in some cases, is dependent on feature spacing. For example, smaller features spaced closer together can generally produce reduced index modulation. In various embodiments the feature sizes and/or spacing may be pre-selected to tailor the index profile of the cladding and/or core regions. In some embodiments, the materials comprising the cladding and the cladding features may be pre-selected to tailor the index profile of the cladding and/or core regions. For example, in some embodiments, the materials are selected based at least in part on values of their thermal expansion coefficients. In some embodiments, the cladding features may comprise fluorine-doped silica and the cladding may comprise silica. Other materials, e.g., doped and/or undoped glasses, may be used in other embodiments.

In various embodiments wherein cladding features are disposed in a single layer (e.g.: rings) as in illustrated in FIG. 17A, the values of d/A may be in the range of about 0.65-0.9, 0.7-0.9, or 0.75-0.85. In some embodiments at least a second layer of features (N>2) may be disposed beyond cladding features 1752, and a range of d/A in some cases may be in a range of about 0.3-0.9, 0.4-0.8, 0.5-0.7, or 0.5-0.8. Other ranges of d/A may be used for any of the layers of cladding features. If more than one layer of cladding features is used, the ratio d/A may (but need not) be different for each layer of cladding features.

As noted above, one or more of feature sizes and arrangements, material thermal properties, and other factors can (singly or in various combinations) affect the index profile of the core region (or other fiber regions), for example increasing the relative change. The localized variation may cause index (non-PCF) guidance. In some implementations, if this surprising guidance mechanism is not properly considered the resultant output mode can deviate from a desired or expected shape. When properly considered, the index guidance may provide a new and interesting guidance mechanism for use with a PCF. The following example illustrates the effect of index modulation on the guidance and mode profiles in an embodiment of a PCF fiber.

Figure 25A:
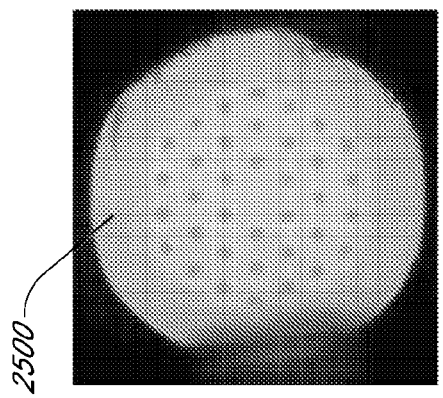
FIGS. 25A-25C illustrate some characteristics of an example of a fabricated all-glass leakage channel fiber (LCF) having three layers.
Figure 25C:
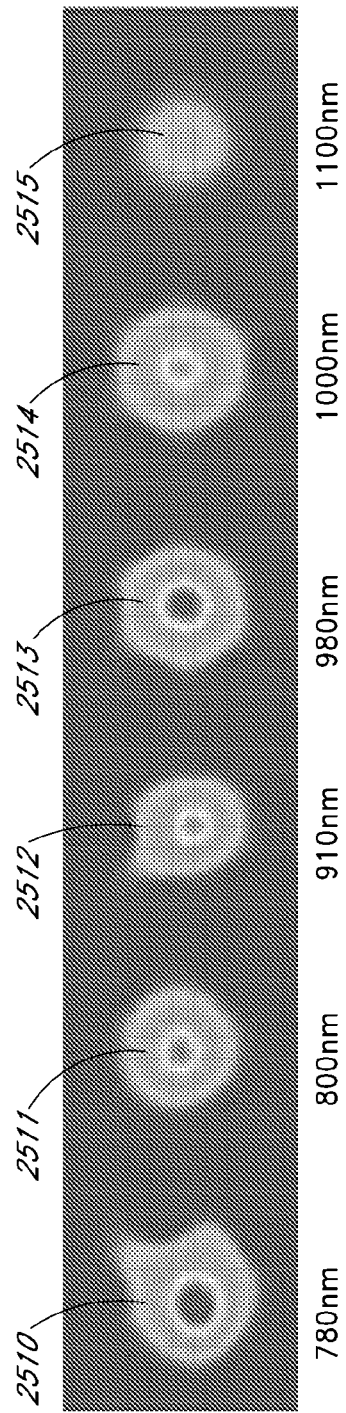
Figure 25B:
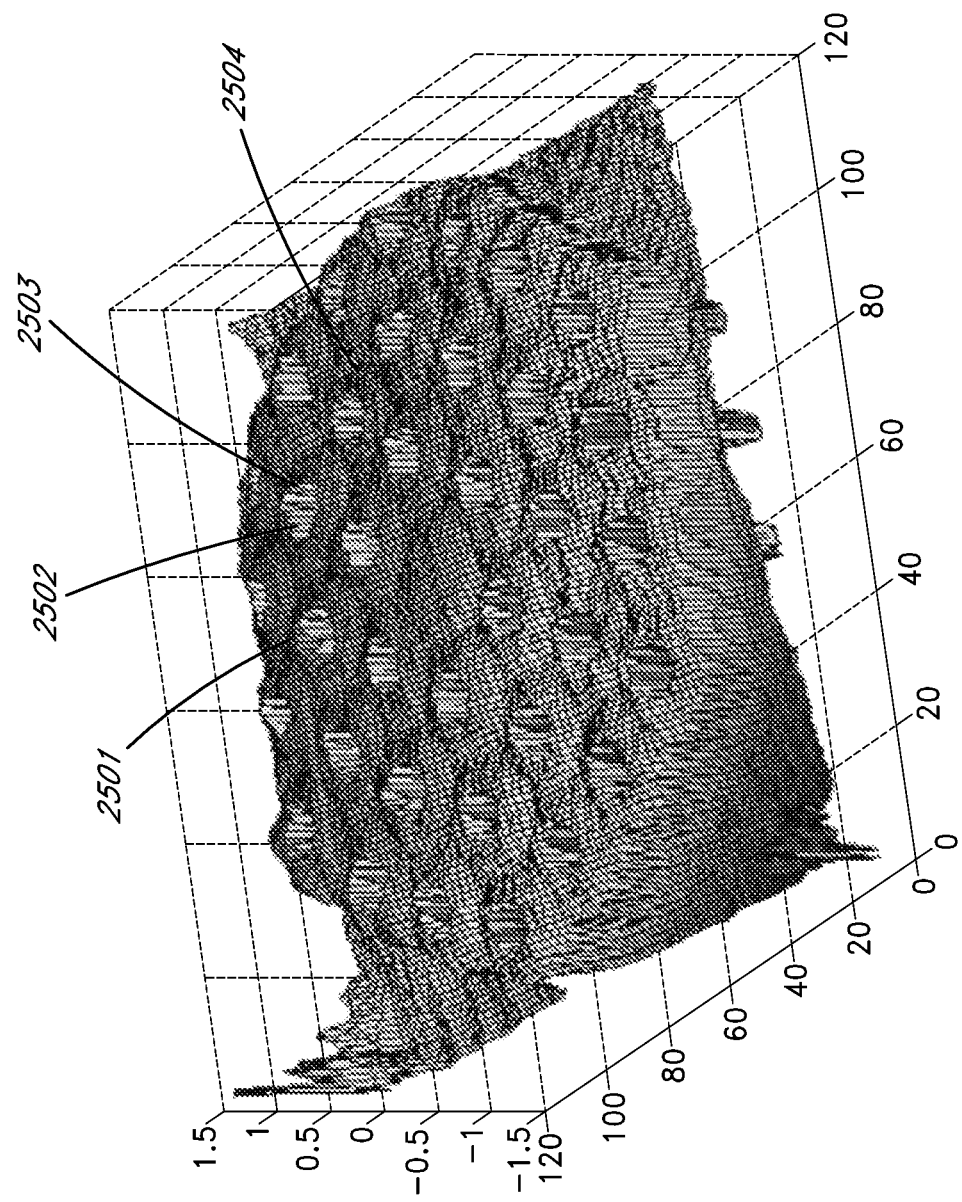

An all glass PCF was fabricated with d/A=0.35 and core diameter of 47 μm. The cross section 2500 of the fiber is shown in FIG. 25A and its refractive index profile 2501 is shown in FIG. 25B. Low index features 2502 are shown along a raised index ring 2504 around each low index feature 2802 due to mismatch in thermal properties. The raised index ring 2504 also creates a high index portion in the core 2503. A length of this fiber was kept straight while the output mode was measured at various wavelengths. The modes 2510, 2511, 2512, 2513, 2514 and 2515 at wavelengths 780 nm, 800 nm, 910 nm, 980 nm, 1000 nm and 1100 nm, respectively, are shown in FIG. 28C. Due to the existence of the lower wavelength cut-off, PCF guidance gets weaker towards the shorter wavelength. The example fiber embodiment is not very well guided below 780 nm, giving a maximum normalized core diameter $2\rho/\lambda \approx 60$.

Figure 26:
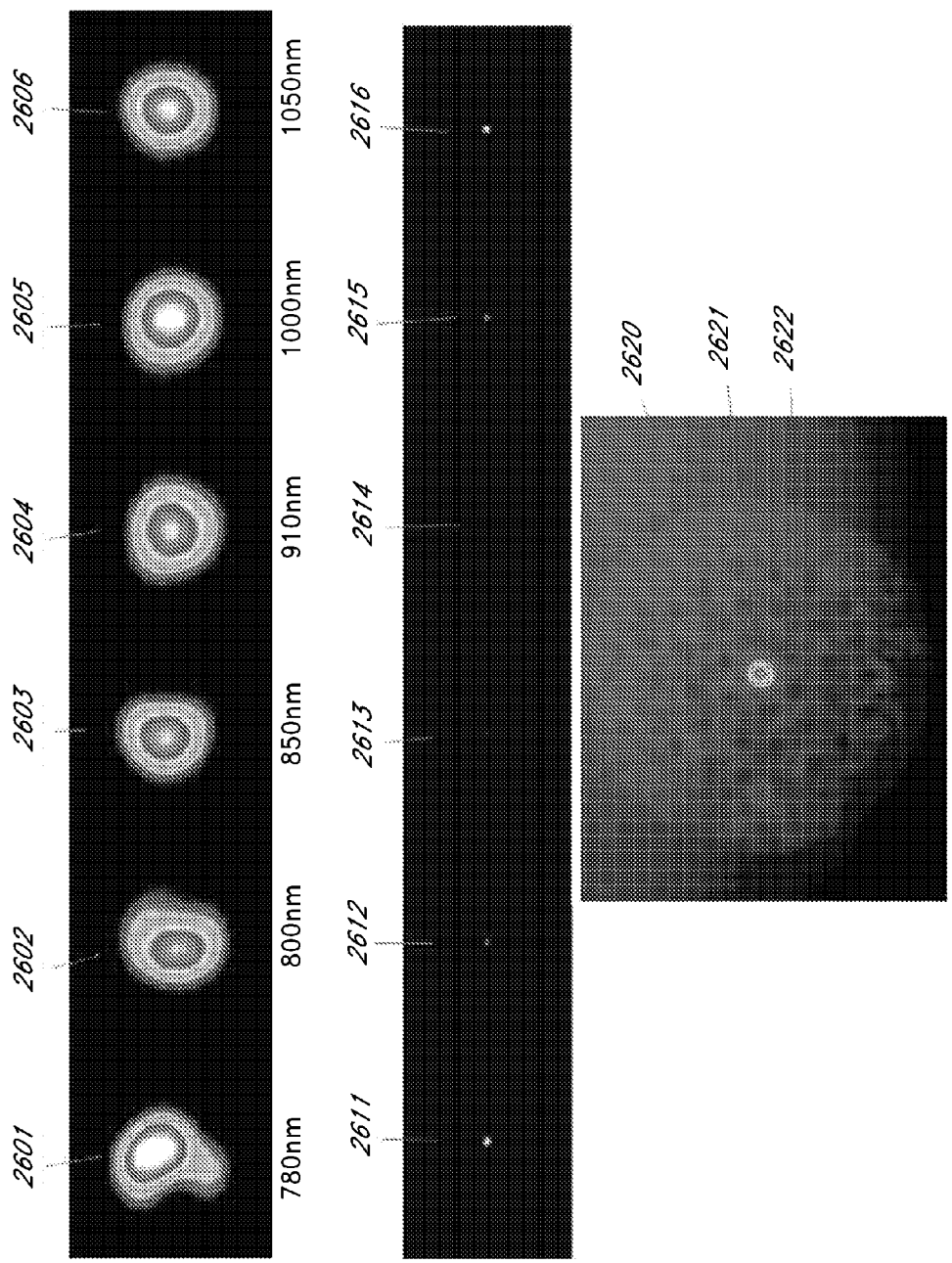

A portion of the preform for the fiber shown in FIG. 25A was drawn into a fiber with diameter of ~700 μm and core diameter of ~130 μm. The raised index portion of 80 μm in diameter in the center of the fiber starts to guide single mode shown in FIG. 26. Modes 2601, 2602, 2603, 2604, 2605 and 2606 were measured at wavelengths of 780 nm, 800 nm, 850 nm, 910 nm, 1000 nm and 1050 nm respectively. The fundamental mode operation is very robust at 1 μm and higher order mode content is seen below 850 nm. Modes 2611, 2612, 2613, 2614, 2615 and 2616 are modes captured while adjusting launch condition at 1 μm wavelength. No other modes can be guided in this range of adjustment in this example. In any case, it is most apparent from image 2620 that the mode is not guided by normal PCF guidance. The image 2620 was taken with the fiber cross section illuminated. In FIG. 26, the mode 2621 can be clearly seen not to extend to the low index features 2622. Also, the mode 2621 is substantially centered well within a core region of the fiber (e.g., the region bounded by the inner layer of low index features 2622). The mode shape does not exhibit the characteristics of the cladding features, for example as illustrated with mode profile 2514 in FIG. 25C, whose shape is indicative of a mode guided with cladding features.

Figure 27:
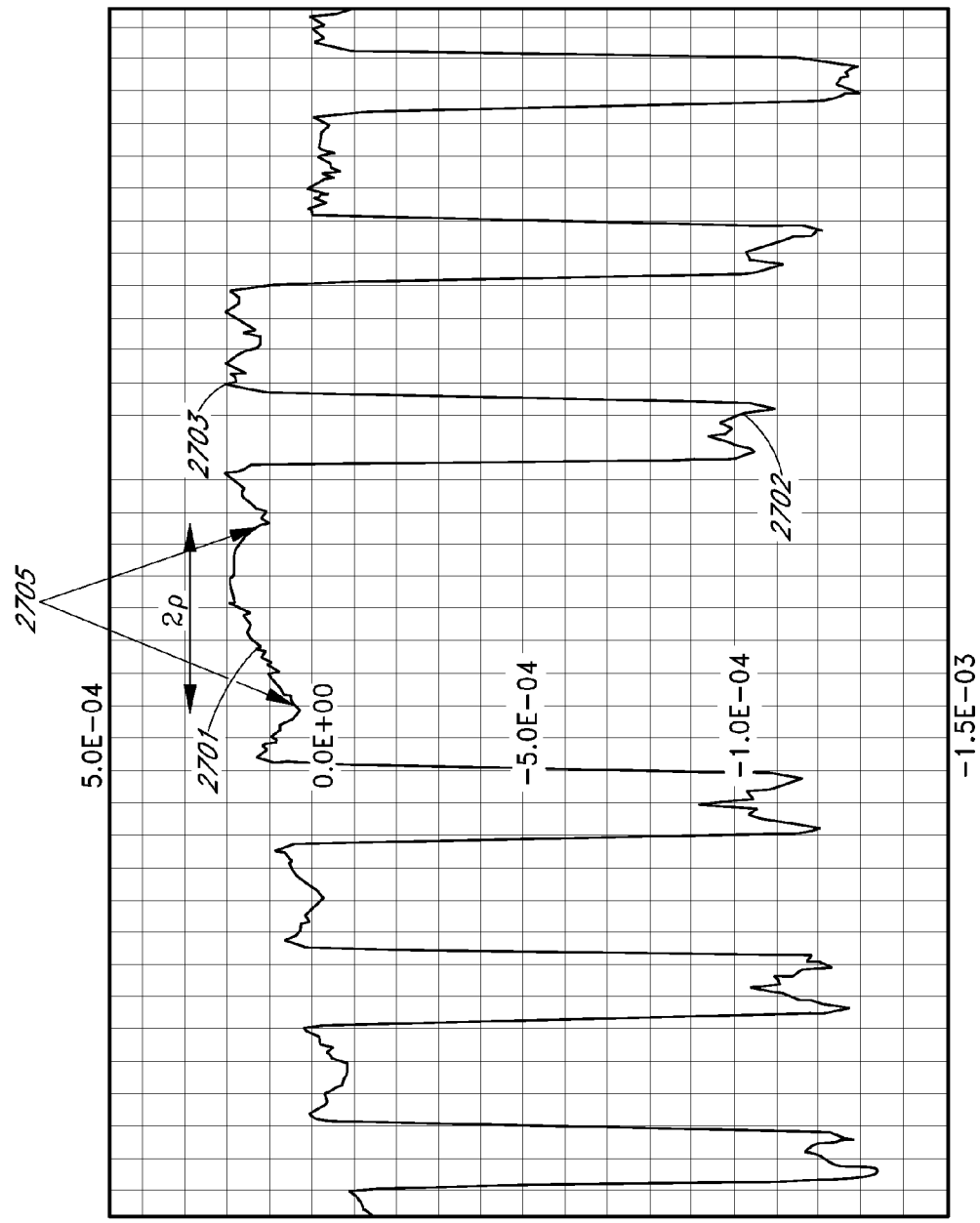

Refractive index variation in the cross section of a fiber along a line crossing the center of the fiber and a number of fluorine-doped rods was measured and is shown in FIG. 27. The raised index core 2701 has a diameter of 2ρ. Index depression 2702 from fluorine-doped glass is also shown along with the raised index ring 2703 around it from stress effect. In some embodiments, the refractive index variation in a portion of the core may be approximately parabolic. The refractive index variation may permit a fundamental mode to be guided within a portion of a core having a non-uniform refractive index. For example, the mode diameter may be a fraction of the core diameter such as, for example about 50%.

The non-PCF guidance was a surprising result of the experiment. It suggests that PCF guidance in large core fibers may be restricted to fiber embodiments where only small air holes are formed in the first cladding regions, configurations where a material other than glass is used, or possibly configurations where holes are filled with gas. The results also suggest that some possible PCF designs are less preferable for all glass, large core fibers. In some large core embodiments glasses having well-matched coefficients of thermal expansion may be utilized. Decreasing the core size, for example to 50 μm, may also generally improve performance in some cases.

In contrast to various LCF embodiments, the arrangement and relatively small feature size selected for this PCF example increased the localized index variation. The localized variation may be used for non-PCF guidance.

In at least one embodiment an all-glass fiber may comprise a first cladding material having a first thermal expansion coefficient. Additional layers, N≧2, of cladding features may be disposed in the first cladding material, and these features may be reduced in size compared to LCF cladding feature sizes. The cladding features may comprise a second cladding material having a second thermal expansion coefficient. A localized increase in an index of refraction adjacent to a cladding feature may be present. Moreover, a core region may be bounded by a first inner layer of cladding features. A portion of the core region may exhibit a non-uniform index profile as illustrated in FIG. 27, forming an index gradient. Referring to the FIG. 27, an example relative refractive index difference measured from the peak of the raised index core region 2701 to local minima 2705 is less than about $5 \times 10^{-4}$, and may be less than about $1 \times 10^{-3}$. The increased local index beyond each local minima 2705 corresponds to a transition to low index cladding features. The local gradient from the peak to local minima is sufficiently large to cause index guiding of a fundamental mode within at least a portion of the core region. The relative refractive index difference may be caused by a stress-optic effect.

In various embodiments a diameter of the large core fiber may be in the range of about 30 μm to 200 μm. Applications of such a fiber may be found, for example, in high-power chirped pulse amplification systems, non-linear amplifiers, and continuum generators to broaden a spectrum of an input pulse. Such a high-peak power pulse can have sufficiently high intensity to exceed a non-linear threshold of the fiber medium. In some embodiments a pre-amplifier or power amplifier may be formed by doping the core.

Example Embodiments

Other embodiments of rare-earth doped optical fibers and systems comprising these fibers are possible as further described below.

In various embodiments, an optical fiber, comprising a highly rare earth doped glass comprising silica, a rare-earth dopant and phosphorus is disclosed. In various embodiments, the optical fiber may also comprise aluminum. In various embodiments, the optical fiber maybe configured such that the saturated value of the photo-darkening loss is no greater than about 10 dB/m at an emission wavelength.

In some embodiments, the optical fiber may comprise a phosphosilicate glass. In some embodiments, the optical fiber may include at least about 10 mol % $P_2O_5$. In some embodiments, the optical fiber may comprise about 10-30 mol % of phosphorus, less than about 25 mol % of boron, and about 0.5-15 mol % aluminum. In some embodiments, the optical fiber may comprise about 0.01-15 mol % of ytterbium. In various embodiments, the optical fiber may comprise about 0.01-15 mol % ytterbium, and about 0.001-1 mol % erbium. In various embodiments, the optical fiber may comprise about 0.01-15 mol % thulium. In various embodiments, the optical fiber comprises about 0.001-1 mol % erbium. In some embodiments, the optical fiber may comprise about 0.5-15 mol % aluminum or about 1-10 mol % aluminum or about 5-10 mol % aluminum. In some embodiments, the rare earth dopant can have a concentration of at least about 0.5 mol %.

In some embodiments, the saturated value of the photo-darkening loss may be no greater than about 10 dB/m at an emission wavelength during operation of the fiber at a pump power of at least greater than about 50% of the maximum pump power. In some embodiments, the saturated value of the photo-darkening loss may be no greater than about 10 dB/m at most emission wavelengths. In some embodiments, the saturated value of the photo-darkening loss may be no greater than about 10 dB/m at substantially all emission wavelengths. In some embodiments, the photo-darkening loss maybe no greater than about 10 dB/m at an emission wavelength.

In some embodiments, the saturated value of the photo-darkening loss may be no greater than about 10 dB/m at an emission wavelength during operation of the fiber at an inversion level greater than about 50%. In some embodiments, the saturated value of the photo-darkening loss is less than about 10 dB/m for at least some wavelengths in an emission wavelength range. In some embodiments, the saturated value of the photo-darkening loss is less than about 10 dB/m for most, or for substantially all, wavelengths in the emission wavelength range. In some embodiments, the emission wavelength range is from about 1.0 μm to about 1.1 μm, from about 0.95 μm to about 1.2 μm, or some other suitable range. In various embodiments, the optical fiber maybe configured such that the saturated value of the photo-darkening loss is no greater than about 10 dB/m at a pump wavelength. In some embodiments, the pump wavelength is in a range from about 0.9 μm to about 1.0 μm. In various embodiments, the optical fiber maybe configured such that the saturated value of the photo-darkening loss is no greater than about 10 dB/m measured at a probe wavelength. In some embodiments, the saturated value of the photo-darkening loss is determined at a probe wavelength (e.g., about 675 nm) when the fiber is pumped at a pump wavelength (e.g., about 976 nm). In other, embodiments, the probe wavelength may comprise the emission wavelength. In other, embodiments, the probe wavelength may be in a range from about 0.6 μm to about 1.1 μm, a range from about 0.95 μm to about 1.2 μm, a range from about 1 μm to about 1.1 μm, or some other suitable range. Other probe, emission, and pump wavelengths may be used.

In various embodiments of the fibers disclosed herein, the pump wavelength may be in a range from approximately 0.9 μm to approximately 1.0 μm. In some embodiments, the pump wavelength may be in a range from approximately 0.91 μm to approximately 0.99 μm. In some embodiments, the pump wavelength may be in a range from about 0.97 μm to about 1.03 μm. In some embodiments, the emission wavelength may be in a range from approximately 0.95 μm to approximately 1.2 μm. In various embodiments of the fibers disclosed herein, the emission wavelength may be in a range from approximately 1.0 μm to approximately 1.1 μm. In other embodiments of the optical fiber disclosed herein, the saturated value of the photo-darkening loss at the emission wavelength, the pump wavelength, and/or the probe wavelength may be less than about 1 dB/m, less than about 5 dB/m, less than about 15 dB/m, less than about 20 dB/m, or less than about 30 dB/m. Other values for the saturated photo-darkening loss are possible in other embodiments of the fiber.

In various embodiments, the optical fiber may comprise a core and a cladding and may exhibit a low effective index difference between the core and the cladding. In various embodiments, the effective index of the highly rare-earth doped glass is within ±0.003 or less of the refractive index of silica. In various embodiments, the optical fiber may have a peak absorption of at least about 1000 dB/m at a pump wavelength. In some embodiment, the optical fiber may have a peak pump light absorption at a pump wavelength of at least about 3000 dB/m.

In various embodiment, an optical amplifier, comprising a gain fiber comprising a an optical fiber, comprising a highly rare earth doped glass comprising silica, a rare-earth dopant, phosphorus and a pump source are disclosed. In some embodiments, the gain fiber may also comprise aluminum. In some embodiments, the gain fiber may exhibit photo-darkening loss that has a saturated value less than about 10 dB/m at an emission wavelength when the gain fiber is pumped with a high pump power and operated at a high inversion level. In some embodiments, the gain fiber may comprise a rare earth dopant concentration of at least about 0.5 mol %. In various embodiments, the gain fiber may be core-pumped and the pump source may comprise a large-core fiber amplifier. In various embodiments, the gain fiber maybe cladding pumped. In some embodiments, the pump source may comprise a plurality of fibers. In some embodiments, the gain fiber may comprise a large-core fiber. In various embodiments, the pump source and the gain fiber maybe configured to couple pump energy to the gain fiber without using bulk optical components. In various embodiments, the amplifier may have a gain medium length in the range of a few centimeters to a few meters, and a gain per unit length of at least about 0.5 dB/cm to about 10 dB/cm. In some embodiments, gain per unit length could be in the range of about 2 dB/cm to about 10 dB/cm. In various embodiments, the amplifier maybe configured as a large-core amplifier operable to generate an output pulse having a pulse energy in the range of about 100 μJ to 10 mJ with a pulse duration in the range of about 100 fs to a few ns (e.g. 20 ns). Various embodiments may include a fiber laser comprising an optical amplifier, comprising a gain fiber comprising a an optical fiber, comprising a highly rare earth doped glass comprising silica, a rare-earth dopant, phosphorus, and aluminum and a pump source. In some embodiments, the amplifier maybe configured as a gain medium within an optical resonator. In some embodiments, the optical amplifier may have a length of about 1 mm to about 20 cm.

In various embodiments, a system comprising a highly rare-earth doped fiber amplifier, for example an optical fiber, comprising a highly rare earth doped glass comprising silica, a rare-earth dopant, phosphorus, and aluminum is disclosed. The fiber amplifier may be configured as an element of at least one of a high repetition rate fiber laser (e.g. repetition rate in the range of about 100 MHz to about 10 GHz), a high repetition rate amplifier, a femtosecond to nanosecond pulse amplifier, a power amplifier seeded by a pulse source, a seed source for a bulk amplifier producing high-peak output power or high energy (e.g., about 100 microJoule-1 millijoule), a pump source and a CW source exhibiting low photo-darkening in kilowatt average power applications, a pulse source providing an input to a frequency converter for short wavelength pulse generation, a continuum generator, a gain element of a fiber-based coherent beam combiner, a frequency comb source, a single frequency fiber laser, a gain element in a material processing application, a gain element in a laser radar application, and a telecom amplifier. In various embodiments, the fiber amplifier may comprise a phosphosilicate gain fiber.

In various embodiments, a highly rare-earth doped fiber, fiber amplifier, fiber laser, or a system comprising an optical fiber having a highly rare earth doped glass comprising silica, a rare-earth dopant, phosphorus, and aluminum is disclosed. In various embodiments, the highly doped rare-earth fiber is configured to simultaneously provide high pump absorption, high gain (e.g. approximately 0.5 dB/cm to about 500 dB/m), low photo-darkening loss, a relatively low index difference between a core and a cladding, and a high non-linear threshold relative to a silica fiber having the same approximate level of rare-earth doping.

Various embodiments disclose, an optical fiber having a doped glass comprising silica having a refractive index, at least about 10 mol % phosphorus in the silica; rare earth ions in the silica, the rare earth ions having a concentration in the silica of at least about 1000 mol ppm, wherein the silica having the phosphorus and the rare earth ions therein has a refractive index within about ±0.003 or less of the refractive index of the silica, and wherein peak absorption of the fiber is at least about 3000 dB/m to about 9000 dB/m at a pump wavelength. In various embodiments, the peak absorption of the optical fiber is in the range of about 3000 dB/m to about 9000 dB/m at a pump diode wavelength.

Various embodiments disclose, a step index optical fiber comprising: a rare earth doped core having a core radius p; a first cladding disposed about the core; and a second cladding disposed about the first cladding, the first cladding having an outer radius $\rho_1$, the core and the first cladding having a difference in index of refraction $\Delta n$, and the first cladding and the second cladding having a different in index of refraction $\Delta n_1$, wherein (i) less than 10 modes are supported in the core, (ii) the first cladding radius, $\rho_1$, is greater than about 1.1ρ and less than about 2ρ, and (iii) the refractive index difference between first cladding and the second cladding, $\Delta n_1$, is greater than about 1.5 $\Delta n$ and less than about 50 $\Delta n$, and wherein peak absorption of the fiber is at least about 300 dB/m. In various embodiments, the peak absorption of the fiber may be in the range of about 3000 dB/m to about 9000 dB/m at a pump wavelength. In some embodiments, the peak absorption of the optical fiber maybe in the range of about 3000 dB/m to about 9000 dB/m at a pump diode wavelength.

In various embodiments, a fiber laser oscillator comprising a highly rare-earth doped gain fiber (such as for example an optical fiber comprising silica, a rare earth dopant, phosphorus and aluminum) is disclosed. In some embodiments, the oscillator can be configured to produce output pulses at a plurality of outputs, wherein pulses emitted from at least one output comprise nearly bandwidth limited pulses.

Various embodiments disclose a fiber laser oscillator comprising a highly rare-earth doped gain fiber (such as for example an optical fiber comprising silica, a rare earth dopant, phosphorus and aluminum), a pump source for pumping the gain fiber, a first reflector receiving energy emitted from a first output end of the gain fiber, the reflector configured as a high-reflective (HR) cavity end mirror, or as a first output coupler (OC) that emits first output pulses, the reflector further configured in such a way that it controls intra-cavity dispersion, an undoped fiber optically connected to the doped gain fiber and receiving energy emitted from a second output end of the gain fiber, a saturable absorber configured as highly reflective (HR) cavity end mirror and operable to mode-lock the fiber oscillator, wherein the saturable absorber is configured to receive and reflect energy emitted from the second output end of the gain fiber and from an end of the undoped fiber, and an intra-cavity polarization controller optically connected to the gain fiber and the undoped fiber, an output of the controller emitting second output pulses, wherein a second output pulse comprises an approximately bandwidth limited pulse or slightly chirped pulse, and a first output pulse that is spectrally broadened relative to the second output pulse. In some embodiments, the first reflector can comprise a chirped Bragg grating. In some embodiments, the polarization controller can comprise a polarization beam splitter (PBS), and a quarter-wave plate, and the quarter-wave plate can be adjusted to control the output coupling of the second output pulses. In some embodiments, the first reflector maybe highly reflective and the polarization controller maybe configured for high output coupling. In various embodiments the length of the highly rare-earth doped gain fiber maybe sufficiently short that a non-linear interaction within the fiber is sufficiently low that the second output pulses are approximately bandwidth limited. In some embodiments, the fiber oscillator may support solutions.

Various embodiments disclose a laser-based system, comprising a source of optical pulses, the source may comprise a fiber oscillator as described above. In some embodiments, the optical pulses maybe obtained from the second output via the intra-cavity polarization controller. In some embodiments, the laser-based system may comprise a fiber amplifier including a highly rare-earth doped, large core fiber, the amplifier maybe configured to provide high-peak power, nearly bandwidth-limited output pulses. In some embodiments, the laser-based system may further comprise a frequency converter receiving output pulses from the fiber amplifier. In some embodiments, the fiber amplifier provided to the laser-based system maybe configured so as to limit non-linear phase of the high peak power output pulses to <π.

Various embodiments describe a laser-based system, comprising a source of optical pulses, a fiber amplifier, comprising an optical fiber (such as for example an optical fiber comprising silica, a rare earth dopant, phosphorus and aluminum) and a non-linear fiber configured to spectrally broaden pulses emitted from the fiber amplifier, the non-linear fiber comprising a stress-guided fiber configured in such a way that a mode is guided within the fiber by a stress-optic effect. In some embodiments, the laser based system may further comprising a pulse compressor receiving pulses from the highly non-linear fiber, and compressing the pulses to a pulse width in the range of about 10 fs to 1 ps.

Various embodiments disclose a very high repetition rate fiber laser oscillator comprising a pump, a highly rare-earth doped gain fiber (such as for example an optical fiber comprising silica, a rare earth dopant, phosphorus and aluminum)

and a dispersion compensator comprising one or more fibers having a dispersion, wherein the gain fiber and the one or more fibers have a total length sufficiently short to provide a repetition rate in the range of about 100 MHz to 10 GHz, and the dispersion compensator provides for generation of sub-picosecond output pulses. In some embodiments the sub-picosecond pulse widths may be in the range of about 100 fs to about 300 fs. In some embodiments the dispersion compensator may comprise a fiber Bragg grating.

Various embodiments disclosed herein describe a frequency comb source, comprising a source of optical pulses which may include embodiments of the high repetition rate oscillator described herein and a non-linear fiber configured to spectrally broaden pulses emitted from the gain fiber.

Various embodiments disclosed herein describe a laser-based system comprising at least one multimode pump diode, a large core fiber receiving energy from the pump diode and emitting a pump output that comprises a single or a few modes, a laser or optical amplifier receiving the pump output, wherein at least one of the large core fiber or laser or the optical amplifier comprises highly rare-earth doped fiber (such as for example an optical fiber comprising silica, a rare earth dopant, phosphorus and aluminum). In some embodiments, the pump diode maybe pulsed. In some embodiments, the large core fiber may be a pumped highly rare-earth doped fiber (such as for example an optical fiber comprising silica, a rare earth dopant, phosphorus and aluminum) and the pump output may be an amplified output.

Various embodiments disclosed herein describe a single-frequency, short cavity fiber laser comprising a highly rare-earth doped gain fiber (such as for example an optical fiber comprising silica, a rare earth dopant, phosphorus and aluminum) which is configured as a DBR or DFB laser.

Various embodiments describe an optical fiber, comprising silica, a rare-earth dopant concentration of at least about 0.5 mol % and phosphorus. In some embodiments, the fiber may have a peak absorption in the range of about 3000 dB/m-9000 dB/m at a pump wavelength. In some embodiments, the fiber may have a gain in the range of about 0.5 dB/cm to 1000 dB/m at an emission wavelength. In some embodiments, the fiber may have a gain in the range of about 0.5 dB/cm to 500 dB/m at an emission wavelength. In some embodiments, the fiber may have a gain greater than approximately 10 dB/m, greater than approximately 20 dB/m, greater than approximately 50 dB/m, greater than approximately 100 dB/m, greater than approximately 500 dB/m, greater than approximately 1000 dB/m, or some other gain value. In some embodiments, the fiber may exhibit a saturated photo-darkening loss of no greater than about 10 dB/m at an emission wavelength. In some embodiments, the photo-darkening loss maybe no greater than about 10 dB/m at an emission wavelength during operation of the fiber at a high pump power and a high inversion level In some embodiments the photo-darkening loss maybe no greater than about 10 dB/m at an emission wavelength during operation of the above described fiber at a pump power of at least greater than about 50% of the maximum pump power. In some embodiments, the optical fiber may comprise a phosphosilicate glass. In some embodiments, the fiber may comprise at least about 10 mol % $P_2O_5$. In some embodiments, the fiber may have about 10-30 mol % of phosphorus, less than about 25 mol % of boron, and about 0.5-15 mol % aluminum. In some embodiments, the fiber may comprise about 0.5-15 mol % of ytterbium. In some embodiments, the fiber comprises about 0.5-15 mol % ytterbium, and about 0.001-1 mol % of erbium. In some embodiments, the fiber may comprise about 0.5-15 mol % thulium. In some embodiments, the fiber may comprise about 0.5-1 mol % erbium. In some embodiments, the fiber may have about 0.5-15 mol % aluminum. In some embodiments, the fiber may have about 1-10 mol % aluminum. In some embodiments, the fiber may have about 5-10 mol % aluminum. In some embodiments, the fiber may have a core and cladding, and a low effective index difference between the core and the cladding. In some embodiments, the effective index of the highly rare-earth doped glass may be within ±0.003 or less the refractive index of the silica.

Various embodiments disclosed herein describe an optical amplifier, comprising a gain fiber comprising silica, a rare-earth dopant concentration of at least about 0.5 mol % and phosphorus and a pump source. In some embodiments, the gain fiber may be core-pumped, and the pump source may comprise a large-core fiber amplifier. In some embodiments, the gain fiber maybe cladding pumped. In some embodiments, the pump source may comprise a plurality of fibers. In some embodiments, the gain fiber may comprise a large-core fiber and the pump source and the gain fiber may be configured to couple pump energy to the gain fiber without using bulk optical components. In some embodiments, the amplifier may have a gain medium length in the range of a few centimeters to a few meters. In some embodiments, the gain per unit length maybe in the range of about 2 dB/cm to about 10 dB/cm. In some embodiments, the optical amplifier maybe configured as a large-core amplifier operable to generate an output pulse having a pulse energy in the range of about 100 µJ to 10 mJ with a pulse duration in the range of about 100 fs to a few ns. Some embodiments describe a fiber laser comprising the above described optical amplifier wherein the amplifier can be configured as a gain medium within an optical resonator. In some embodiments, the fiber amplifier may have a length of about 1 mm to about 20 cm.

Various embodiments disclosed herein describe a system comprising a highly rare-earth doped fiber amplifier (such as for example a fiber comprising silica, a rare-earth dopant concentration of at least about 0.5 mol % and phosphorus). In some embodiments, the fiber amplifier maybe configured as an element of at least one of a high repetition rate fiber laser (e.g. a fiber laser having a repetition rate in the range of about 100 MHz to about 100 GHz), a high repetition rate amplifier, a femtosecond to nanosecond pulse amplifier, a power amplifier seeded by a pulse source, a seed source for a bulk amplifier producing high-peak output power or high energy (e.g., about 100 microJoule-1 millijoule), a pump source, a CW source exhibiting low photo-darkening in kilowatt average power applications, a pulse source providing an input to a frequency converter for short wavelength pulse generation, a continuum generator, a gain element of a fiber-based coherent beam combiner, a frequency comb source, a single frequency fiber laser, a gain element in a material processing application, a gain element in a laser radar application, and a telecom amplifier. In some embodiments, the system of embodiment 83 the fiber amplifier may comprise a phosphosilicate gain fiber.

Various embodiments disclosed herein describe a system comprising a fiber amplifier comprising an amplifier material and a fiber pump laser comprising a laser material configured to produce radiation in a wavelength range having a pump wavelength. The fiber pump laser is configured to core pump the fiber amplifier. In various embodiments, an emission cross section of the pump laser material at the pump wavelength is about 10%-about 50% greater than an emission cross section of the amplifier material at the pump wavelength. In various embodiments, an emission cross section of the pump laser material at the pump wavelength is about 25%-about 50% greater than an emission cross section of the amplifier material at the pump wavelength. In some embodiments, the fiber amplifier comprises an Yb fiber amplifier. In some embodiments, the fiber amplifier comprises an Yb aluminosilicate fiber. In some embodiments, the fiber amplifier comprises a single mode Yb fiber pump laser. In various embodiments, the fiber pump laser comprises an Yb phosphosilicate fiber. In some embodiments, the pump wavelength can be less than approximately 1030 nm. In various embodiments, the emission cross section of the pump laser material at the pump wavelength can be about 20%, 25%, 30%, 35%, 40%, 45% or 50% greater than an emission cross section of the amplifier material at the pump wavelength.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

For purposes of summarizing aspects of the disclosure, certain objects and advantages of particular embodiments are described. It is to be understood that not necessarily all such objects or advantages may be achieved in accordance with any particular embodiment. Thus, for example, those skilled in the art will recognize that embodiments may be provided or carried out in a manner that achieves or optimizes one advantage or group of advantages as taught herein without necessarily achieving other objects or advantages as may be taught or suggested herein.

While certain embodiments of the disclosure have been described, these embodiments have been presented by way of example only, and are not intended to limit the scope of the disclosure. No single feature or group of features is necessary for or required to be included in any particular embodiment. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

What is claimed is:

1. An optical fiber comprising:
a rare earth doped glass comprising silica, a rare-earth dopant, phosphorus, and aluminum, wherein the concentration of the rare-earth dopant is at least about 0.5 mol %;
said optical fiber configured to have a peak absorption greater than about 3000 dB/m at a pump wavelength and a gain greater than about 0.5 dB/cm at an emission wavelength, and
wherein the phosphorus in the rare-earth doped glass has a concentration such that a saturated value of photo-darkening loss in the optical fiber is less than about 10 dB/m at said emission wavelength.

2. The optical fiber of claim 1, wherein said concentration of phosphorous in said rare-earth doped glass comprises at least about 10 mol % $P_2O_5$.

3. The optical fiber of claim 1, said rare-earth doped glass comprising about 10-30 mol % of phosphorus, less than about 25 mol % of boron, and about 0.5-15 mol % aluminum.

4. The optical fiber of claim 1, wherein said rare-earth doped glass comprises about 0.5-15 mol % of ytterbium.

5. The optical fiber of claim 1, wherein said rare-earth doped glass comprises about 0.5-15 mol % ytterbium, and about 0.5-1 mol % erbium.

6. The optical fiber of claim 1, wherein said rare-earth doped glass comprises about 0.5-15 mol % thulium.

7. The optical fiber of claim 1, wherein said rare-earth doped glass comprises about 0.5-1 mol % erbium.

8. The optical fiber of claim 1, wherein the gain is in a range from about 0.5 dB/cm to about 10 dB/cm.

9. The optical fiber of claim 1, wherein the peak absorption is in a range from about 3000 dB/m to about 9000 dB/m.

10. The optical fiber of claim 1, wherein the saturated value of the photo-darkening loss in the optical fiber is less than about 10 dB/m and greater than about 1 dB/m.

11. The optical fiber of claim 1, wherein said silica has a refractive index and wherein said rare earth doped glass has a refractive index within approximately ±0.003 or less of the refractive index of silica.

12. The optical fiber of claim 1, wherein the optical fiber is configured to have a gain greater than about 100 dB/m.

13. A laser-based system, comprising:
at least one multimode pump diode;
a large core fiber configured to receive energy from said pump diode and emit a single-mode or few-mode pump output; and
an optical system configured to receive said pump output, wherein at least one of said large core fiber or said optical system comprises the optical fiber of claim 1.

14. A laser-based system, comprising:
a source of optical pulses;
a fiber amplifier, comprising the optical fiber of claim 1; and
a non-linear fiber configured to spectrally broaden pulses emitted from said fiber amplifier, said non-linear fiber comprising a stress-guided fiber configured to guide a mode within said fiber using stress-optic effect.

15. The laser-based system of claim 14, further comprising a pulse compressor configured to receive pulses from said non-linear fiber and compress said pulses to a pulse width in a range of about 10 fs to about 1 ps.

16. A fiber laser oscillator, comprising:
a gain fiber comprising the optical fiber of claim 1, said gain fiber having a first length;
a pump source for pumping said gain fiber;
a first reflector optically connected to a first output end of said gain fiber, wherein the reflector is configured to control intra-cavity dispersion, said reflector having a reflectivity of at least about 40%;
an undoped fiber optically coupled to a second output end of the gain fiber and configured to receive energy emitted from the second output end of the gain fiber, said undoped fiber having a second length, the second length greater than the first length;

a saturable absorber configured as a highly reflective cavity end mirror, said saturable absorber having a reflectivity of at least about 40% and operable to mode-lock said fiber oscillator, said saturable absorber configured to receive and reflect energy emitted from the second output end of the gain fiber; and an intra-cavity polarizer optically coupled to said gain fiber and said undoped fiber, the polarizer configured as a first output coupler to emit a first set of output pulses.

17. The fiber laser oscillator of claim 16, wherein said first reflector comprises a chirped Bragg grating.

18. The fiber laser oscillator of claim 16, wherein said oscillator further comprises a polarization controller, said polarization controller comprising a quarter-wave plate, wherein said quarter-wave plate is configured to be adjustable to control output coupling of said first set of output pulses.

19. The fiber laser oscillator of claim 18, wherein said polarization controller is configured for output coupling of at least about 50%.

20. The fiber laser oscillator of claim 16, wherein said oscillator is configured to support solitons.

21. The fiber laser oscillator of claim 16, wherein said oscillator is configured to limit non-linear phase delay of the output pulses to less than $\pi$.

22. A system comprising:
a fiber amplifier comprising an amplifier material configured to amplify radiation in a first wavelength range having a signal wavelength, the amplifier material comprising rare-earth dopant, phosphorus, and aluminum, wherein the phosphorus in the amplifier material has a concentration such that a saturated value of photo-darkening loss in the amplifier material is less than about 10 dB/m at the signal wavelength; and a fiber pump laser comprising a laser material configured to produce radiation in a second wavelength range having a pump wavelength, said fiber pump laser configured to core pump the fiber amplifier, wherein an emission cross section of the pump laser material at the pump wavelength is about 10% greater than an emission cross section of the amplifier material at the pump wavelength.

23. The system of claim 22, wherein the fiber amplifier comprises an Yb aluminosilicate fiber.

24. The system of claim 22, wherein the fiber pump laser comprises an Yb phosphosilicate fiber.

25. The system of claim 22, wherein the emission cross section of the pump laser material at the pump wavelength is in a range from about 25% to about 50% greater than the emission cross section of the amplifier material at the pump wavelength.

26. The system of claim 22, wherein the saturated value of the photo-darkening loss in the amplifier material is less than about 10 dB/m and greater than about 1 dB/m.

27. An optical amplifier, comprising:
a pump source; and
a gain fiber, said gain fiber comprising:
a cladding comprising silica;
a core comprising a rare-earth dopant, phosphorus, and aluminum, wherein the concentration of the rare-earth dopant is at least about 0.5 mol %, and said gain fiber has a peak absorption greater than about 3000 dB/m at a pump wavelength and a gain greater than about 0.5 dB/cm at an emission wavelength, and wherein the phosphorus in the gain fiber has a concentration such that a saturated value of photo-darkening loss of the gain fiber is less than about 10 dB/m at the emission wavelength.

28. The optical amplifier of claim 27, wherein said pump source is configured to core pump said gain fiber, and said pump source comprises a large-core fiber amplifier.

29. The optical amplifier of claim 27, wherein said pump source is configured to cladding pump said gain fiber.

30. A fiber laser comprising the optical amplifier of claim 27, said gain fiber configured as a gain medium within an optical resonator.

31. The optical amplifier of claim 27, wherein the concentration of the rare-earth dopant is less than about 15 mol %.

32. The optical amplifier of claim 27, wherein the gain is in a range from about 0.5 dB/cm to about 10 dB/cm.

33. The optical amplifier of claim 27, wherein the peak absorption is in a range from about 3000 dB/m to about 9000 dB/m.

34. The optical amplifier of claim 27, wherein the saturated value of the photo-darkening loss in the optical fiber is less than about 10 dB/m and greater than about 1 dB/m.

35. An optical fiber comprising:
a rare earth doped core having a core radius $\rho$;
a first cladding disposed about said core; and
a second cladding disposed about said first cladding,
said first cladding having an outer radius $\rho_1$, said core and said first cladding having a difference in index of refraction $\Delta n$, and said first cladding and said second cladding having a difference in index of refraction $\Delta n_1$, wherein (i) less than 10 modes are supported in said core, (ii) the first cladding radius, $\rho_1$, is greater than about $1.1\rho$ and less than about $2\rho$, and (iii) the refractive index difference between said first cladding and said second cladding, $\Delta n_1$, is greater than about $1.5 \Delta n$ and less than about $50 \Delta n$, wherein said optical fiber comprises silica, a rare-earth dopant, phosphorus, and aluminum, and the concentration of the rare-earth dopant is at least about 0.5 mol %, said optical fiber having a peak absorption greater than about 3000 dB/m to about 9000 dB/m at a pump wavelength, and wherein the phosphorus in the rare-earth doped core has a concentration such that the saturated value of the photo-darkening loss of the optical fiber is less than about 10 dB/m at an emission wavelength.

36. The optical fiber of claim 35, wherein the concentration of the rare-earth dopant is less than about 15 mol %.

37. The optical fiber of claim 35, wherein a gain of the optical fiber is in a range from about 0.5 dB/cm to about 10 dB/cm at the emission wavelength.

38. The optical fiber of claim 35, wherein the saturated value of the photo-darkening loss of the optical fiber is less than about 10 dB/m and greater than about 1 dB/m.

* * * * *

UNITED STATES PATENT AND TRADEMARK OFFICE
CERTIFICATE OF CORRECTION

PATENT NO. : 8,498,046 B2
APPLICATION NO. : 12/630550
DATED : July 30, 2013
INVENTOR(S) : Liang Dong et al.

Page 1 of 1

It is certified that error appears in the above-identified patent and that said Letters Patent is hereby corrected as shown below:

On the Title Page

In column 2 (page 2 item 56) at line 46, under Other Publications, change "Ti:Al2O3" to --Ti:Al$_2$O$_3$--.

In the Specification

In column 12 at line 20, change "$^2/F_{7/2}$" to --$^2/F_{7/2}$,--.

In column 24 at line 61, change "(986" to --('986--.

In column 29 at line 38, change "Miser" to --Röser--.

In column 31 at line 15, change "d/A" to --d/Λ--.

In column 31 at line 17, change "(N>2)" to --(N≥2)--.

In column 31 at line 18, change "d/A" to --d/Λ--.

In column 31 at line 20, change "d/A" to --d/Λ--.

In column 31 at line 22, change "d/A" to --d/Λ--.

In column 31 at line 37, change "d/A" to --d/Λ--.

In column 36 at line 37, change "solutions." to --solitons.--.

In the Claims

In column 41 at lines 30-31, in Claim 22, change "comprising" to --comprising a--.

Signed and Sealed this
Eleventh Day of February, 2014

Michelle K. Lee
*Deputy Director of the United States Patent and Trademark Office*